US 9,430,628 B2

(12) United States Patent
Kim et al.

(10) Patent No.: US 9,430,628 B2
(45) Date of Patent: Aug. 30, 2016

(54) ACCESS AUTHORIZATION BASED ON SYNTHETIC BIOMETRIC DATA AND NON-BIOMETRIC DATA

(71) Applicant: QUALCOMM Incorporated, San Diego, CA (US)

(72) Inventors: Lae-Hoon Kim, San Diego, CA (US); Juhan Nam, Daejeon (KR); Erik Visser, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/577,878

(22) Filed: Dec. 19, 2014

(65) Prior Publication Data

US 2016/0048669 A1    Feb. 18, 2016

Related U.S. Application Data

(60) Provisional application No. 62/037,047, filed on Aug. 13, 2014.

(51) Int. Cl.
*G06Q 40/00* (2012.01)
*G07D 11/00* (2006.01)
(Continued)

(52) U.S. Cl.
CPC ........... *G06F 21/32* (2013.01); *G06K 9/00006* (2013.01); *G06K 9/0008* (2013.01);
(Continued)

(58) Field of Classification Search
CPC .......... G07C 9/00087; G07C 9/00904; G07C 9/00309; G07F 7/1008; G06Q 20/40975; G06Q 20/341; G06Q 50/18; G06Q 20/40145; H04L 63/0861; H04L 12/1813; H04L 9/3231; H04L 9/3257; H04W 12/06; G06F 21/32; G06K 19/0718; G06K 9/00885; G06K 9/00006; G06K 9/00026; G06K 9/00093; G06K 9/00375; G06K 9/00577; G06K 9/00892
See application file for complete search history.

(56) References Cited

U.S. PATENT DOCUMENTS 5,956,471 A * 9/1999 Ueda ................. G06K 15/00
340/10.6
5,978,495 A * 11/1999 Thomopoulos .... G06K 9/00013
382/116

(Continued)

FOREIGN PATENT DOCUMENTS

| AU | 2009240843 A1 | 6/2011 |
|----|---------------|--------|
| FR | 2861482 A1 | 4/2005 |
| WO | 2006044917 A2 | 4/2006 |

OTHER PUBLICATIONS

Cappelli, R., "SFinGe: an Approach to Synthetic Fingerprint Generation," Proceedings International Workshop on Biometric Technologies (BT2004), Calgary, Canada, pp. 147-154.

(Continued)

*Primary Examiner* — Thien T Mai
(74) *Attorney, Agent, or Firm* — Toler Law Group, PC

(57) ABSTRACT

A method of selectively authorizing access includes obtaining, at an authentication device, first information corresponding to first synthetic biometric data. The method also includes obtaining, at the authentication device, first common synthetic data and second biometric data. The method further includes generating, at the authentication device, second common synthetic data based on the first information and the second biometric data. The method also includes selectively authorizing, by the authentication device, access based on a comparison of the first common synthetic data and the second common synthetic data.

30 Claims, 27 Drawing Sheets

(51) Int. Cl.

| | | |
|---|---|---|
| *G07F 19/00* | (2006.01) | |
| *G06K 5/00* | (2006.01) | |
| *G06K 7/01* | (2006.01) | |
| *G06F 21/32* | (2013.01) | |
| *G06K 9/00* | (2006.01) | |
| *G06Q 20/40* | (2012.01) | |
| *H04L 9/32* | (2006.01) | |
| *H04L 9/08* | (2006.01) | |

(52) U.S. Cl.
CPC ......... *G06K9/0061* (2013.01); *G06K 9/00073* (2013.01); *G06Q 20/40145* (2013.01); *H04L 9/0844* (2013.01); *H04L 9/3231* (2013.01); *G06K 9/00926* (2013.01); *G06K 2009/00953* (2013.01)

(56) References Cited

U.S. PATENT DOCUMENTS

| | | | |
|---|---|---|---|
| 6,735,695 B1* | 5/2004 | Gopalakrishnan . | G06K 9/00885 713/186 |
| 6,959,040 B2 | 10/2005 | Akiyoshi et al. | |
| 7,110,580 B2* | 9/2006 | Bostrom ............ | G06K 9/00973 382/116 |
| 7,131,009 B2 | 10/2006 | Scheidt et al. | |
| 7,693,279 B2 | 4/2010 | Chen et al. | |
| 2003/0024980 A1 | 2/2003 | Everett et al. | |
| 2004/0129787 A1 | 7/2004 | Saito et al. | |
| 2007/0136058 A1 | 6/2007 | Jeong et al. | |
| 2007/0168674 A1* | 7/2007 | Nonaka ................ | G06Q 20/341 713/182 |
| 2008/0028230 A1* | 1/2008 | Shatford ............... | H04L 9/3231 713/186 |
| 2008/0209226 A1 | 8/2008 | Venkatesan et al. | |
| 2009/0007257 A1 | 1/2009 | Hirata et al. | |
| 2009/0007401 A1* | 1/2009 | Bills ........................ | G09F 3/00 27/1 |
| 2010/0046808 A1 | 2/2010 | Connell et al. | |
| 2010/0058063 A1* | 3/2010 | Tuyls .................... | H04L 9/3231 713/168 |
| 2013/0198832 A1 | 8/2013 | Draluk et al. | |
| 2014/0095884 A1 | 4/2014 | Kannavara et al. | |
| 2014/0157384 A1 | 6/2014 | Stern et al. | |
| 2014/0218311 A1 | 8/2014 | Huang et al. | |
| 2014/0280930 A1 | 9/2014 | Foo | |
| 2014/0337957 A1* | 11/2014 | Feekes ................ | H04L 63/0853 726/9 |
| 2014/0365782 A1 | 12/2014 | Beatson et al. | |
| 2015/0237045 A1* | 8/2015 | Blessing ............. | H04L 63/0861 705/311 |
| 2016/0048670 A1 | 2/2016 | Kim | |
| 2016/0149904 A1 | 5/2016 | Kim et al. | |

OTHER PUBLICATIONS

Cappelli, R., "SFinGe Synthetic Fingerprint Generator," Proceedings 12th CardTech/SecurTech (CTST2002), http://bias.csr.unibo.it/research/biolab, Apr. 2002, 41 pages.

Han, Y.C., et al., "Digiti Sonus: An Interactive Fingerprint Sonification," Proceedings of the 20th ACM international conference on Multimedia, 2012, ACM, New York, New York, 4 Pages.

Nagar A., et al., "Alignment and Bit Extraction for Secure Fingerprint Biometrics," SPIE Conference on electronic Imaging, Jan. 2010, vol. 7541, SPIE, Bellingham, Washington, 16 Pages.

Shah S., et al., "Generating Synthetic Irises by Feature Agglomeration," International Conference on Image Processing, Oct. 2006, IEEE, Piscataway, NJ, pp. 317-320.

"Diffie-Hellman Key Exchange," Wikipedia, the free Encyclopedia, retrieved from http://en.wikipedia.org/wiki/Diffie%E2%80%93Hellman_key_exchange, Retrieved on Nov. 18, 2014, Wikipedia, San Francisco, CA, 10 pages.

"Sonification: Representing data through music," Today Programme, Jan. 31, 2014, BBC, London, United Kingdom, 1 page.

Durairajan, M.S., et al., "Biometrics Based Key Generation using Diffie Hellman Key Exchange for Enhanced Security Mechanism," International Journal of ChemTech Research, Sep. 2014, vol. 6, Number 9, Mumbai, India pp. 4359-4365.

International Search Report and Written Opinion for International Application No. PCT/US2015/044716, ISA/EPO, Date of Mailing Oct. 1, 2015, 14 pages.

Ratha, N.K., et al., "Enhancing security and privacy in biometrics-based authentication systems," IBM Systems Journal, 2001, vol. 40, No. 3, IBM Corporation, Armonk, New York, pp. 614-634.

Tulyakov, S., et al., "Symmetric Hash Functions for Secure Fingerprint Biometric Systems," Pattern Recognition Letters, Dec. 1, 2007, vol. 28, No. 16, Elsevier, Amsterdam, NL, pp. 2427-2436.

Uludag, U., et al., "Securing Fingerprint Template: Fuzzy Vault with Helper Data," Conference on Computer Vision and Pattern Recognition Workshop, CVPRW '06, Jun. 2006, IEEE, Piscataway, NJ, pp. 1-8.

Meenakshi, V.S., et al., "Securing Iris Templates using Combined User and Soft Biometric based Password Hardened Fuzzy Vault", International Journal of Computer Science and Information Security, Feb. 2010, vol. 7, No. 2, Pittsburgh, Pennsylvania, pp. 1-8.

Rattani, A., et al., "Template Update Methods in Adaptive Biometric Systems: A Critical Review," 2009, Advances in Biometrics, Springer Berlin Heidelberg, Berlin, Germany, pp. 847-856.

Teoh, A., et al., "Random Multispace Quantization as an Analytic Mechanism for BioHashing of Biometric and Random Identity Inputs," IEEE Transactions on Pattern Analysis and Machine Intelligence, IEEE Computer Society, Dec. 2006, vol. 28, No. 12, IEEE, Piscataway, NJ, pp. 1892-1901.

"Elliptic curve cryptography," Retrieved from <<https://en.wikipedia.org/wiki/Elliptic_curve_cryptography>>, Retrieved on Jun. 8, 2016, Wikipedia, the free encyclopedia, Wikimedia Foundation, San Francisco, California, pp. 1-8.

* cited by examiner

ACCESS AUTHORIZATION BASED ON SYNTHETIC BIOMETRIC DATA AND NON-BIOMETRIC DATA

I. CROSS-REFERENCE TO RELATED APPLICATIONS

The present application claims priority to and the benefit of U.S. Provisional Patent Application No. 62/037,047, filed Aug. 13, 2014, the content of which is expressly incorporated herein by reference in its entirety.

II. FIELD

The present disclosure is generally related to access authorization based on synthetic biometric data and non-biometric data.

III. DESCRIPTION OF RELATED ART

Advances in technology have resulted in smaller and more powerful computing devices. For example, there exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet, a computer security system, etc. As such, these devices can include significant computing capabilities.

Computer security systems may rely on text passwords and/or biometric passwords. Longer text passwords are generally considered more secure than shorter text passwords, but long text passwords may be more difficult for a user to remember. Biometric passwords (e.g., a finger print, an iris scan, etc.) do not have to be remembered by the user but tend to be unconfigurable (e.g., fixed). For example, a user does not generally have the ability to change their finger print. It is generally recommended that passwords be frequently changed to increase security. The user may be reluctant to use an unconfigurable biometric password because the unconfigurable biometric password cannot be changed, even if compromised.

IV. SUMMARY

Systems and methods of generating synthetic biometric data are disclosed. In a particular example, a device (e.g., a mobile phone, a desktop computer, etc.) may be used to set or reset a password of a computer security system during an enrollment phase or may be used to access the computer security system during an authentication phase. To illustrate, a user may select an enrollment option (e.g., a create account option, a reset password option, etc.) of the computer security system. Alternatively, the user may select an authentication option (e.g., an access account option) of the computer security system. The user may select the enrollment option or the authentication option during a phone call to the computer security system, via a graphical user interface (GUI) of a device, or via an application of the device.

The computer security system may indicate (e.g., during the phone call, via the GUI, or via the application) an option to provide a password during an enrollment phase (e.g., in response to a selection of the enrollment option) or during an authentication phase (e.g., in response to a selection of the authentication option). The user may provide biometric data (such as a finger print, an iris scan, a speech signal, etc.) to the device in response to the option to provide the password. For example, the user may place a finger on or near a finger print scanner (e.g., a camera) to provide the finger print. As another example, the user may place an eye on or near an iris scanner (e.g., a camera) to provide the iris scan. As a further example, the user may speak a phrase (e.g., "one-two-three-four") into a microphone to provide the speech signal. The biometric data may be provided as image data (e.g., the iris scan or the finger print) or as audio data (e.g., the speech signal).

The user may also provide user input (e.g., a password) to the device. For example, the user may provide the user input (e.g., a password) by typing on a keyboard or a touchscreen. As another example, the user may provide the user input (e.g., an identifier) by placing an identification (ID) card on or near an ID scanner (e.g., a camera). As a further example, the user may provide the user input by speaking into a microphone (e.g., "one-two-three-four"). The user input may be provided as text, image data (e.g., a scanned image of a password), or as audio data (e.g., a speech signal corresponding to "one-two-three-four").

The device may generate a key (e.g., non-biometric data, such as "1234") based on the user input. For example, the key may correspond to text (e.g., "1234") received as user input. As another example, the device may perform image recognition on the user input (e.g., an image of "1234") to generate the key. As a further example, the device may perform speech recognition on the user input (e.g., a speech signal corresponding to "1234") to generate the key. In a particular example, the device may generate a plurality of key values (e.g., "1", "2", "3", and "4") based on the key.

The device may generate authorization data (e.g., synthetic biometric data) based on the biometric data and the key (e.g., the non-biometric data). For example, the device may extract features of the biometric data. The device may generate modified features by modifying the features based on the key. For example, the device may determine a feature correspondence between each of the features and a particular key value of the plurality of key values. To illustrate, the feature correspondence may indicate that a first subset of the features corresponds to a first key value (e.g., "1") of the plurality of key values, may indicate that a second subset of the features corresponds to a second key value (e.g., "2") of the plurality of key values, and so on. The features may include spikes of a finger print scan, iris features of an iris scan, facial features of an image of a face, or speech features of a speech signal. The device may generate the modified features by modifying a particular feature (a particular spike, a particular iris feature, a particular facial feature, or a particular speech feature) by applying the function to a product, a ratio, a sum, or a difference of the particular feature and a corresponding key value of the plurality of key values.

The device may generate the authorization data (e.g., second biometric data, a particular image, or audio data) based on the modified features. For example, the modified features may correspond to a modified finger print, a modified iris scan, a modified image of a face, or a modified speech signal. The device may generate the second biometric data (e.g., a second finger print scan, a second iris scan, a second image of a face, or a second speech signal) based on the modified features. The authorization data may include the second biometric data.

In a particular example, the device may select a first image of a plurality of images. The first image may be selected based on the biometric data. The device may generate a second image by modifying the first image based on the key (e.g., the non-biometric data). For example, the device may select the first image based on the modified features and may generate the second image by applying at least one of a rotation function, a scaling function, a blurring function, or a shading function, where an extent of modification of the first image is based on the key. The authorization data may include the second image.

In another example, the device may generate audio data by transforming (e.g., sonifying) the biometric data based on the key. To illustrate, the device may generate a spectral envelope based on the features of the biometric data and may generate a note sequence based on the key. The spectral envelope may correspond to, or represent, a timbre of the user's voice/speech. The audio data may include the spectral envelope and the note sequence. The authorization data may include the audio data.

The device may transmit the authorization data to an authentication device of the computer security system. The authentication device may, during the enrollment phase, store the authorization data in memory. The authentication device may, during the authentication phase, compare the authorization data to enrollment authorization data previously stored in memory and may selectively provide access to the computer security system based on a result of the comparison.

The biometric data may have a first format (e.g., image or audio). The user input (e.g., non-biometric data) may have a second format (e.g., image, audio, or text). The authorization data may have a third format (e.g., image, audio, or text). The device may generate the authorization data by converting the biometric data and the user input to a common format (e.g., the third format). The first format and the second format may be distinct or the same. The third format may be the same as or distinct from the first format, the second format, or both.

In a particular example, the biometric data may include multiple types of biometric data. To illustrate, the biometric data may include at least two of a finger print, an iris scan, or a speech signal of a user. Various types of biometric data may have a same format (e.g., image or audio) or a distinct format. The device may convert the biometric data to a common format and may generate the authorization data by combining the converted biometric data. For example, the biometric data may include the finger print (e.g., image data) and the speech signal (e.g., audio data). The device may generate the authorization data (e.g., audio data) by sonifying the finger print, and combining the sonified finger print and the speech signal. In a particular example, the finger print may be sonified based on the key (e.g., non-biometric data). To illustrate, the device may generate a spectral envelope based on the first finger print, may generate a note sequence based on the key, and the sonified finger print may include the spectral envelope and the note sequence.

In a particular aspect, a method of selectively authorizing access includes obtaining, at an authentication device, first information corresponding to first synthetic biometric data. The method also includes obtaining, at the authentication device, first common synthetic data and second biometric data. The method further includes generating, at the authentication device, second common synthetic data based on the first information and the second biometric data. The method also includes selectively authorizing, by the authentication device, access based on a comparison of the first common synthetic data and the second common synthetic data.

In another aspect, an apparatus for selectively authorizing access includes a memory and a processor. The memory is configured to store instructions. The processor is configured to execute the instructions to generate second common synthetic data based on first information and second biometric data. The first information corresponds to first synthetic biometric data. The processor is also configured to selectively authorize access to a system of a vehicle based on a comparison of first common synthetic data and the second common synthetic data.

In another aspect, a computer-readable storage device for selectively authorizing access stores instructions that, when executed by a processor, cause the processor to perform operations including obtaining first information corresponding to first synthetic biometric data and obtaining first common synthetic data and second biometric data. The operations also include generating second common synthetic data based on the first information and the second biometric data. The operations further include selectively authorizing access based on a comparison of the first common synthetic data and the second common synthetic data.

One particular advantage provided by at least one of the disclosed aspects is that the authorization data is based on biometric data and non-biometric data. A user may change a password by providing different non-biometric data to generate different authorization data. Authorization data generated based on the biometric data and the non-biometric data may have advantages of both higher security generally associated with biometric data and configurability generally associated with non-biometric data.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
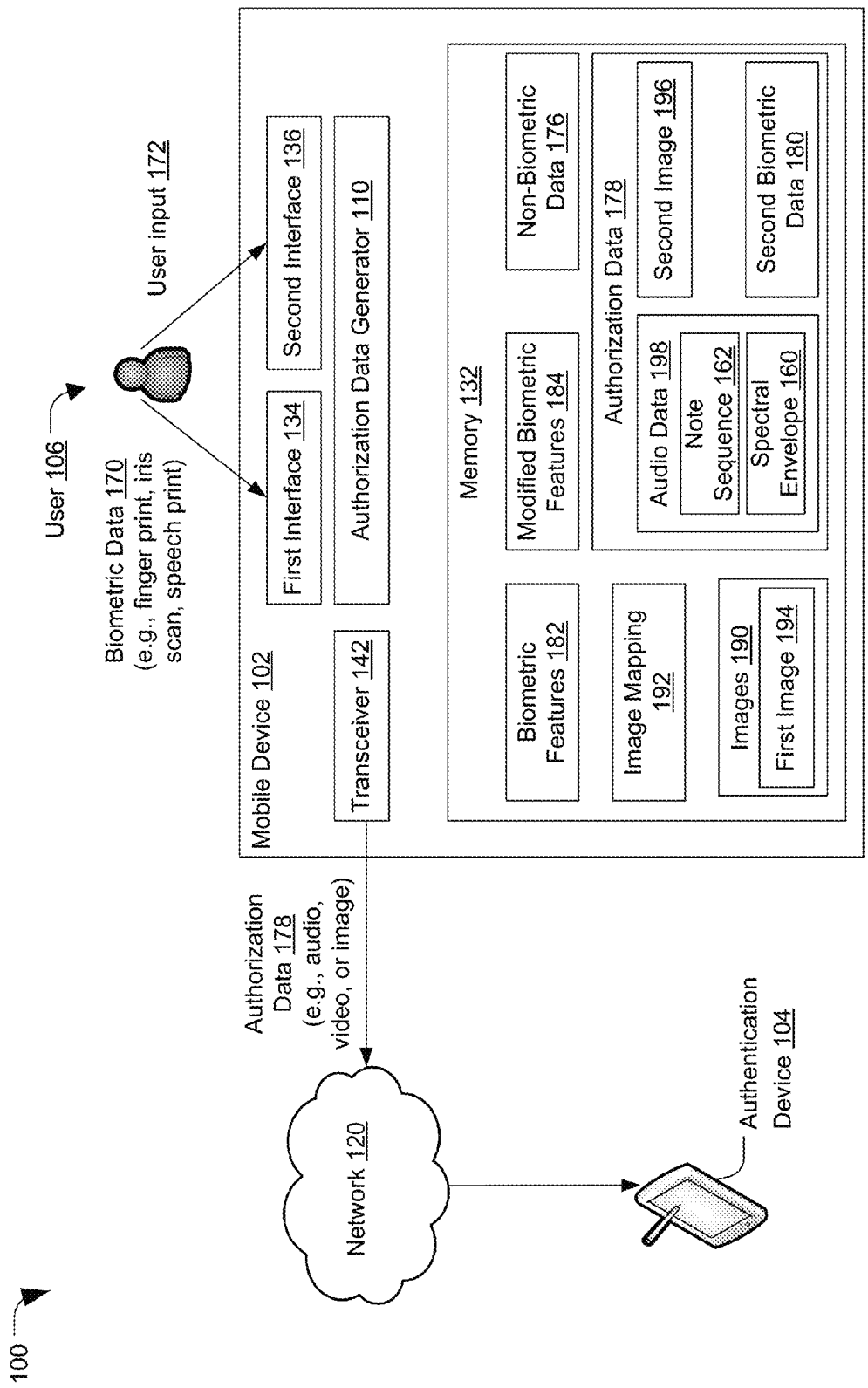
FIG. 1 is a block diagram of a particular illustrative embodiment of a system operable to generate authorization data based on biometric data and non-biometric data.

The principles described herein may be applied, for example, to a headset, a handset, or other device that is configured to generate authorization data. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, it is well understood by a person having ordinary skill in the art, that there may be other blocks or components between the structures being "coupled".

The term "configuration" may be used in reference to a method, apparatus/device, and/or system as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more". The term "and/or" (as in "A and/or B") is used to indicate any of its ordinary meanings, including "A or B", "A and B", or "(A and B) and (A or B)".

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration.

As used herein, the term "communication device" refers to an electronic device that may be used for voice and/or data communication over a wireless communication network. Examples of communication devices include cellular phones, personal digital assistants (PDAs), handheld devices, headsets, wireless modems, laptop computers, personal computers, etc.

Referring to FIG. 1, a particular illustrative embodiment of a system that is operable to generate authorization data based on biometric data and non-biometric data is disclosed and generally designated 100. In a particular embodiment, one or more components of the system 100 are integrated into a communications device, a personal digital assistant (PDA), a tablet, a computer, a music player, a video player, an entertainment unit, a navigation device, or a set top box.

It should be noted that in the following description, various functions performed by the system 100 of FIG. 1 are described as being performed by certain components or modules. However, this division of components and modules is for illustration only. In an alternate embodiment, a function performed by a particular component or module may be divided amongst multiple components or modules.

Moreover, in an alternate embodiment, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The system 100 includes a mobile device 102 coupled, via a network 120, to an authentication device 104. In the example of FIG. 1, the authentication device 104 is illustrated as being a handheld device. In alternative embodiments, the authentication device 104 may be an authentication server, such as an authentication server associated with a financial institution, a home automation system, a cloud computing/storage system, etc. The mobile device 102 includes an authorization data generator 110 coupled to a memory 132. The mobile device 102 may include a first interface 134, a second interface 136, a transceiver 142, or a combination thereof. The authentication device 104 may be associated with or coupled to a computer security system.

During operation, a user 106 may access an enrollment option or an authentication option of the computer security system (e.g., the authentication device 104). For example, the user 106 may use a phone access system, a graphical user interface, an Internet website, and/or an application of the mobile device 102 to access the enrollment option or the authentication option. In response to a selection of the enrollment option (e.g., during an enrollment phase) or in response to a selection of the authentication option (e.g., during an authentication phase), the computer security system (e.g., the authentication device 104) may indicate an option to provide a password. The user 106 may provide biometric data 170 (e.g., a finger print, an iris scan, an image of a face, and/or a speech signal) to the mobile device 102, e.g., in response to the option to provide the password. For example, the user 106 may place a finger on or near a finger print scanner (e.g., a camera) coupled to the mobile device 102 to provide the finger print.

As another example, the user 106 may place an eye on or near an iris scanner (e.g., a camera) coupled to the mobile device 102 to provide the iris scan. As an additional example, the user 106 may use a camera coupled to the mobile device 102 to capture the image of a face. As a further example, the user may speak a phrase (e.g., "one-two-three-four") into a microphone coupled to the mobile device 102 to provide the speech signal. The biometric data 170 may include image data (e.g., the iris scan, the image of the face, or the finger print) or audio data (e.g., the speech signal). In a particular embodiment, the mobile device 102 may receive the biometric data 170 via one or more interfaces (e.g., a first interface 134, a second interface 136, or both). For example, the first interface 134 may be coupled to the finger print scanner, the iris scanner, the camera, or a combination thereof. The second interface 136 may be coupled to the microphone.

The user 106 may also provide user input 172 (e.g., a password) to the mobile device 102. For example, the user 106 may provide the user input 172 by typing at a keyboard or a touchscreen coupled to the mobile device 102. As another example, the user 106 may provide the user input 172 (e.g., an identifier) by placing an identification (ID) card on or near an ID scanner (e.g., a camera) coupled to the mobile device 102. As a further example, the user 106 may provide the user input 172 by speaking (e.g., "one-two-three-four") into a microphone coupled to the mobile device 102. The user input 172 may include text (e.g., a password typed at a keyboard), image data (e.g., a scanned image of a password) or audio data (e.g., a speech signal corresponding to "one-two-three-four").

The authorization data generator 110 may generate a key (e.g., non-biometric data 176) based on the user input 172. The non-biometric data 176 may include an alphanumeric key. For example, the non-biometric data 176 (e.g., "1234") may correspond to text (e.g., "1234") received as user input. As another example, the authorization data generator 110 may perform image recognition on the user input 172 (e.g., an image of "1234") to generate the non-biometric data 176. As a further example, the authorization data generator 110 may perform speech recognition on the user input 172 (e.g., a speech signal corresponding to "one-two-three-four) to generate the non-biometric data 176. In a particular embodiment, the authorization data generator 110 may generate a plurality of key values (e.g., "1", "2", "3", and "4") based on the non-biometric data 176.

In a particular embodiment, the authorization data generator 110 may perform speaker recognition on the user input 172 (e.g., the speech signal corresponding to "one-two-three-four") and may determine a speaker confidence score associated with the speaker recognition. The authorization data generator 110 may perform speech recognition on the user input 172 (e.g., the speech signal corresponding to "one-two-three-four") and may determine text (e.g., "1234") associated with the speech recognition. The authorization data generator 110 may determine the non-biometric data 176 based on the speaker confidence score and the text. The authorization data generator 110 may store the user input 172, the non-biometric data 176, or both, in the memory 132.

The authorization data generator 110 may generate the authorization data 178 based on the biometric data 170 and the non-biometric data 176. For example, the authorization data generator 110 may extract biometric features 182 of the biometric data 170. The authorization data generator 110 may generate modified biometric features 184 by modifying the biometric features 182 based on the non-biometric data 176. For example, the authorization data generator 110 may determine a feature correspondence between each of the biometric features 182 and a particular key value of the plurality of key values. To illustrate, the feature correspondence may indicate that a first subset of the biometric features 182 corresponds to a first key value (e.g., "1") of the plurality of key values, may indicate that a second subset of the biometric features 182 corresponds to a second key value (e.g., "2") of the plurality of key values, and so on. The biometric features 182 may include spikes of a finger print scan, iris features of an iris scan, facial features of an image of a face, or speech features of a speech signal. The authorization data generator 110 may generate the modified biometric features 184 by modifying a particular feature (a particular spike, a particular iris feature, a particular facial feature, or a particular speech feature). For example, the authorization data generator 110 may modify the particular feature to generate a modified feature of the modified biometric features 184 by applying a one-way function to a product, a ratio, a sum, or a difference of the particular feature and a corresponding key value of the plurality of key values. The one-way function may include a hash function, a hyperbolic tangent function, or another hyperbolic function.

The authorization data generator 110 may generate the authorization data 178 (e.g., second biometric data 180, a second image 196, or audio data 198) based on the modified biometric features 184. For example, the modified biometric features 184 may correspond to a modified finger print, a modified iris scan, a modified image of a face, or a modified speech signal. The authorization data generator 110 may generate the second biometric data 180 (e.g., a second finger print scan, a second iris scan, a second image of a face, or a second speech signal) based on the modified biometric features 184, as described with reference to FIGS. 3-4. The authorization data generator 110 may store the second biometric data 180 in the memory 132. The biometric data 170 may be "irrecoverable" or "non-recoverable" from the second biometric data 180 because the second biometric data 180 is generated by applying a one-way function to the biometric data 170, where properties of the one-way function make recovering the biometric data 170 from the second biometric data 180 difficult, impractical, and/or impossible within a reasonable (e.g., threshold) amount of time.

In a particular embodiment, the authorization data generator 110 may select a first image 194 of images 190. The first image 194 may be selected based on the biometric data 170. The images 190 may include non-biometric images. For example, the images 190 may include an image of scenery, an image of a landmark, an image of a cartoon character, an image of a drawing, an image of a logo, etc.

The authorization data generator 110 may generate the second image 196 by modifying the first image 194 based on the non-biometric data 176. For example, the authorization data generator 110 may select the first image 194 based on the modified biometric features 184 and an image mapping 192. The image mapping 192 may map various biometric features to the images 190. For example, the image mappings 192 may indicate that the modified biometric features 184 map to the first image 194. The image mappings 192 may include default values, user preferences, or both.

The authorization data generator 110 may generate the second image 196 by modifying the first image 194 based on the non-biometric data 176. For example, authorization data generator 110 may generate the second image 196 by applying at least one of a rotation function, a scaling function, a noise function, a blurring function, or a shading function to the first image 194 based on the non-biometric data 176, as described with reference to FIG. 6. An extent of modification of the first image 194 may be based on the non-biometric data 176. The authorization data generator 110 may store the second image 196 in the memory 132.

In a particular embodiment, the authorization data generator 110 may generate the audio data 198 by sonifying (e.g., converting to audio data or generating audio data representative of non-audio data) the biometric data 170 based on the non-biometric data 176. For example, the authorization data generator 110 may generate a spectral envelope 160 based on the biometric features 182 and may generate a note sequence 162 based on the non-biometric data 176, as described with reference to FIGS. 3 and 6-7. The audio data 198 may include the spectral envelope 160 and the note sequence 162. The authorization data generator 110 may store the audio data 198 in the memory 132

In a particular embodiment, the authorization data generator 110 may refrain from storing the biometric data 170, the user input 172, or both, in the memory 132. In a particular embodiment, the authorization data generator 110 may, subsequent to generating the authorization data 178, remove (e.g., mark for deletion) the biometric data 170, the user input 172, or both, from the memory 132.

The authorization data generator 110 may provide the authorization data 178 to the user 106. For example, the authorization data generator 110 may display the authorization data 178 at a display device coupled to the mobile device 102 or may output the authorization data 178 via a speaker coupled to the mobile device 102. The user 106 may provide input accepting or rejecting the authorization data 178. The authorization data generator 110 may, in response to receiving the input indicating that the authorization data 178 is rejected by the user 106, prompt the user 106 to provide the biometric data 170 and the user input 172 again and may regenerate the authorization data 178.

The authorization data generator 110 may transmit, via the transceiver 142, the authorization data 178 to the authentication device 104, e.g., in response to receiving the input indicating that the authorization data 178 is accepted by the user 106. For example, the authorization data generator 110 may provide the authorization data 178 to the authentication device 104 as a selection of the option to provide the password to the computer security system. The authorization data generator 110 may encrypt the authorization data 178 based on a particular cryptosystem (e.g., Rivest Shamir Adleman (RSA) algorithm, Diffie-Hellman key exchange scheme, an elliptic curve cryptography scheme, etc.) prior to transmission. In a particular embodiment, the mobile device 102 and the authentication device 104 may conduct an authenticated session when the authenticated device 104 authenticates the user 106 based on the authorization data 178. Encryption of data and conducting authenticated sessions are further described with reference to FIGS. 20-22.

The authentication device 104 may, during the enrollment phase, store the authorization data 178 in memory. The authentication device 104 may, during the authentication phase, compare the authorization data 178 to enrollment authorization data previously stored in the memory and may selectively provide access to the computer security system based on the comparison.

In a particular embodiment, the authorization data generator 110 may align the biometric data 170 prior to generating the authorization data 178. For example, the authorization data generator 110 may have access to other biometric data (e.g., enrollment biometric data). To illustrate, the authorization data generator 110 may receive the enrollment biometric data from the user 106 during an enrollment phase, may generate enrollment authorization data based on the enrollment biometric data, and may provide the enrollment authorization data to the authentication device 104. The authorization data generator 110 may store the enrollment biometric data in the memory 132. The authorization data generator 110 may receive the biometric data 170 during an authentication phase. The authorization data generator 110 may align the biometric data 170 with the enrollment biometric data, as described with reference to FIG. 10, prior to generating the authorization data 178 to increase a likelihood of the authorization data 178 corresponding to the enrollment authorization data.

In a particular embodiment, the biometric data 170 may have a first format (e.g., image or audio). The user input 172 may have a second format (e.g., image, audio, or text). The authorization data 178 may have a third format (e.g., image, audio, or text). The authorization data generator 110 may generate the authorization data 178 by converting the biometric data 170 and the user input 172 to a common format (e.g., the third format). The first format and the second format may be distinct or the same. The third format may be the same as or distinct from the first format, the second format, or both.

For example, the authorization data generator 110 may receive the biometric data 170 in an image format (e.g., a finger print scan, an iris scan, or an image of a face). The authorization data generator 110 may generate the modified biometric features 184 by applying a one-way function to the biometric features 182. The authorization data generator 110 may generate biometric audio 186 based on the modified biometric features 184. For example, the authorization data generator 110 may sonify the modified biometric features 184 to generate the audio data 198, as described with reference to FIG. 7. In a particular embodiment, the authorization data generator 110 may generate intermediate audio data by sonifying the modified biometric features 184 and may generate the audio data 198 by combining the intermediate audio data with the non-biometric data 176 (or an audio version of the non-biometric data 176).

As another example, the authorization data generator 110 may receive the biometric data 170 in an audio format (e.g., a speech signal). The authorization data generator 110 may generate the modified biometric features 184 by applying a one-way function to the biometric features 182. The authorization data generator 110 may generate the second image 196 or the second biometric data 180 (e.g., a synthetic finger print or a synthetic iris scan) based on the modified biometric features 184, as described with reference to FIG. 3. In a particular embodiment, the authorization data generator 110 may generate intermediate image data by performing image processing on the modified biometric features 184 and may generate the second image 196 or the second biometric data 180 by combining the intermediate image with the non-biometric data 176 (or an image corresponding to the non-biometric data 176).

In a particular embodiment, the biometric data 170 may include multiple types of biometric data. For example, the biometric data 170 may include first biometric data corresponding to one of a finger print, an iris scan, or a speech signal of the user 106 and may include second biometric data corresponding to another of a finger print, an iris scan, or a speech signal of the user 106. The biometric data 170 may be received via multiple interfaces. For example, the finger print may be received via the first interface 134 and the speech signal may be received via the second interface 136. The first biometric data and the second biometric data may have a same format (e.g., audio or image) or a distinct format.

The authorization data generator 110 may convert the first biometric data and the second biometric data to a common format and may generate the authorization data 178 by combining the converted biometric data. For example, the first biometric data may include the finger print (e.g., image data) and the second biometric data may include the speech signal (e.g., audio data). The authorization data generator 110 may sonify the first biometric data (e.g., the finger print) and may combine the sonified first biometric data (e.g., the sonified finger print) and the second biometric data (e.g., the speech signal) to generate the biometric data 170, as described with reference to FIG. 14. The authorization data generator 110 may generate the authorization data 178 based on the biometric data 170 and the non-biometric data 176. In a particular embodiment, the non-biometric data 176 may be generated based on the second biometric data. For example, the authorization data generator 110 may perform speech recognition or speaker recognition on the second biometric data to generate the non-biometric data 176, as described herein.

The system 100 of FIG. 1 may thus enable the user 106 to modify a password of a computer security system by providing different non-biometric data. In addition, the password may be based on biometric data and may be more secure than a password based only on non-biometric data. Using a one-way function to generate the password may make the biometric data difficult to derive (e.g., reverse engineer) from the password.

Figure 2:
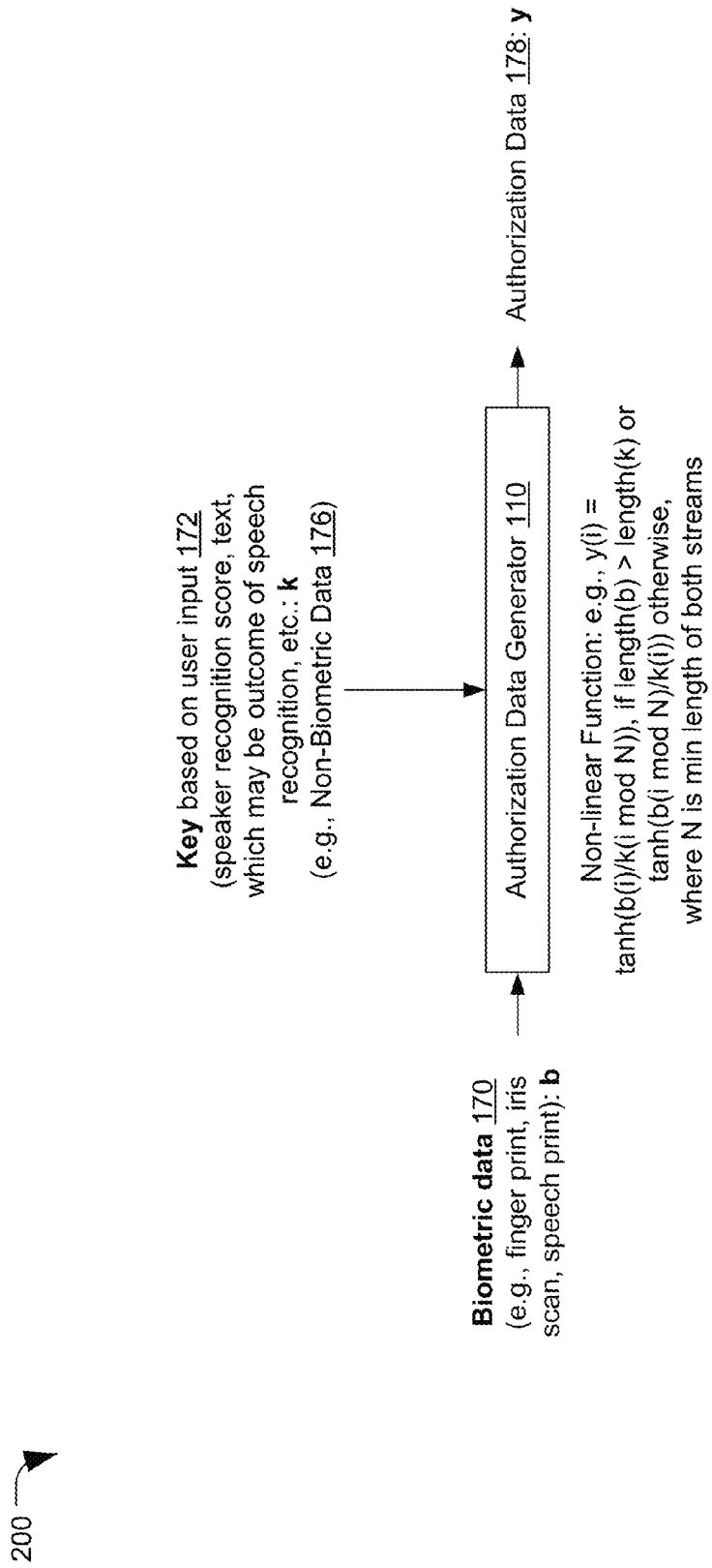
FIG. 2 is a diagram of a particular embodiment of an authorization data generator of the system of FIG. 1.

Referring to FIG. 2, a diagram of a particular embodiment of an authorization data generator is disclosed and generally designated 200. The system 200 may correspond to portions of the system 100 of FIG. 1. For example, the system 200 includes the authorization data generator 110 of FIG. 1.

The authorization data generator 110 may receive the biometric data 170 (e.g., a finger print, an iris scan, an image of a face, and/or a speech print), as described with reference to FIG. 1. The authorization data generator 110 may receive a key (e.g., the non-biometric data 176) based on the user input 172. The non-biometric data 176 (or key) may include a speaker recognition score generated by performing speaker recognition on the user input 172, text (e.g., generated by performing speech recognition on the user input 172), or both.

The authorization data generator 110 may apply a one-way function to the biometric data 170 and the non-biometric data 176 (e.g., the key) to generate the authorization data 178. In a particular embodiment, the one-way function may be a default function, a user selected function, or both. The biometric data 170 (b) may have a first length (length(b)). In a particular embodiment, the first length (length(b)) may correspond to a count of features included in the biometric features 182 of the biometric data 170 (b). For example, the biometric data 170 (b) may include a finger print scan, the biometric features 182 may include spikes of the finger print scan, and the first length (length(b)) may include a count of the spikes. As another example, the biometric features 182 may include iris features, facial features, or speech features. In this example, the first length (length(b)) may include a count of the iris features, a count of the facial features, or a count of the speech features.

The non-biometric data 176 (k) may have a second length (length(k)). In a particular embodiment, the second length (length(k)) may correspond to a count (e.g., 4) of a plurality of key values (e.g., "1", "2", "3", and "4") generated from the non-biometric data 176 (k). In a particular embodiment, k(i) may correspond to a particular key value of the plurality of key values. N may be a minimum of the first length (length(b)) and the second length (length(k)). The authorization data generator 110 may generate a particular value (e.g., y(i)) of the authorization data 178 (y) by apply the one-way function (e.g., a hash function, a hyperbolic tangent function, or another hyperbolic function) to a ratio of corresponding values of b and k. For example, if the first length (length(b)) is greater than the second length (length (k)), the authorization data generator 110 may generate y(i) by applying the one-way function to b(i)/k(i modulus N). As another example, if the first length (length(b)) is less than or equal to the second length (length(k)), the authorization data generator 110 may generate y(i) by applying the one-way function to b(i modulus N)/k(i).

The system 200 may thus generate the authorization data 178 by applying a one-way function to the biometric data 170 and the key (e.g., the non-biometric data 176). The biometric data 170 and the non-biometric data 176 may have distinct lengths or the same length. Using a one-way function to generate the authorization data 178 may make it difficult to derive the biometric data 170 from the authorization data 178 and may thus reduce a risk of the biometric data 170 being compromised.

Figure 3:
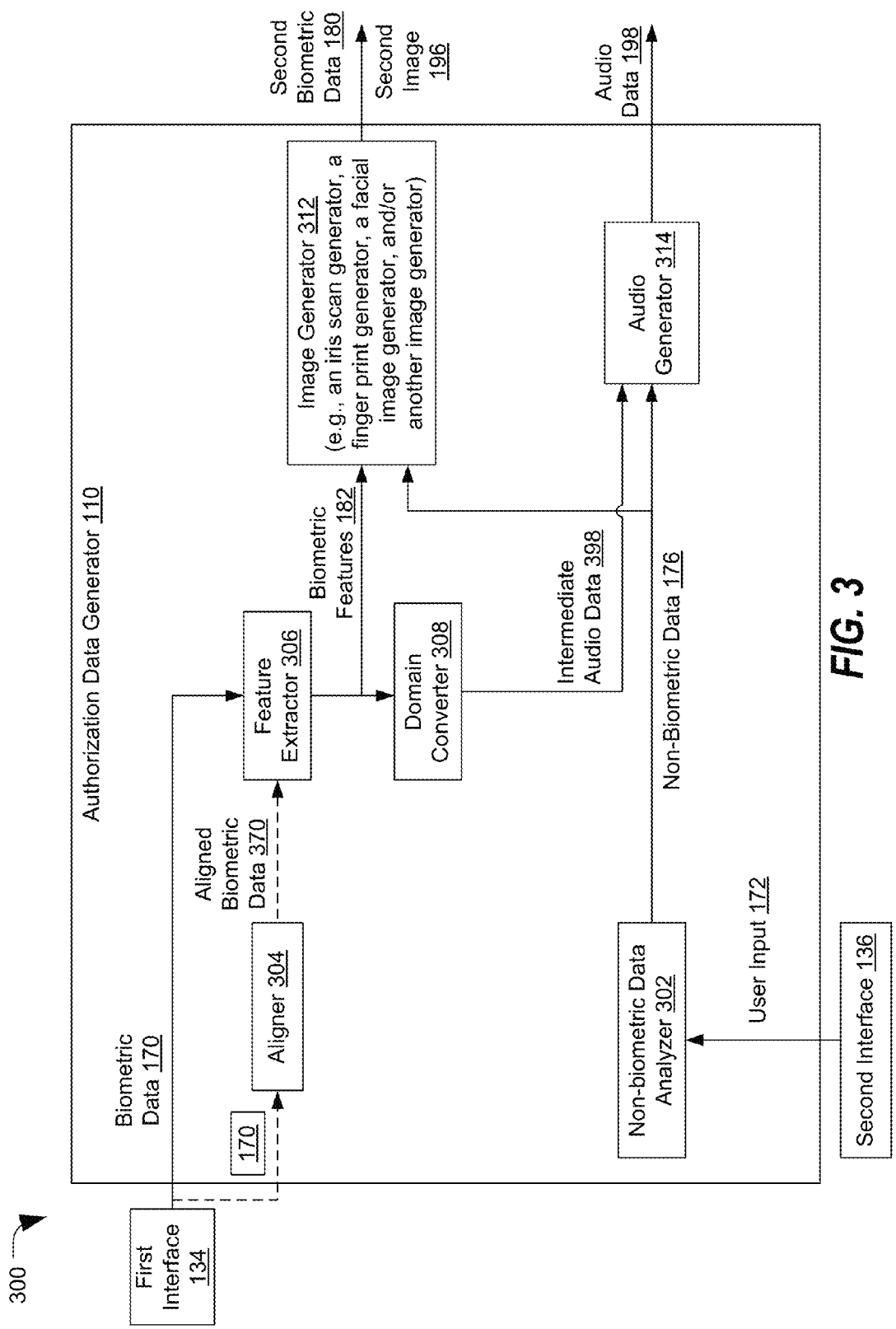
FIG. 3 is a diagram of another particular embodiment of an authorization data generator of the system of FIG. 1.

Referring to FIG. 3, a diagram of a particular embodiment of a system including the authorization data generator 110 is disclosed and generally designated 300. The authorization data generator 110 may include an aligner 304 coupled to a feature extractor 306. The feature extractor 306 may be coupled to a domain converter 308 and to an image generator 312. The authorization data generator 110 may also include a non-biometric data analyzer 302 coupled to the image generator 312. The domain converter 308 and the non-biometric data analyzer 302 may be coupled to an audio generator 314.

In a particular embodiment, the authorization data generator 110 may include fewer components, more components, and/or different components than illustrated in FIG. 3. In a particular embodiment, two or more components of the authorization data generator 110 may be combined. One or more components of the authorization data generator 110 may be implemented in hardware. In a particular embodiment, one or more components of the authorization data generator 110 may include a processor configured to execute instructions to perform one or more operations described herein.

The authorization data generator 110 may receive, via the first interface 134, the biometric data 170 (e.g., a finger print, an iris scan, an image of a face, and/or a speech print), as described with reference to FIG. 1. For example, the aligner 304, the feature extractor 306, or both, may receive the biometric data 170 via the first interface 134. For example, the aligner 304 may receive the biometric data 170 when the biometric data 170 is received during an enrollment phase. The aligner 304 may generate aligned biometric data 370 based on the biometric data 170, as further described with reference to FIG. 4. The aligner 304 may provide the aligned biometric data 370 to the feature extractor 306.

The feature extractor 306 may generate the biometric features 182 based on the biometric data 170 or the aligned biometric data 370, as further described with reference to FIG. 4. The feature extractor 306 may provide the biometric features 182 to the domain converter 308 and to the image generator 312.

The domain converter 308 may generate intermediate audio data 398, as further described with reference to FIG. 4. For example, the biometric data 170 may be in a first domain or format (e.g., image or audio). The domain converter 308 may perform feature domain transfer on the biometric features 182 to generate intermediate data in a second domain or format (e.g., the intermediate audio data 398 or intermediate image data), as further described with reference to FIG. 4.

The domain converter 308 may provide the intermediate audio data 398 to the audio generator 314. The non-biometric data analyzer 302 may receive the user input 172 via the second interface 136. The non-biometric data analyzer 302 may generate the non-biometric data 176 based on the user input 172, as described with reference to FIG. 1. The non-biometric data analyzer 302 may provide the non-biometric data 176 to the image generator 312 and to the audio generator 314. The image generator 312 may generate the second biometric data 180, the second image 196, or both, as further described with reference to FIG. 4. The audio generator 314 may generate the audio data 198 based on the intermediate audio data 398 and the non-biometric data 176, as further described with reference to FIG. 4.

The authorization data generator 110 may thus enable receiving biometric data in a first domain (e.g., image or audio) and generating authorization data in a second domain (e.g., audio or image). A user may thus provide biometric data in a first format and generate authorization data in a second format. For example, the user may provide biometric data in an image format and use a plain old telephone service (POTS) device (or a device that is configured to place voice calls) to send the authorization data in an audio format to an authentication device. To illustrate, the authorization data may include a POTS-compatible analog audio signal in a frequency range of 300 hertz (Hz) to 3400 Hz.

Figure 4:
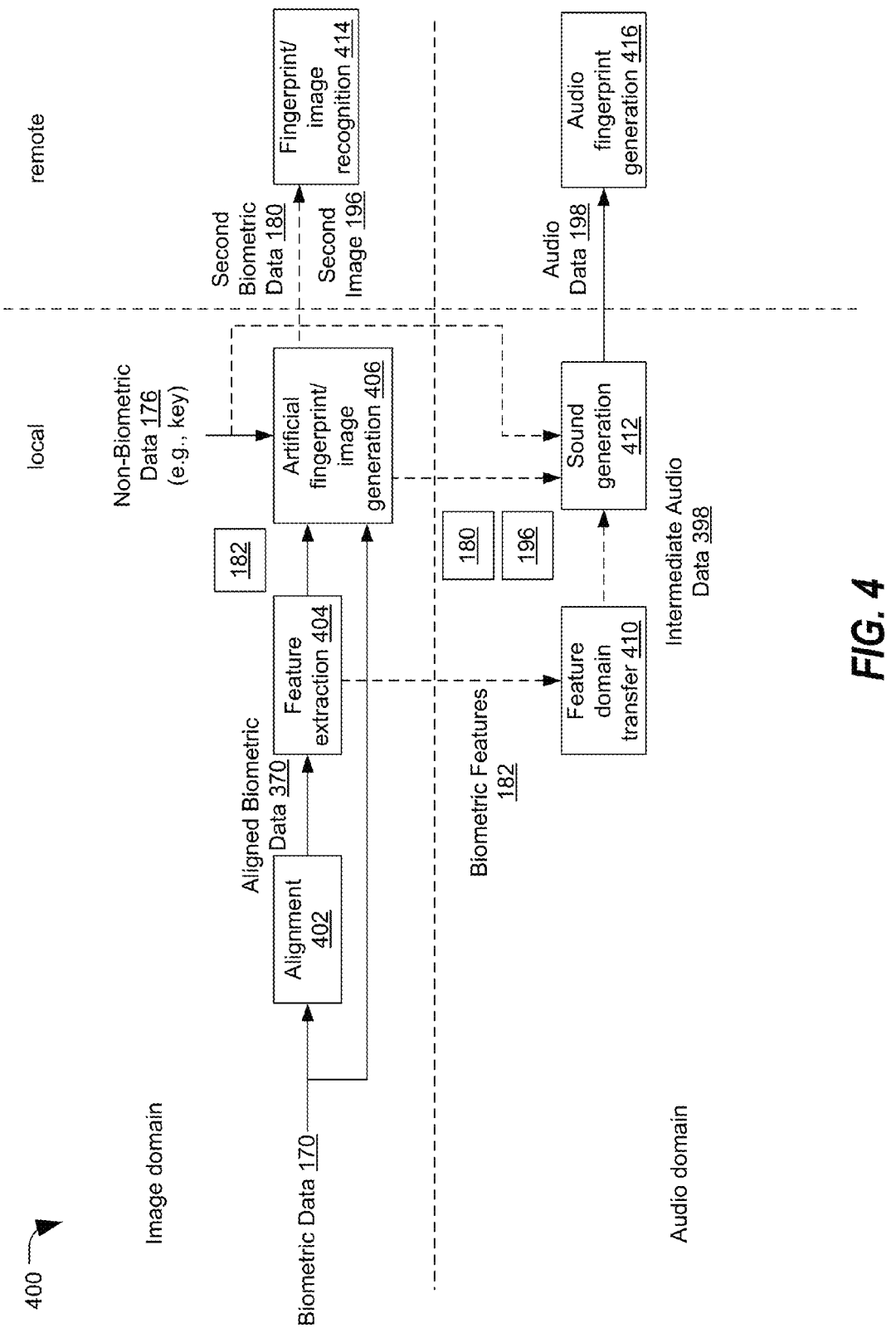
FIG. 4 is a diagram of particular embodiments of methods of generating authorization data based on biometric data and non-biometric data.

Referring to FIG. 4, a diagram of a particular embodiment of a method of generating authorization data based on biometric data and non-biometric is disclosed and generally designated 400. The method 400 may be performed by the system 100 of FIG. 1, the system 300 of FIG. 3, or both. For example, one or more operations of the method 400 may be performed by the authorization data generator 110, the mobile device 102, the authentication device 104, or a combination thereof.

One or more local operations indicated by 402, 404, 406, 410, and 412 may be performed by the authorization data generator 110 of FIG. 1. One or more remote operations indicated by 414 and 416 may be performed by the authentication device 104 of FIG. 1. In a particular embodiment, the authorization data generator 110, the authentication device 104, or both, may perform image domain operations indicated by 402, 404, 406, and 414, may perform audio domain operations indicated by 410, 412, and 416, or a combination thereof.

During operation, the authorization data generator 110 may receive the biometric data 170 and the non-biometric data 176 (e.g., a key, such as a password). The method 400 may include alignment, at 402. For example, the authorization data generator 110 may receive the biometric data 170 and the non-biometric data 176, as described with reference to FIG. 1. The aligner 304 of FIG. 3 may modify (e.g., apply a rotation function, a translation function, or a scaling function to) the biometric data 170 to align certain features of the biometric data 170 and other biometric data (e.g., template biometric data or enrollment biometric data), as described with reference to FIG. 9, to generate aligned biometric data 370. For example, the authorization data generator 110 may receive the enrollment biometric data during an enrollment phase, may receive the biometric data 170 during an authentication phase, and may align the biometric data 170 with the enrollment biometric data to generate the aligned biometric data 370. As another example, the authorization data generator 110 may receive the biometric data 170 during an enrollment phase and may align the biometric data 170 with template biometric data to generate the aligned biometric data 370. The template biometric data may include default data.

The method 400 may also include feature extraction at 404. For example, the feature extractor 306 of FIG. 3 may extract biometric features 182 from the biometric data 170 (or the aligned biometric data 370). To illustrate, if the biometric data 170 corresponds to a finger print (e.g., a finger print scan image), the biometric features 182 may indicate spikes (e.g., singular points and minutiae) of the finger print, as described with reference to FIG. 8. The authorization data generator 110 may use finger print feature extraction techniques to extract the biometric features 182. For example, the authorization data generator 110 may use image processing (e.g., conversion to grey scale, binarization, template pattern matching, etc.) to extract the biometric features 182 from the finger print scan image.

As another example, if the biometric data 170 (e.g., an iris scan image) corresponds to an iris scan, the biometric features 182 may indicate at least one of a radial furrow, a concentric furrow, a crypt, a collarette, or a pupil size. The authorization data generator 110 may use iris feature extraction techniques to extract the biometric features 182. For example, the authorization data generator 110 may use image processing (e.g., segmentation, normalization, template matching, etc.) to extract the biometric features 182 from the iris scan image.

As a further example, if the biometric data 170 corresponds to an image of a face, the biometric features 182 may indicate at least one of a size, a shape, or a position of an eye, a nose, a mouth, or a head. The authorization data generator 110 may use facial feature extraction techniques to extract the biometric features 182. For example, the authorization data generator 110 may use image processing (e.g., conversion to grey scale, Gabor filter application, etc.) to extract the biometric features 182 from the image of the face.

As an additional example, if the biometric data 170 corresponds to a speech signal, the biometric features 182 may indicate formant location and spectral tilt of the speech signal. The authorization data generator 110 may use speech signal processing (e.g., generate mel-frequency cepstral coefficients (MFCC), linear predictive cepstral coefficients (LPCC), or mel-frequency discrete wavelet coefficient (MFDWC)) to generate the biometric features 182 (e.g., an estimated spectral envelope) corresponding to the speech signal.

The method 400 may further include artificial finger print/image generation, at 406. For example, the image generator 312 of FIG. 3 may generate the second biometric data 180 based on the biometric features 182. The image generator 312 may apply a one-way function to the biometric features 182 to generate the modified biometric features 184 of FIG. 1 based on the non-biometric data 176, as described herein. The one-way function may include a hash function, a hyperbolic tangent function, or another hyperbolic function. The image generator 312 may distribute the non-biometric data 176 to the biometric features 182 based on a one-way function to generate the modified biometric features 184.

The image generator 312 may generate each modified feature value of the modified biometric features 184 by applying the one-way function to a key value of the non-biometric data 176 and a feature value of the biometric features 182. In a particular embodiment, the image generator 312 may apply the one-way function to a ratio, a product, a sum, and/or a difference of the key value and the feature value to generate the modified feature value.

For example, if the biometric data 170 corresponds to a finger print (e.g., a finger print scan image), the biometric features 182 may indicate spikes (e.g., singular points and minutiae) of the finger print. The image generator 312 may apply the one-way function to the biometric features 182 to modify the spikes.

As another example, if the biometric data 170 (e.g., an iris scan image) corresponds to an iris scan, the biometric features 182 may indicate at least one of a radial furrow, a concentric furrow, a crypt, a collarette, or a pupil size. The image generator 312 may apply the one-way function to the biometric features 182 to modify the at least one of the radial furrow, the concentric furrow, the crypt, the collarette, or the pupil size to generate the modified biometric features 184.

As a further example, if the biometric data 170 corresponds to an image of a face, the biometric features 182 may indicate at least one of a size, a shape, or a position of an eye, a nose, a mouth, or a head. The image generator 312 may apply the one-way function to the biometric features 182 to modify the at least one of the size, the shape, or the position of the eyes, the nose, the mouth, or the head to generate the modified biometric features 184.

As an additional example, if the biometric data 170 corresponds to a speech signal, the biometric features 182 may indicate formant location and spectral tilt of the speech signal. The image generator 312 may apply the one-way function to the biometric features 182 to modify the formant location and/or the spectral tilt to generate the modified biometric features 184.

In a particular embodiment, the image generator 312 may apply a rotation function, a scaling function, a blurring function, a shading function, a noise function, or a combination thereof, to the biometric features 182, the biometric data 170, or the aligned biometric data 370 to generate the modified biometric features 184, the second biometric data 180, or both.

The image generator 312 may generate the second biometric data 180 based on the modified biometric features 184. For example, if the biometric data 170 corresponds to a finger print (e.g., a finger print scan image), the image generator 312 may use synthetic finger print generation techniques to generate the second biometric data 180 corresponding to the modified spikes indicated by the modified biometric features 184.

As another example, if the biometric data 170 (e.g., an iris scan image) corresponds to an iris scan, the image generator 312 may use synthetic iris scan generation techniques to generate the second biometric data 180 corresponding to the modified radial furrow, the modified concentric furrow, the modified crypt, the modified collarette, and/or the modified pupil size as indicated by modified biometric features 184.

As a further example, if the biometric data 170 corresponds to an image of a face, the image generator 312 may use synthetic facial image generation techniques to generate the second biometric data 180 corresponding to the modified size, the modified shape, or the modified position of the eye, the nose, the mouth, or the head indicated by the modified biometric features 184.

As an additional example, if the biometric data 170 corresponds to a speech signal, the image generator 312 may use synthetic voice generation techniques to generate the second biometric data 180 corresponding to the modified formant location and/or the modified spectral tilt indicated by the modified biometric features 184.

As another example, the image generator 312 may select the first image 194 of FIG. 1 based on the biometric features 182. To illustrate, the image mapping 192 of FIG. 1 may indicate a mapping between the biometric features 182 and the first image 194, and the image generator 312 may select the first image 194 based on the mapping. The image generator 312 may generate the second image 196 by modifying the first image 194 based on the non-biometric data 176, as described with reference to FIG. 1.

The method 400 may also, or in the alternative, include feature domain transfer, at 410. For example, the authorization data generator 110 of FIG. 1 may receive the biometric data 170 in a first domain or format (e.g., image or audio). The domain converter 308 of FIG. 3 may perform feature domain transfer on the biometric features 182 to generate intermediate data in a second domain or format (e.g., the intermediate audio data 398 or intermediate image data).

In a particular embodiment, the authorization data generator 110 may receive the biometric data 170 as image data (e.g., a finger print scan, an iris scan, or an image of a face) and the domain converter 308 may sonify the biometric features 182 to generate the intermediate audio data 398. For example, the authorization data generator 110 may generate the spectral envelope 160 based on the biometric features 182, as described with reference to FIG. 6. The spectral envelope 160 may correspond to the intermediate audio data 398.

In another particular embodiment, the authorization data generator 110 may receive the biometric data 170 as audio data (e.g., a speech signal) and the domain converter 308 may generate intermediate image data based on the biometric features 182. The intermediate image data may include synthesized biometric data or a particular image of the images 190. For example, the biometric features 182 may indicate an estimated spectral envelope of the speech signal. The domain converter 308 may modify a biometric template (e.g., an iris scan template, a finger print template, a template facial image) based on the estimated spectral envelope to generate the synthesized biometric data.

The method 400 may further include sound generation, at 412. For example, the audio generator 314 of FIG. 3 may generate the audio data 198 based on the intermediate audio data 398 (e.g., the spectral envelope 160) and the non-biometric data 176. To illustrate, the audio generator 314 may generate the note sequence 162 based on the non-biometric data 176, as described with reference to FIG. 6. The audio data 198 may include the spectral envelope 160 and the note sequence 162.

In a particular embodiment, the image generator 312 of FIG. 3 may generate the second biometric data 180 or the second image 196 based on the intermediate image data. For example, the image generator 312 may modify the intermediate image data (e.g., synthesized biometric data or the particular image of the images 190) based on the non-biometric data 176. In a particular embodiment, the image generator 312 may apply a rotation function, a scaling function, a shading function, a blurring function, a noise function, or a combination thereof to the synthesized biometric data (or the particular image) to generate the second biometric data 180 (or the second image 196).

The method 400 may also include finger print/image recognition, at 414. For example, the authorization data generator 110 of FIG. 1 may provide the second biometric data 180 or the second image 196 to the authentication device 104. The authentication device 104 may perform image recognition by comparing the second biometric data 180 or the second image 196 to another image. For example, the other image may be received by the authentication device 104 during an enrollment phase and may be stored in memory. The authentication device 104 may selectively provide access to a computer security system based on the comparison. For example, the authentication device 104 may generate a similarity (or confidence) score based on the comparison and may provide access to the computer security system based on determining that the similarity score satisfies a particular threshold. In a particular embodiment, the authentication device 104 may receive the second biometric data 180 or the second image 196 during an enrollment phase and may store the second biometric data 180 or the second image 196 in memory.

The method 400 may also or in the alternative include audio finger print generation, at 416. For example, the authorization data generator 110 of FIG. 1 may provide the audio data 198 to the authentication device 104. The authentication device 104 may perform audio finger print recognition by comparing the audio data 198 to another audio data. For example, the other audio data may be received by the authentication device 104 during an enrollment phase and may be stored in memory. The authentication device 104 may selectively provide access to a computer security system based on the comparison. For example, the authentication device 104 may generate a similarity (or confidence) score based on the comparison and may provide access to the computer security system based on determining that the similarity score satisfies a particular threshold. In a particular embodiment, the authentication device 104 may receive the audio data 198 during an enrollment phase and may store the audio data 198 in memory.

In a particular embodiment, the authorization data generator 110 may perform one or more operations of the method 400 based on a user preference. For example, if the user preference indicates that image authorization data is to be generated, the authorization data generator 110 may perform 402, 404, and 406. In this example, the authentication device 104 may perform 414. As another example, if the user preference indicates that audio authorization data is to be generated, the authorization data generator 110 may perform 402, 404, 410, and 412. In this example, the authentication device 104 may perform 416.

In a particular embodiment, the authorization data generator 110 may perform one or more operations of the method 400 based on a mode of authorization data transmission. For example, the authorization data generator 110 may perform 402, 404, 410, and 412 in response to determining that the mode of authorization data transmission corresponds to a plain old telephone service (POTS). In this example, the authentication device 104 may perform 416. As another example, the authorization data generator 110 may perform 402, 404, 406, 410, and 412 in response to determining that the mode of authorization data transmission corresponds to an Internet. To illustrate, the authorization data generator 110 may transmit the second biometric data 180, the second image 196, the audio data 198, or a combination thereof. In this example, the authentication device 104 may perform 414, 416, or both.

In a particular embodiment, the authorization data generator 110 may perform operations 402, 404, 406, and 412. For example, the authorization data generator 110 may receive the biometric data 170 in an image domain. The authorization data generator 110 may perform alignment 402 to generate the aligned biometric data 370 based on the biometric data 170, may perform feature extraction 404 to generate the biometric features 182 based on the aligned biometric data 370, and may perform artificial finger print/image generation 406 to generate the second biometric data 180, the second image 196, or both, based on the biometric data 170, the biometric features 182, and/or the non-biometric data 176. The authorization data generator 110 may perform sound generation 412 based on the second biometric data 180, the second image 196, or both. The authorization data generator 110 may generate the audio data 198 by sonifying the second biometric data 180, the second image 196, or both.

An audio data mapping may map the images (e.g., the images 190, modified versions of the images 190, and/or the second image 196) to audio data (e.g., spectral envelopes, sound waves, etc.). The authorization data generator 110 may select the audio data 198 (e.g., a spectral envelope, a sound wave, etc.) based on the audio data mapping and the second image 196. As another example, the authorization data generator 110 may generate the audio data 198 (e.g., a spectral envelope) based on the second biometric data 180. The authorization data generator 110 may provide the audio data 198 to the authentication device 104. The authentication device 104 may perform operation 416 based on the audio data 198.

The method 400 may thus enable receiving biometric data in a first domain (e.g., image or audio) and generating authorization data in a second domain (e.g., audio or image).

A user may thus provide biometric data in a first format and generate authorization data in a second format. For example, the user may provide biometric data in an image format and use a plain old telephone service (POTS) device (or a device that is configured to place voice calls) to send the authorization data in an audio format to an authentication device.

Figure 5:
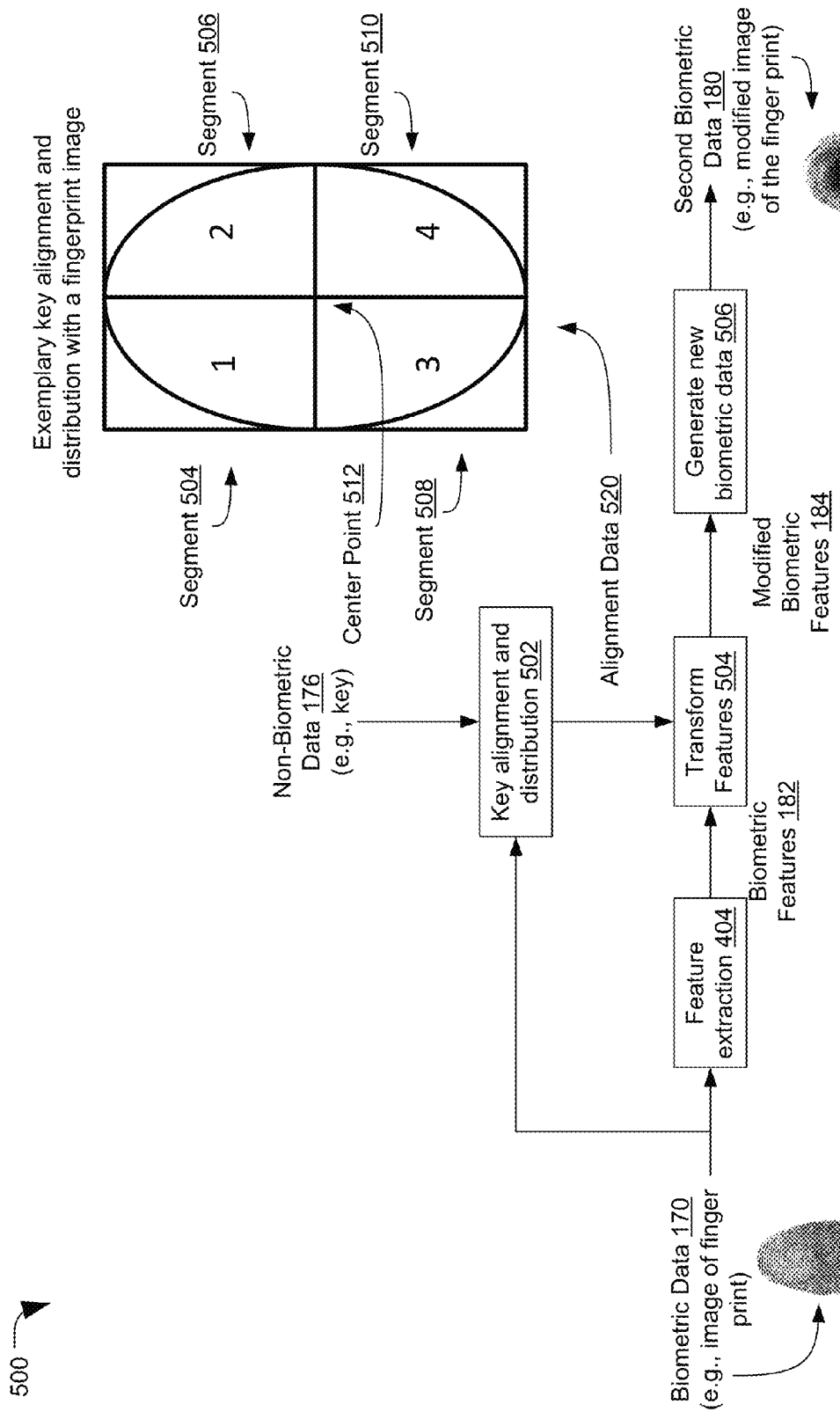
FIG. 5 is a diagram of a particular embodiment of a method of generating authorization data including second biometric data based on first biometric data and non-biometric data.

Referring to FIG. 5, a diagram of a particular embodiment of a method of generating authorization data is shown and generally designated 500. The authorization data may include second biometric data generated based on first biometric data. In a particular embodiment, the method 500 may be performed by the authorization data generator 110 of FIG. 1. The method 500 may include feature extraction 404 of FIG. 4. For example, the authorization data generator 110 of FIG. 1 may generate the biometric features 182 based on the biometric data 170, as described with reference to FIGS. 1 and 3-4.

In a particular embodiment, the biometric data 170 may correspond to a finger print scan. The authorization data generator 110 may generate a density map and a directional map based on the finger print scan. For example, the finger print scan may indicate spikes including a plurality of ridge lines. The authorization data generator 110 may generate the density map to indicate a density of the plurality of ridge lines, and may generate the directional map to indicate orientations of tangents to the plurality of ridge lines. The biometric features 182 may include the directional map and the density map.

The method 500 may also include performing key alignment and distribution, at 502. For example, the authorization data generator 110 of FIG. 1 may perform key alignment and distribution on the non-biometric data 176 and the biometric data 170 to generate the alignment data 520. The authorization data generator 110 may align the biometric data 170 by identifying a center point 512 of the biometric data 170. For example, the biometric data 170 may correspond to an iris scan, a finger print scan, an image of a face, or a speech signal. The authorization data generator 110 may align the biometric data 170 by identifying the center point 512 as a center (or centroid) of an iris indicated by the iris scan, as a center (or centroid) of a finger indicated by the finger print scan, as a center (or centroid) of a nose indicated by the image of the face, or as a mid-point of an utterance indicated by the speech signal.

The non-biometric data 176 may include a first number (e.g., 4) of values (k) (e.g., "1", "2", "3", and "4"). The authorization data generator 110 may distribute the non-biometric data 176 by dividing the biometric data 170 (e.g., a finger print scan, an iris scan, an image of a face, or a speech signal) into the first number (e.g., 4) of segments (b) based on the center point 512.

The alignment data 520 may indicate a particular value (e.g., k(i)) of the non-biometric data 176 corresponding to each segment (e.g., b(i)) of the biometric data 170. For example, the alignment data 520 may indicate that a segment 504 (e.g., b(0)) of the biometric data 170 corresponds to a first key value (e.g., k(0)=1) of the non-biometric data 176, a segment 506 (e.g., b(1)) of the biometric data 170 corresponds to a second key value (e.g., k(1)=2) of the non-biometric data 176, a segment 508 (e.g., b(2)) of the biometric data 170 corresponds to a third key value (e.g., k(2)=3) of the non-biometric data 176, and a segment 510 (e.g., b(3)) of the biometric data 170 corresponds to a fourth key value (e.g., k(3)=4).

For example, if the biometric data 170 corresponds to a finger print scan, each segment of the segments 504, 506, 508, and 510 may correspond to a distinct portion of a finger print. As another example, if the biometric data 170 corresponds to an iris scan, each segment of the segments 504, 506, 508, and 510 may correspond to a distinct portion of an image of an iris. As a further example, if the biometric data 170 corresponds to an image of a face, each of the segments 504, 506, 508, and 510 may correspond to a distinct portion of the image of the face. As an additional example, if the biometric data 170 corresponds to a speech signal, each of the segments 504, 506, 508, and 510 may correspond to a distinct portion of the speech signal.

The method 500 may further include transforming features, at 504. For example, the authorization data generator 110 of FIG. 1 may modify the biometric features 182 based on the alignment data 520 to generate the modified biometric features 184. To illustrate, the authorization data generator 110 may generate each modified feature (e.g., y(i)) of the modified biometric features 184 by applying a one-way function to each biometric value (e.g., b(i)) and a corresponding key value (e.g., k(i)) indicated by the alignment data 520. For example, the authorization data generator 110 may generate each segment of the second biometric data 180 by applying a one-way function to a particular segment of the segments 504, 506, 508, and 510 and a corresponding key value (e.g., 1, 2, 3, or 4).

In a particular embodiment, the biometric data 170 corresponds to a finger print scan and the biometric features 182 correspond to spikes of a finger print. In this embodiment, the modified biometric features 184 correspond to modified spikes. For example, the authorization data generator 110 may modify a location, an angle, or a size of a spike based on the non-biometric data 176 to generate the modified biometric features 184.

The authorization data generator 110 may generate a modified density map based on a one-way function, the density map, the spikes of the first finger print, and the non-biometric data 176. In a particular embodiment, a particular value of the modified density map may correspond to:

$$f(x(i), y(i)) = \tanh\left(\frac{f'(x(i), y(i))}{k(i)}\right), \quad \text{Equation 1}$$

where x(i)=x-coordinate of spike i, y(i)=y-coordinate of spike i, k(i)=key value of non-biometric data 176 corresponding to spike i, f'(x(i), y(i))=value of density map corresponding to x(i) and y(i), and f(x(i), y(i))=value of modified density map corresponding to x(i) and y(i).

For example, the authorization data generator 110 may determine an x-coordinate x(i) and a y-coordinate y(i) corresponding to each spike of the spikes based on the biometric data 170. The authorization data generator 110 may determine a density value f'(x(i), y(i)) of the density map corresponding to x(i) and y(i). The authorization data generator 110 may determine a key value k(i) corresponding to the spike based on the non-biometric data 176. The authorization data generator 110 may determine a modified density value f(x(i), y(i)) corresponding to the spike by applying a one-way function (e.g., a hyperbolic tangent function) to a ratio of the density value f'(x(i), y(i)) and the key value k(i).

The authorization data generator 110 may generate a modified directional map based on a one-way function, the spikes of the finger print, the directional map, and the non-biometric data 176. The authorization data generator

110 may use a first one-way function to generate the modified density map and may use a second one-way function to generate the modified directional map. The first one-way function and the second one-way function may be the same functions or distinct functions. In a particular embodiment, a particular value of the modified directional map may correspond to:

$$f(x(i), y(i)) = f'\left(\tanh\left(\frac{x(i)}{k(i)}\right), \tanh\left(\frac{y(i)}{k(i)}\right)\right), \quad \text{Equation 2}$$

where x(i)=x-coordinate of spike i, y(i)=y-coordinate of spike i, k(i)=key value of non-biometric data 176 corresponding to spike i, f'(x(i), y(i))=value of directional map corresponding to x(i) and y(i), and f(x(i), y(i))=value of modified density map corresponding to x(i) and y(i).

For example, the authorization data generator 110 may determine an x-coordinate x(i) and a y-coordinate y(i) corresponding to a particular spike of the spikes based on the biometric data 170. The authorization data generator 110 may determine a key value k(i) corresponding to the particular spike based on the non-biometric data 176. The authorization data generator 110 may determine a modified x-coordinate by applying a one-way function to a ratio of x(i) and key(i) and may determine a modified y-coordinate by applying the one-way function to a ration of y(i) and key(i). The authorization data generator 110 may determine a directional value $$f'\left(\tanh\left(\frac{x(i)}{k(i)}\right), \tanh\left(\frac{y(i)}{k(i)}\right)\right)$$

of the density map corresponding to the modified x-coordinate and the modified y-coordinate. The authorization data generator 110 may determine a modified directional value f(x(i), y(i)) corresponding to the particular spike based on the directional value. In a particular embodiment, the authorization data generator 110 may generate the modified directional map by moving directional values of a directional map to different coordinates based on the one-way function and the non-biometric data 176.

In a particular embodiment, a particular value of the modified density map may correspond to:

$$f(x(i),y(i))=k(i)^{f'(x(i),y(i))} \bmod p, \quad \text{Equation 3}$$

where x(i)=x-coordinate of spike i, y(i)=y-coordinate of spike i, k(i)=key value of non-biometric data 176 corresponding to spike i, f'(x(i), y(i))=value of density map corresponding to x(i) and y(i), f(x(i), y(i))=value of modified density map corresponding to x(i) and y(i), and p is a particular number (e.g., a prime number).

For example, the authorization data generator 110 may determine an x-coordinate x(i) and a y-coordinate y(i) corresponding to each spike based on the biometric data 170. The authorization data generator 110 may determine a density value f'(x(i),y(i)) of the density map corresponding to x(i) and y(i). The authorization data generator 110 may determine a key value k(i) corresponding to the spike based on the non-biometric data 176. The authorization data generator 110 may determine a modified density value f(x(i), y(i)) corresponding to the spike by applying a one-way function (e.g., a modulo function and an exponent function) to the k(i) value and the density value f'(x(i), y(i)).

The authorization data generator 110 may generate a modified directional map based on a one-way function, the spikes of the finger print, the directional map, and the non-biometric data 176. In a particular embodiment, a particular value of the modified directional map may correspond to:

$$f(x(i),y(i))=(k(i)^{x(i)} \bmod p, k(i)^{y(i)} \bmod p), \quad \text{Equation 4,}$$

where x(i)=x-coordinate of spike i, y(i)=y-coordinate of spike i, k(i)=key value of non-biometric data 176 corresponding to spike i, f'(x(i), y(i))=value of directional map corresponding to x(i) and y(i), and f(x(i), y(i))=value of modified density map corresponding to x(i) and y(i).

For example, the authorization data generator 110 may determine an x-coordinate x(i) and a y-coordinate y(i) corresponding to each spike of the spikes based on the biometric data 170. The authorization data generator 110 may determine a key value k(i) corresponding to the spike based on the non-biometric data 176. The authorization data generator 110 may determine a modified x-coordinate by applying a one-way function (e.g., a modulo function and an exponential function) to x(i) and key(i) and may determine a modified y-coordinate by applying the one-way function to y(i) and key(i). The authorization data generator 110 may determine a directional value f'(k(i)^{x(i)} mod p, k(i)^{y(i)} mod p) of the density map corresponding to the modified x-coordinate and the modified y-coordinate. The authorization data generator 110 may determine a modified directional value f(x(i), y(i)) corresponding to the spike based on the directional value. In a particular embodiment, the authorization data generator 110 may generate the modified directional map by moving directional values of directional map to different coordinates based on the one-way function and the non-biometric data 176.

In a particular embodiment, the authorization data generator 110 may perform post-processing of the density map. For example, the authorization data generator 110 may modify a particular value of the density map based on:

$$f(x(i),y(i))=f(x(i),y(i))^{common} \bmod p, \quad \text{Equation 5,}$$

where common is a particular number. For example, common may include a common key (e.g., alphanumeric non-biometric data) that is shared between or provided to both the mobile device 102 and the authentication device 104. In a particular embodiment, the authorization data generator 110 of the mobile device 102 may generate synthetic biometric data (e.g., a density map) of the user 106 and an authorization data generator 110 of the authentication device 104 may generate synthetic biometric data (e.g., a density map) of the authentication device 104, as described with reference to FIGS. 20-21. Density maps of the user 106 and the authentication device 104 may be modified based on $$f(x(i),y(i))=f(x(i),y(i)^{common} \bmod p, \quad \text{Equation 5.}$$

In a particular embodiment, the authorization data generator 110 of the mobile device 102 and the authorization data generator of the authentication device 104 may modify the density maps of the mobile device 102 and the authentication device 104 to include a common number of features (e.g., spikes). For example, a first density map of the mobile device 102 may include a first number of features (e.g., 6) and a second density map of the authentication device 104 may include a second number (e.g., 5) of features. The first number of features may be lower (or greater) than the second number of features. A first modified density map of the mobile device 102 may include the first number of features (or the second number of features). A second modified density map of the authentication device 104 may include the first number of features (or the second number of features).

In a particular embodiment, the authorization data generator 110 may modify a shape and/or a size of the finger print to generate the modified biometric features 184. In a particular embodiment, the authorization data generator 110 may apply a blurring function, a rotation function, a shading function, a noise function, or a combination thereof, based on the non-biometric data 176 to the biometric features 182 to generate the modified biometric features 184.

The method 500 may also include generating new biometric data, at 506. For example, the authorization data generator 110 of FIG. 1 may generate the second biometric data 180 based on the modified biometric features 184, as described with reference to FIGS. 1 and 4. The biometric data 170 may correspond to a finger print, an iris scan, an image of a face, or a speech signal. The authorization data generator 110 may generate a second finger print, a second iris scan, a second image of a second face, or a second speech signal based on the modified biometric features 184, and the second biometric data 180 may include the second finger print, the second iris scan, the second image of the second face, or the second speech signal.

For example, authorization data generator 110 may generate the second finger print based on the modified spikes, the modified density map, and the modified directional map. To illustrate, the authorization data generator 110 may generate an intermediate finger print by applying a first filter to the modified spikes. The first filter may correspond to the modified directional map. The authorization data generator 110 may generate the second finger print by applying a second filter to the intermediate finger print. The second filter may correspond to the modified density map.

In a particular embodiment, the second finger print may include the modified spike, may have the modified size, may have the modified shape, or a combination thereof. In a particular embodiment, the second finger print or portions of the second finger print may be blurred, rotated, shaded, noisy, or a combination thereof, as compared to the finger print.

The method 500 may thus enable generation of second biometric data by modifying first biometric data of a user based on non-biometric data. The user may use the second biometric data during enrollment and authentication with a computer security system that uses biometric data for authorization. The user may use configurable biometric data for authorization without redesign of the computer security system.

Figure 6:
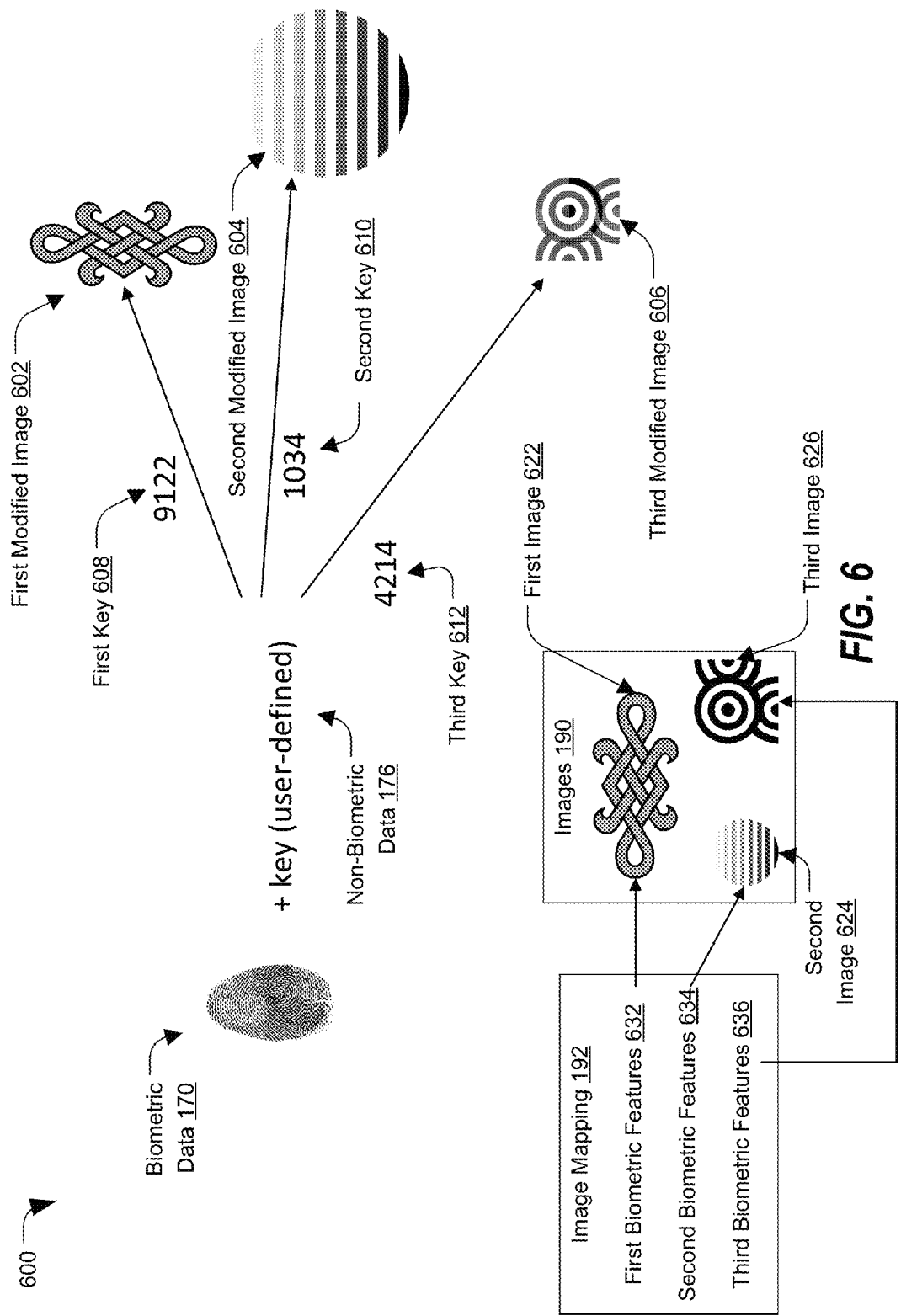
FIG. 6 is a diagram of a particular embodiment of a system configured to select a particular image to generate authorization data.

Referring to FIG. 6, a diagram of a particular embodiment of a system configured to select a particular image to generate authorization data is disclosed and generally designated 600. The authorization data may be generated based on biometric data and non-biometric data. In a particular embodiment, the system 600 may correspond to the system 100 of FIG. 1. For example, the system 600 may include the authorization data generator 110, the image mapping 192, the images 190 of FIG. 1, or a combination thereof.

The images 190 may include a first image 622, a second image 624, a third image 626, or a combination thereof. In a particular embodiment, the first image 194 of FIG. 1 may correspond to the first image 622, the second image 624, or the third image 626. The image mapping 192 may indicate that first biometric features 632 map to the first image 622, that second biometric features 634 map to the second image 624, that third biometric features 636 map to the third image 626, or a combination thereof. In a particular embodiment, the biometric features 632, 634, and 636 may correspond to spikes of a finger print, iris features of an iris scan, facial features of an image of a face, or speech features of a speech signal. For example, the first biometric features 632 may include a single whorl and a single delta. The second biometric features 634 may include no whorls, a plurality of whorls, no deltas, or a plurality of deltas. The second biometric features 634 may also include two or more loops. The third biometric features 636 may include no whorls, a plurality of whorls, no deltas, or a plurality of deltas. The third biometric features 636 may also include fewer than two loops.

As another example, the first biometric features 632 may include a first range of pupil size. The second biometric features 634 may include a second range of pupil size, where the second range excludes the first range. The second biometric features 634 may also include more than or equal to a first number of crypts. The third biometric features 636 may include the second range of pupil size and fewer than the first number of crypts.

As a further example, the first biometric features 632 may include a first shape of a head. The second biometric features 634 may include shapes of a head other than the first shape and may include a first range of distance between eyes. The third biometric features 636 may include the shapes of a head other than the first shape and may include a second range of distance between eyes, where the second range is distinct from the first range.

As yet another example, the first biometric features 632 may include a first set of formant locations. The second biometric features 634 may include a second set of formant locations distinct from the first set and may include a first range of spectral tilt. The third biometric features 636 may include the second set of formant locations and may include a second range of spectral tilt distinct from the first range.

During operation, the authorization data generator 110 of FIG. 1 may receive the biometric data 170 and the non-biometric data 176 (e.g., a key), as described with reference to FIG. 1. The biometric data 170 may correspond to a finger print scan and the non-biometric data 176 may be user-defined (e.g., based on the user input 172 of FIG. 1). The non-biometric data 176 may correspond to, or include, the first key 608 (e.g., "9122"), the second key 610 (e.g., "1034"), or the third key 612 (e.g., "4214").

The authorization data generator 110 may extract biometric features 182 from the biometric data 170 and may generate modified biometric features 184 by modifying the biometric features 182 based on the non-biometric data 176, as described with reference to FIGS. 1 and 4-5. For example, the authorization data generator 110 may generate the first biometric features 632 based on the first key 608, may generate the second biometric features 634 based on the second key 610, or may generate the third biometric features 636 based on the third key 612. The modified biometric features 184 may include the first biometric features 632, the second biometric features 634, or the third biometric features 636.

The authorization data generator 110 may select a particular image of the images 190 of FIG. 1. The particular image may be selected based on the image mapping 192 and the modified biometric features 184. For example, the authorization data generator 110 may select the first image 622 in response to determining that the modified biometric features 184 include the first biometric features 632 and that the image mapping 192 indicates that the first biometric features 632 correspond to the first image 622. As another example, the authorization data generator 110 may select the second image 624 in response to determining that the modified biometric features 184 include the second biometric features 634 and that the image mapping 192 indicates that the second biometric features 634 correspond to the second image 624. As a further example, the authorization data generator 110 may select the third image 626 in response to determining that the modified biometric features 184 include the third biometric features 636 and that the image mapping 192 indicates that the third biometric features 636 correspond to the third image 626.

The authorization data generator 110 may modify the selected image based on the non-biometric data 176 to generate the second image 196. For example, the authorization data generator 110 may modify the first image 622, the second image 624, or the third image 626 based on the first key 608, the second key 610, or the third key 612 to generate a first modified image 602, a second modified image 604, or a third modified image 606, respectively. For example, the authorization data generator 110 may apply an image processing function (e.g., a rotation function, a blurring function, a scaling, and/or a shading function) to the first image 622 to generate the first modified image 602 based on the first key 608. To illustrate, the authorization data generator 110 may determine an angle of rotation (e.g., 90 degrees) based on the first key 608 and may generate the first modified image 602 by rotating the first image 622 based on the angle of rotation.

As another example, the authorization data generator 110 may apply an image processing function (e.g., a rotation function, a blurring function, a scaling function, and/or a shading function) to the second image 624 to generate the second modified image 604 based on the second key 610. To illustrate, the authorization data generator 110 may determine an extent of scaling (e.g., 200 percent) based on the second key 610 and may apply a scaling function corresponding to the extent of scaling (e.g., 200 percent) to the second image 624 to generate the second modified image 604. As a further example, the authorization data generator 110 may apply an image processing function (e.g., a rotation function, a blurring function, a scaling function, and/or a shading function) to the third image 626 to generate the third modified image 606 based on the third key 612. To illustrate, the authorization data generator 110 may determine an angle of rotation (e.g., 180 degrees) and an extent of blurring (e.g., 40 percent) based on the third key 612. The authorization data generator 110 may rotate the third image 626 based on the angle of rotation (e.g., 180 degrees) and may apply a blurring filter based on the extent of blurring (e.g., 40 percent) to the rotated image to generate the third modified image 606. The second image 196 may correspond to, or include, the first modified image 602, the second modified image 604, or the third modified image 606. The authorization data generator 110 may transmit the second image 196, as described with reference to FIG. 1.

In a particular embodiment, the authorization data generator 110 may modify the selected image (e.g., the first image 622, the second image 624, or the third image 626) by applying a one-way function based on the non-biometric data 176 to generate the second image 196. For example, the authorization data generator 110 may determine an angle of rotation, an extent of blurring, an extent of scaling, and/or an extent of shading by applying a one-way function to the non-biometric data 176 (e.g., the first key 608, the second key 610, or the third key 612) and may modify the selected image based on the angle of rotation, the extent of blurring, the extent of scaling, and/or the extent of shading to generate the second image 196 (e.g., the first modified image 602, the second modified image 604, or the third modified image 606).

The system 600 may thus enable a user to generate configurable authorization data based on biometric data. The user may use the biometric data during enrollment and authentication with a computer security system that uses non-biometric images for authorization. The user may use configurable biometric data for authorization without redesign of the computer security system. The biometric data may be difficult to derive (e.g., reverse engineer) from the authorization data, thus reducing a likelihood of the biometric data being compromised.

Figure 7:
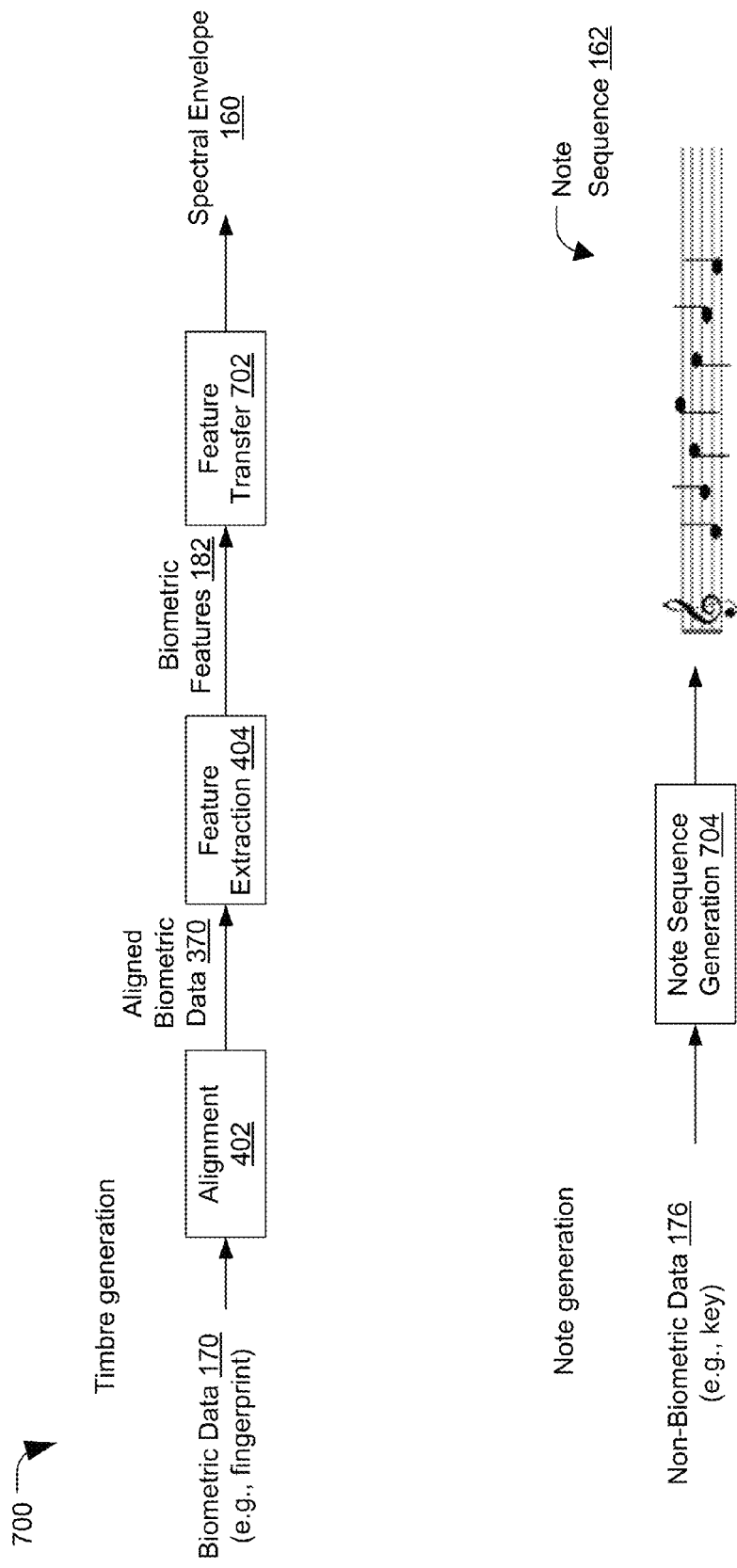
FIG. 7 is a diagram of a particular embodiment of a method of generating authorization data by sonifying biometric data based on non-biometric data.

Referring to FIG. 7, a diagram of a particular embodiment of a method of generating authorization data is shown and generally designated 700. The authorization data may be generated by sonifying biometric data. In a particular embodiment, the method 700 may be performed by the authorization data generator 110 of FIG. 1.

The method 700 may include alignment 402 and feature extraction 404 of FIG. 4. For example, the authorization data generator 110 of FIG. 1 may receive the biometric data 170, may generate the aligned biometric data 370 based on the biometric data 170, and may extract the biometric features 182 based on the aligned biometric data 370, as described with reference to FIGS. 3-4.

The method 700 may also include feature transfer, at 702. For example, the authorization data generator 110 of FIG. 1 may generate the spectral envelope 160 based on the biometric features 182, as described with reference to FIG. 1. In a particular embodiment, the biometric features 182 may indicate spikes (e.g., singularities and minutiae) of a finger print. The spectral envelope 160 may correspond to the spikes. In another particular embodiment, the biometric features 182 may indicate features of an iris and the spectral envelope 160 may correspond to the features of the iris. In yet another particular embodiment, the biometric features 182 may indicate facial features and the spectral envelope 160 may correspond to the facial features.

The method 700 may further include note sequence generation, at 704. For example, the authorization data generator 110 of FIG. 1 may receive the non-biometric data 176 (e.g., a key). In a particular embodiment, the authorization data generator 110 may receive the user input 172 of FIG. 1 and may generate the non-biometric data 176 based on the user input 172, as described with reference to FIG. 1. The authorization data generator 110 may generate the note sequence 162 based on the non-biometric data 176. For example, the authorization data generator 110 may generate the note sequence 162 using an arpeggiator (e.g., a rule-based note sequence generator). The authorization data generator 110 may provide the non-biometric data 176 (e.g., a four digit key) to the arpeggiator and the arpeggiator may generate the note sequence 162 based on the non-biometric data 176. In a particular embodiment, the arpeggiator may generate a particular number (e.g., 10000) of different note sequences based on a particular length (e.g., 4 digits) of the non-biometric data 176.

The note sequence 162 may indicate at least one of a chord (e.g., a major chord, a minor chord, a seventh chord, a chord that diminishes per 12 pitch class, etc.), a tempo (e.g., 60 beats per minute, 120 beats per minute, etc.), an octave range (e.g., 1 octave, 2 octave, full range, etc.), or a note progression (e.g., up, down, up/down, etc.). For example, the arpeggiator may determine the at least one of the chord (e.g., F major), the tempo (e.g., 60 beats per minute), the octave range (e.g., 1 octave), or the note progression (e.g., up/down) based on the non-biometric data 176.

The authorization data generator 110 may generate the audio data 198 of FIG. 1 by sonifying the biometric data 170 based on the non-biometric data 176. For example, the authorization data generator 110 may sonify the biometric data 170 by extracting the biometric features 182, by generating the spectral envelope 160 based on the biometric features 182, and by generating the note sequence 162 based on the non-biometric data 176, as described herein. The audio data 198 may include, or correspond to, the spectral envelope 160 and the note sequence 162. In a particular embodiment, the authorization data generator 110 may combine the spectral envelope 160 and the note sequence 162 to generate an audio signal. The audio data 198 may include the audio signal. In an alternate embodiment, the authorization data generator 110 may transmit the spectral envelope 160 and the note sequence 162. In this embodiment, a decoder at the authentication device 104 of FIG. 1 may combine the spectral envelope 160 and the note sequence 162 to generate the audio signal. The audio data 198 may include the spectral envelope 160 and the note sequence 162.

In a particular embodiment, the authorization data generator 110 may generate the second biometric data 180 by modifying the biometric data 170 based on the non-biometric data 176. The authorization data generator 110 may generate the audio data 198 based on the second biometric data 180. For example, the authorization data generator 110 may extract features of the second biometric data 180 and may generate a spectral envelope based on the features. The audio data 198 may include the spectral envelope generated based on features of the second biometric data 180.

In a particular embodiment, the authorization data generator 110 may generate the second image 196 based on the biometric data 170 and the non-biometric data 176, as described with reference to FIG. 1. The authorization data generator 110 may generate the audio data 198 by sonifying the second image 196. For example, an audio data mapping may map the images (e.g., the images 190, modified versions of the images 190, and/or the second image 196) to audio data (e.g., spectral envelopes). The authorization data generator 110 may select the audio data 198 based on the audio data mapping (e.g., a spectral envelope) and the second image 196.

In a particular embodiment, the authorization data generator 110 may generate the audio data 198 by transforming (e.g., sonifying) the biometric data 170. For example, the authorization data generator 110 may generate first audio data (e.g., the spectral envelope 160, a first sound wave, a carrier signal, etc.) based on the biometric data 170. The authorization data generator 110 may generate second audio data (e.g., a second spectral envelope, a second sound wave, a modulation signal, etc.) based on the non-biometric data 176. For example, an audio data mapping may map values of the non-biometric data 176 to audio data (e.g., spectral envelopes, sound waves, carrier signals, etc.). The authorization data generator 110 may select the second audio data (e.g., the second spectral envelope, the second sound wave, the modulation signal, etc.) based on the audio data mapping and the non-biometric data 176. The authorization data generator 110 may generate the audio data 198 by combining the first audio data (e.g., the spectral envelope 160, the first sound wave, the carrier signal, etc.) and the second audio data (e.g., the second spectral envelope, the second sound wave, modulation of a carrier wave, etc.).

In a particular embodiment, the authorization data generator 110 may generate the audio data 198 by mapping the biometric data 170 to audio sounds within a particular auditory range (e.g., a particular audible range, a particular inaudible range, or a range including audible notes and inaudible notes). For example, the authorization data generator 110 may extract the biometric features 182 from the biometric data 170. The authorization data generator 110 may convert the biometric data 170 to a note sequence by normalizing values of the biometric features 182 to be within the particular auditory range. For example, a highest value included in the biometric features 182 may correspond to a maximum value (e.g., a highest frequency) of the particular auditory range and a lowest value included in the biometric features 182 may correspond to a minimum value (e.g., a lowest frequency) of the particular auditory range. The authorization data generator 110 may use non-linear quantization or linear quantization to convert the biometric data 170 to the note sequence. In a particular embodiment, the authorization data generator 110 may convert the biometric data 170 to a note sequence corresponding to a particular musical key (e.g., Dmajor, Dminor, etc.).

The method 700 may thus enable the user to generate audio authorization data based on biometric data. The biometric data may be non-audio data (e.g., image data). The user may use the non-audio biometric data during enrollment and authentication with a computer security system that uses audio data for authorization. The user may use non-audio biometric data for authorization without redesign of the computer security system.

Figure 8:
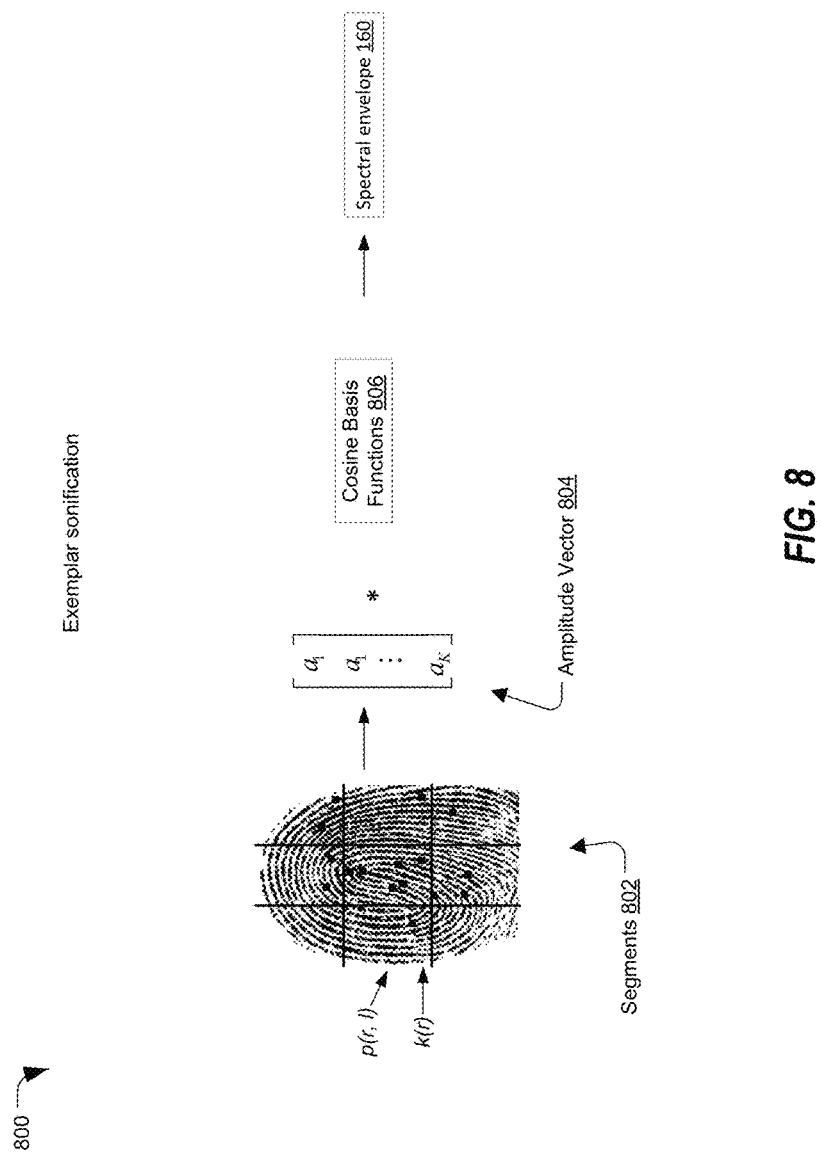
FIG. 8 is a diagram of a particular embodiment of a system configured to generate a spectral envelope by sonifying biometric data based on non-biometric data.

Referring to FIG. 8, a diagram of a particular embodiment of a system configured to generate a spectral envelope is shown and generally designated 800. The system 800 may generate the spectral envelope by sonifying biometric data based on non-biometric data. In a particular embodiment, the system 800 may correspond to the system 100 of FIG. 1. For example, the system 800 may include the authorization data generator 110 of FIG. 1.

During operation, the authorization data generator 110 may receive the biometric data 170, as described with reference to FIG. 1. The biometric data 170 may be image data (e.g., a finger print scan, an iris scan, or an image of a face). The authorization data generator 110 may divide the biometric data 170 into a particular number (e.g., K) of segments 802. The authorization data generator 110 may extract the biometric features 182 (e.g., singularity and minutiae points of a finger print, iris features, or facial features) from the biometric data 170, as described with reference to FIG. 1. The iris features may include a radial furrow, a concentric furrow, a crypt, a collarette, and/or a pupil size. A particular segment (r) of the segments 802 may include a subset of the biometric features 182. The memory 132 of FIG. 1 may store cosine basis functions 806. The cosine basis functions 806 may include default values. Each of the cosine basis functions 806 may correspond to a particular segment (e.g., r) of the segments 802.

The authorization data generator 110 may generate an amplitude vector 804 corresponding to the segments 802 based on the biometric features 182 (e.g., the singularity and minutiae points of a finger print, the iris features, or the facial features). For example, the amplitude vector 804 may be given by:

$$a(r) = \Sigma_{l=1}^{N} \|p(r,l) - k(r)\| + c(r), \qquad \text{Equation 6}$$

where a(r) is an amplitude value of the amplitude vector 804 corresponding to segment r, p(r, l) is a particular spike (or an iris feature or a facial feature) included in r, k(r) is a local reference point (e.g., a center coordinate) of r, and c(r) is a particular weight associated with a corresponding cosine basis function of the cosine basis functions 806. The particular weight (c(r)) may be a default value. The amplitude value a(r) may have a particular default value (e.g., 0) if a corresponding segment (e.g., r) does not include a spike (or an iris feature or a facial feature).

The authorization data generator 110 may generate a mel-band logarithmic envelope based on the amplitude vector 804 and the cosine basis functions 806. The mel-band logarithmic envelope may be given by:

$$\text{mel-band envelope(log)} = \Sigma_{r=1}^{K} a(r) \cos(2\pi f(r)t), \quad \text{Equation 7}$$

where f=frequency and t=time. The authorization data generator 110 may generate the spectral envelope 160 by performing mel to linear frequency conversion on the mel-band envelope.

The system 800 may thus enable sonification of image data. For example, a spectral envelope may be generated based on a finger print scan, an iris scan, or an image of a face. The spectral envelope may be used to generate audio authorization data.

Figure 9:
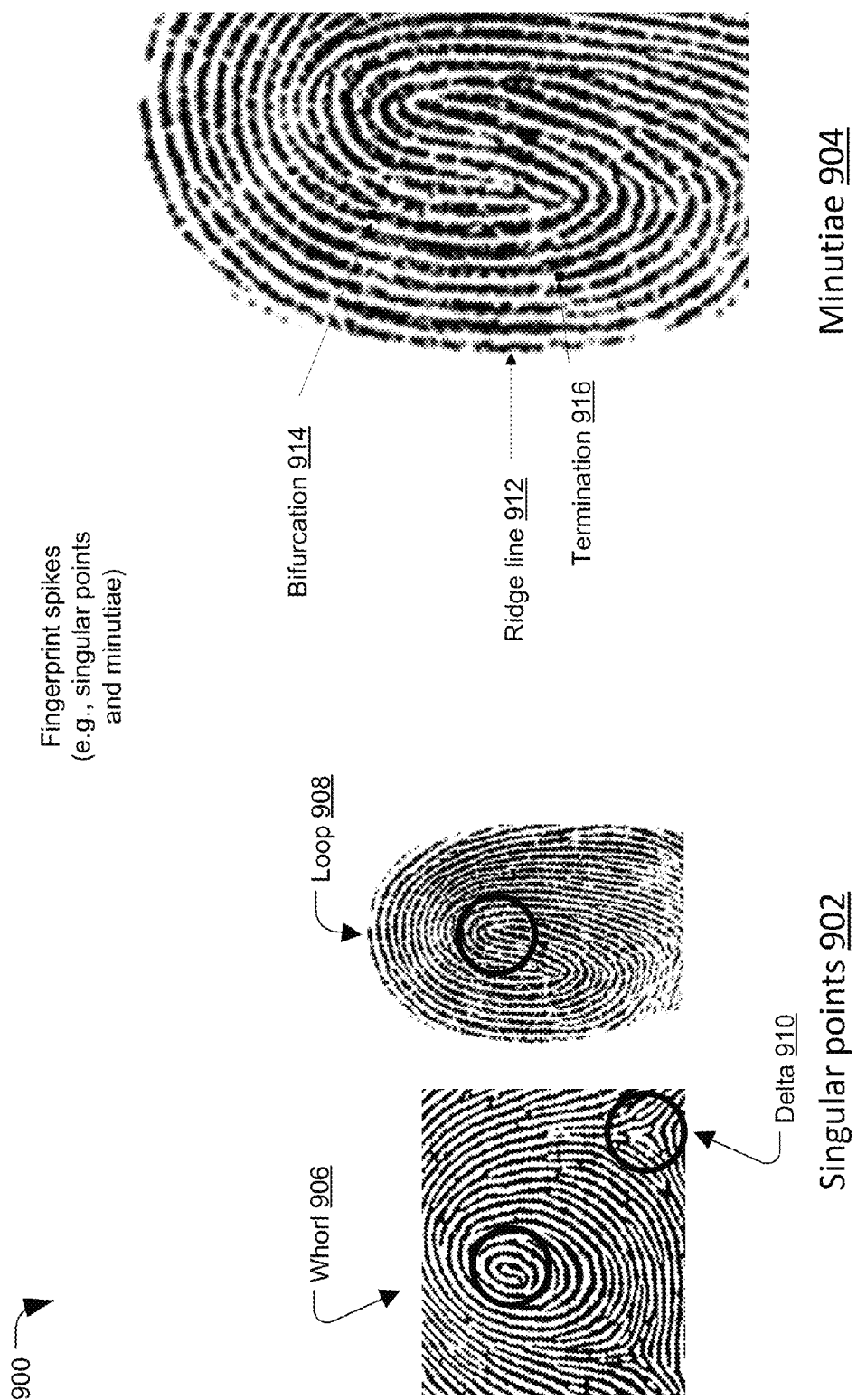
FIG. 9 is a diagram of a particular embodiment of spikes of a finger print.

Referring to FIG. 9, a diagram of a particular embodiment of spikes of a finger print is shown and generally designated 900. The spikes 900 include singular points 902 and minutiae 904. The singular points 902 include a whorl 906, a loop 908, and a delta 910. The minutiae 904 include a ridge line 912, a bifurcation 914, and a termination 916.

Figure 10:
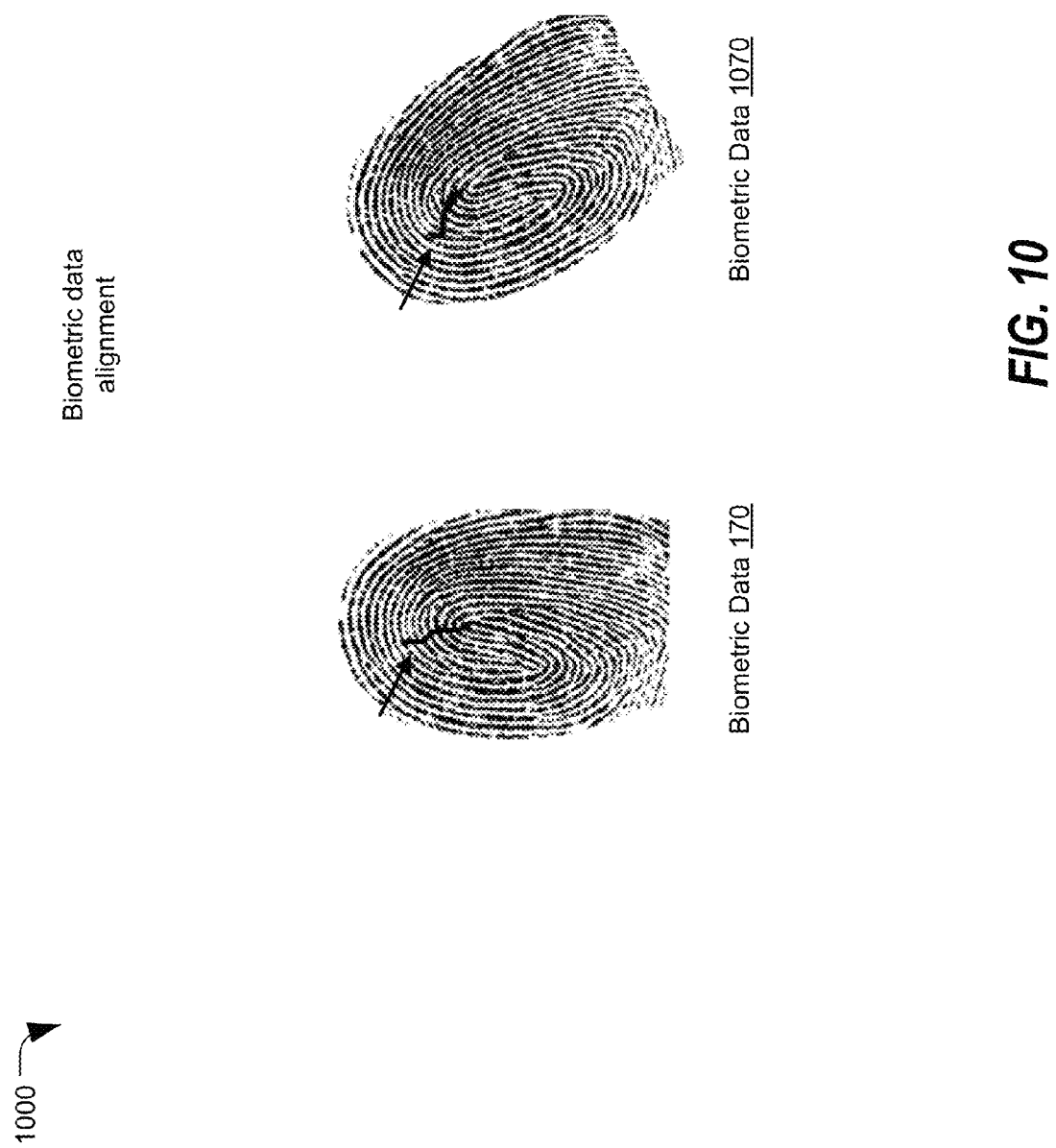
FIG. 10 is a diagram of biometric data alignment.

Referring to FIG. 10, a diagram of biometric data alignment is shown and generally designated 1000. The diagram 1000 includes biometric data 170 and biometric data 1070. The biometric data 1070 may be stored in the memory 132.

In a particular embodiment, the biometric data 1070 may correspond to template biometric data. In an alternate embodiment, the authorization data generator 110 of FIG. 1 may receive the biometric data 1070 during an enrollment phase and may receive the biometric data 170 during an authentication phase. In a particular embodiment, the biometric data 1070 may include a subset of biometric data received by the authorization data generator 110. For example, the authorization data generator 110 may receive a finger print scan, an iris scan, or an image of a face. The authorization data generator 110 may store a portion (e.g., curvature information) of data associated with the finger print scan, the iris scan, or the image of the face in the memory 132 as biometric data 1070.

During operation, the authorization data generator 110 may generate the aligned biometric data 370 of FIG. 3 by modifying the biometric data 170 (e.g., a finger print scan, an iris scan, or an image of a face) to align the biometric data 170 with the biometric data 1070. For example, the authorization data generator 110 may determine a first alignment feature of the biometric data 1070 and a second alignment feature of the biometric data 170. In a particular embodiment, the biometric data 170 corresponds to a finger print scan, the first alignment feature corresponds to a first curvature point (e.g., a high curvature point), a first singular point, or both, indicated by the biometric data 1070, and the second alignment feature corresponds to a second curvature point (e.g., a high curvature point), a second singular point, or both, indicated by the biometric data 170. In an alternate embodiment, the biometric data 170 corresponds to an iris scan (or an image of a face), the first alignment feature corresponds to a first iris feature (or a first facial feature) indicated by the biometric data 1070, and the second alignment feature corresponds to a second iris feature (or a second facial feature) indicated by the biometric data 170.

The authorization data generator 110 may modify the biometric data 170 to align the biometric data 170 with the biometric data 1070 based on the first alignment feature and the second alignment feature. For example, the authorization data generator 110 may determine a transformation function to apply to the biometric data 170 based on a comparison of the first alignment feature and the second alignment feature. In a particular embodiment, the authorization data generator 110 may compare the first curvature point, the first singular point, or both, to the second curvature point, the second singular point, or both.

The authorization data generator 110 may determine the transformation function based on the comparison. For example, the transformation function may include a scaling function, a rotation function, and/or a translation function that aligns the second alignment feature (e.g., the first curvature point, the first singular point, or both) to the first alignment feature (e.g., the second curvature point, the second singular point, or both). For example, the authorization data generator 110 may determine the transformation function such that the second alignment feature of the aligned biometric data 370 has the same coordinates (or has coordinates within a threshold distance) as first coordinates of first alignment feature of the biometric data 1070. The authorization data generator 110 may apply the transformation function to the biometric data 170 to generate the aligned biometric data 370 of FIG. 3.

The biometric data alignment may increase a correspondence of biometric data with expected biometric data and may reduce a likelihood of a false negative. For example, the biometric data 1070 may be generated during an enrollment phase based on a first finger print and the biometric data 170 may be generated during an authentication phase based on a second finger print. Aligning the biometric data 170 with the biometric data 1070 may increase a confidence score associated with comparing the aligned biometric data 370 to the biometric data 1070 when the biometric data 170 and the biometric data 1070 are associated finger prints of the same finger.

Figure 11:
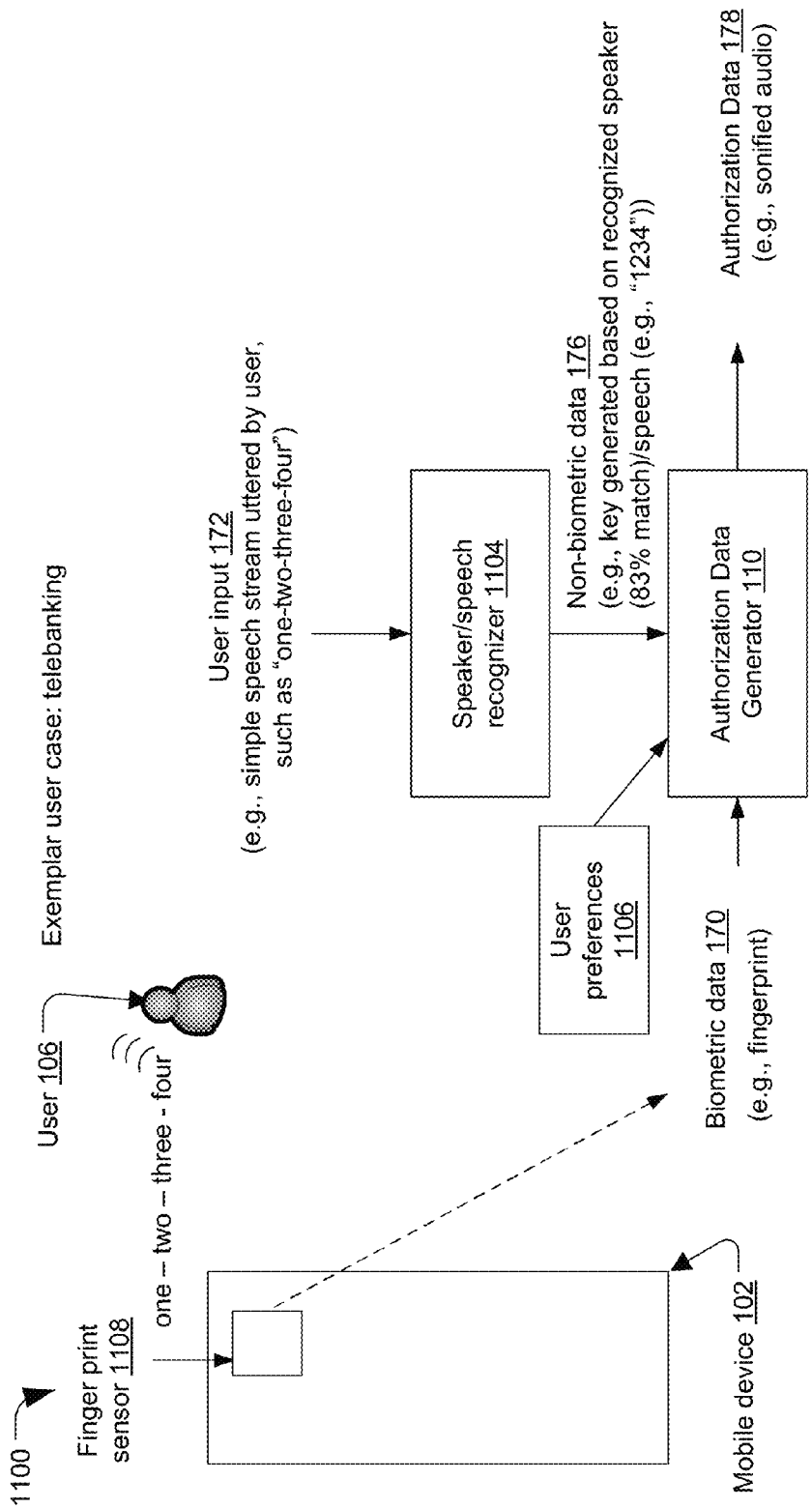
FIG. 11 is a diagram of a particular embodiment of a system configured to generate authorization data.

Referring to FIG. 11, a diagram of a particular embodiment of a system configured to generate authorization data is shown and generally designated 1100. In a particular embodiment, the system 1100 may correspond to the system 100 of FIG. 1. The system 1100 may be associated with a telebanking use case.

The system 1100 includes the mobile device 102. The mobile device 102 includes a finger print sensor 1108. During operation, the user 106 may be prompted to provide the authorization data 178 of FIG. 1 to access an account (e.g., a bank account) during a phone call to a telebanking system. The user 106 may place a finger on, or near, the finger print sensor 1108 to provide the biometric data 170 to the authorization data generator 110 of the mobile device 102. The mobile device 102 may include a speaker and/or speech recognizer (speaker/speech recognizer) 1104 coupled to the authorization data generator 110. In a particular embodiment, the authorization data generator 110 may include the speaker/speech recognizer 1104.

The user 106 may provide the user input 172 to the speaker/speech recognizer 1104 by speaking (e.g., "one-two-three-four") into a microphone coupled to the mobile device 102. The speaker/speech recognizer 1104 may generate non-biometric data 176 based on the user input 172. For example, the speaker/speech recognizer 1104 may generate a confidence score (e.g., 83% or 0.83) by performing speaker recognition on the user input 172. The speaker/speech recognizer 1104 may also generate text (e.g., "1234")

or a number (e.g., 1234) by performing speech recognition on the user input 172. The speaker/speech recognizer 1104 may generate the non-biometric data 176 based on the confidence score, the text (or the number), or both.

The mobile device 102 may include user preferences 1106. For example, the user preferences 1106 may be stored in the memory 132 of FIG. 1. The user preferences 1106 may indicate a type of authorization data to be generated (e.g., audio data, second (e.g., non-biometric) image data, or second biometric data). The authorization data generator 110 may generate the authorization data 178 based on the biometric data 170, the non-biometric data 176, and the user preferences 1106. For example, when the user preferences 1106 indicate that audio data (e.g., the audio data 198 of FIG. 1) is to be generated, the authorization data generator 110 may sonify the biometric data 170 based on the non-biometric data 176 to generate the audio data, as described with reference to FIG. 1. As another example, when the user preferences 1106 indicate that second image (e.g., the second image 196 of FIG. 1) is to be generated, the authorization data generator 110 may generate the second image based on the non-biometric data 176 and the biometric data 170, as described with reference to FIG. 1. As an additional example, when the user preferences 1106 indicate that second biometric data (e.g., the second biometric data 180 of FIG. 1) is to be generated, the authorization data generator 110 may generate the second biometric data based on the non-biometric data 176 and the biometric data 170, as described with reference to FIG. 1.

The authorization data generator 110 may transmit the authorization data 178 (e.g., the audio data 198, the second image 196, or the second biometric data 180), as described with reference to FIG. 1. For example, the mobile device 102 may provide the authorization data 178 during the phone call to the telebanking system. The telebanking system may perform enrollment or authentication based on the authorization data 178 (e.g., the audio data 198). For example, during enrollment, the telebanking system may store the audio data 198 as enrollment audio data (e.g., a password). As another example, during authentication, the telebanking system may determine a confidence score by comparing the audio data 198 with enrollment audio data, and may provide access to the bank account based on the confidence score satisfying an authentication threshold.

The system 1100 may thus enable a user to generate authorization data based on a finger print and a speech signal. The user may configure the authorization data by changing a phrase used to generate the speech signal. The authorization data is based on biometric data and may be considered relatively secure, even if the user provides a simple and easy-to-remember phrase to generate the authorization data.

Figure 12:
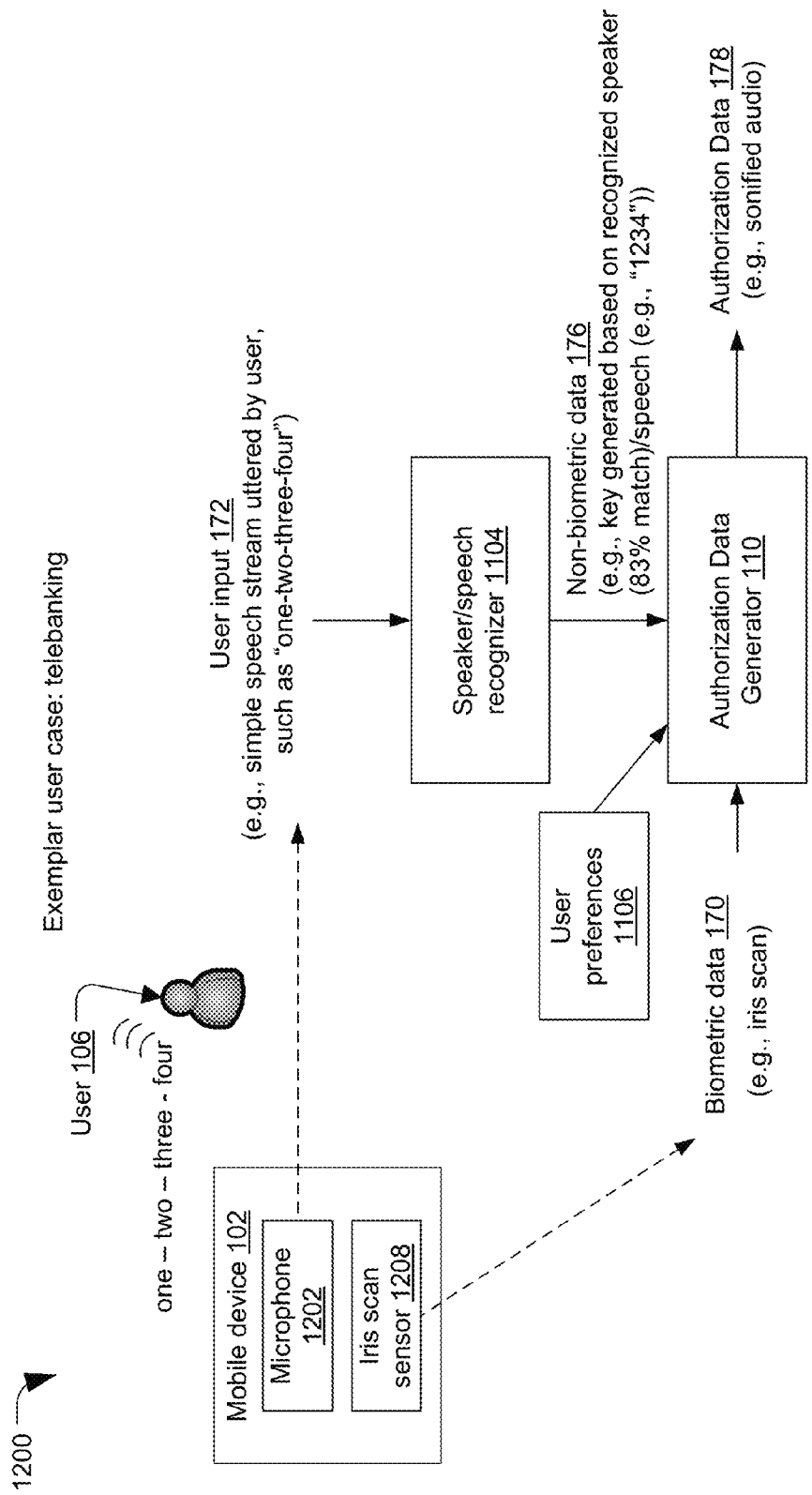
FIG. 12 is a diagram of another particular embodiment of a system configured to generate authorization data.

Referring to FIG. 12, a diagram of a particular embodiment of a system configured to generate authorization data is shown and generally designated 1200. In a particular embodiment, the system 1200 may correspond to the system 100 of FIG. 1. The system 1200 may be associated with a telebanking use case.

The system 1200 includes the mobile device 102. The mobile device 102 may include smart eyewear. The mobile device 102 may be coupled to or include a microphone 1202, an iris scan sensor 1208, or both. During operation, the user 106 may provide the biometric data 170 (e.g., an iris scan) by placing an eye near the iris scan sensor 1208. The user 106 may provide the user input 172 via the microphone 1202. The authorization data generator 110 may generate the authorization data 178 based on the user preferences 1106, the non-biometric data 176, and the biometric data 170, as described with reference to FIG. 11.

The system 1200 may thus enable a user to generate authorization data based on an iris scan and a speech signal. The user may configure the authorization data by changing a phrase used to generate the speech signal. The authorization data is based on biometric data and may be considered relatively secure, even if the user provides a simple and easy-to-remember phrase to generate the authorization data.

Figure 13:
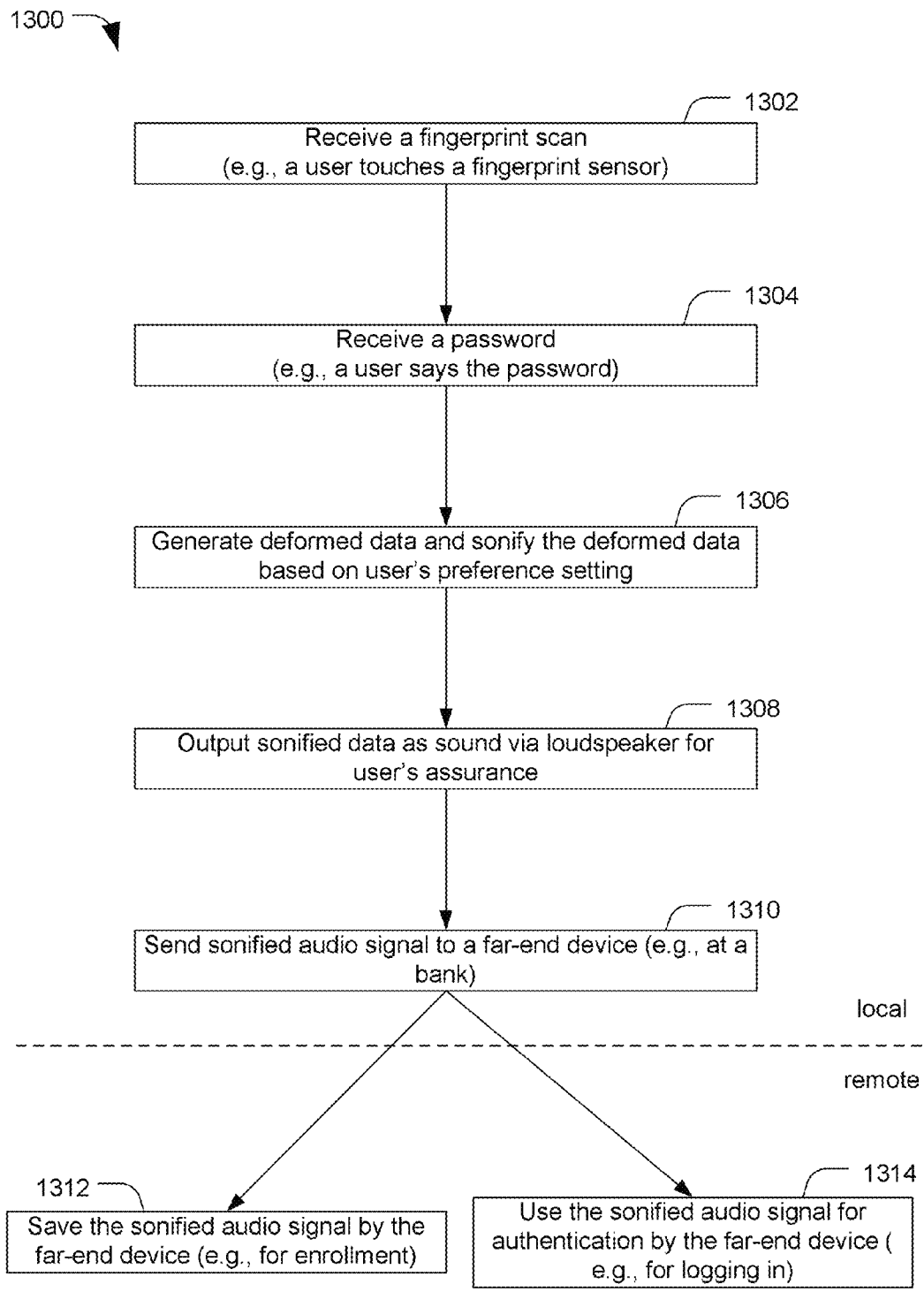
FIG. 13 is a flow diagram of a particular embodiment of a method of generating a sonified audio signal based on biometric data.

Referring to FIG. 13, a diagram of a particular embodiment of method of generating a sonified audio signal is shown and generally designated 1300. The sonified audio signal may be generated based on biometric data. In a particular embodiment, one or more operations of the method 1300 may be performed by the authorization data generator 110, the authentication device 104, or both.

The method 1300 includes receiving a finger print scan, at 1302. For example, the user 106 may provide the biometric data 170 by touching the finger print sensor 1108 and the authorization data generator 110 may receive the biometric data 170, as described with reference to FIG. 11.

The method 1300 also includes receiving a password, at 1304. For example, the user 106 may provide the user input 172 by speaking a password and the authorization data generator 110 may receive the user input 172, as described with reference to FIG. 1.

The method 1300 further includes generating deformed data and sonifying the deformed data based on user's preference setting, at 1306. For example, the authorization data generator 110 of FIG. 1 may generate the modified biometric features 184 by modifying the biometric features 182 extracted from the biometric data 170, as described with reference to FIG. 1. The authorization data generator 110 may generate the audio data 198 by sonifying the modified biometric features 184, as described with reference to FIG. 1. The authorization data generator 110 may generate the audio data 198 based on the user preferences 1106, as described with reference to FIG. 11.

The method 1300 also includes outputting sonified data as sound via loudspeaker for user's assurance, at 1308. For example, the authorization data generator 110 may output, via a speaker coupled to the mobile device 102, the authorization data 178. The user 106 may accept or reject the authorization data 178 provided by the speaker, as described with reference to FIG. 1.

The method 1300 further includes sending sonified audio signal to a far-end device (e.g., at a bank), at 1310. For example, the authorization data generator 110 may send the authorization data 178 to the authentication device 104, as described with reference to FIG. 1. The authentication device 104 may be associated with a bank (e.g., a telebanking system).

The method 1300 also includes saving the sonified audio signal by the far-end device, at 1312. For example, the authentication device 104 of FIG. 1 may store the authorization data 178 (e.g., received during an enrollment phase) in memory as enrollment authorization data.

The method 1300 may further include using the sonified audio signal for authentication by the far-end device, at 1314. For example, the authentication device 104 of FIG. 1 may use the authorization data 178 (e.g., received during an authentication phase) for authentication, as described with reference to FIG. 1. For example, the authentication device 104 may compare the authorization data 178 with enrollment authorization and may selectively provide access to an account (e.g., a bank account) to the user 106 based on the comparison.

The method 1300 may thus enable a user to generate configurable and relatively secure authorization data based on a finger print and a password. The user may reconfigure the authorization data by changing the password. The authorization data may be considered relatively secure because of being generated from the finger print.

Figure 14:
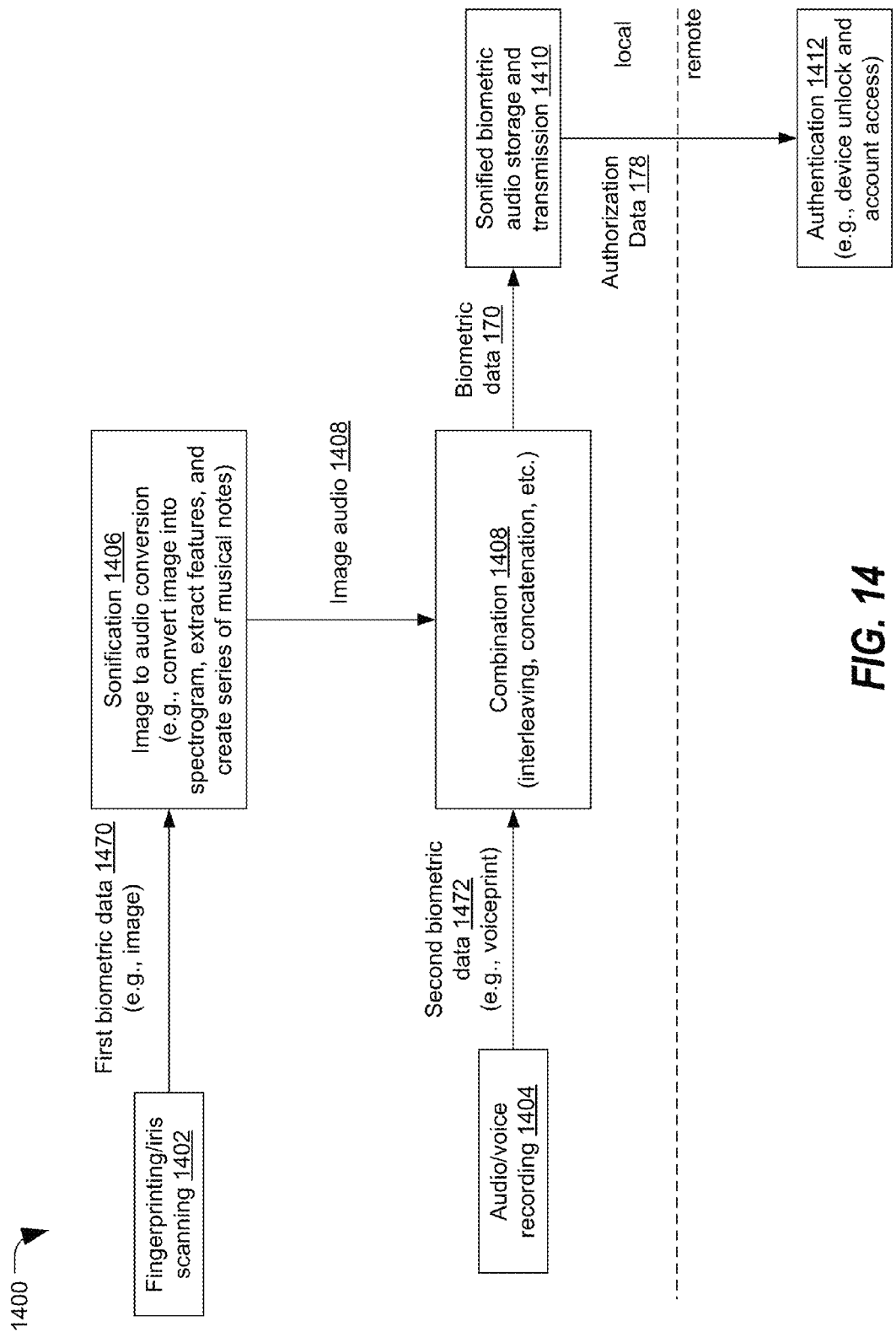
FIG. 14 is a diagram of a particular embodiment of a method of generating authorization data by converting first biometric data and second biometric data to a common format.

Referring to FIG. 14, a diagram of a particular embodiment of a method of generating authorization data is shown and generally designated 1400. The authorization data may be generated by converting biometric data and non-biometric data to a common format. In a particular embodiment, one or more operations of the method 1400 may be performed by the authorization data generator 110, the authentication device 104, or both of FIG. 1.

The method 1400 includes finger printing/iris scanning, at 1402. For example, the authorization data generator 110 may receive first biometric data 1470 (e.g., a finger print scan and/or an iris scan) in a first format (e.g., image data). To illustrate, the authorization data generator 110 may receive the first biometric data 1470 via a finger print sensor, an iris scan sensor, or both. In a particular embodiment, the authorization data generator 110 may receive the first biometric data 1470 (e.g., an image of a face) via a camera coupled to the mobile device 102.

The method 1400 also includes audio/voice recording, at 1404. For example, the authorization data generator 110 of FIG. 1 may receive the second biometric data 1472 (e.g., a speech signal, a voice print, etc.) in a second format (e.g., audio data). To illustrate, the authorization data generator 110 may receive the second biometric data 1472 via a microphone coupled to the mobile device 102.

The method 1400 further includes sonification, at 1406. For example, the authorization data generator 110 may convert the first biometric data 1470 and the second biometric data 1472 to have a common format. In the embodiment illustrated in FIG. 14, the authorization data generator 110 may generate image audio 1408 by converting the first biometric data 1470 to an audio format. For example, the authorization data generator 110 may generate a spectrogram of the first biometric data 1470. The spectrogram may indicate a particular amplitude value associated with a particular frequency at a particular time. The first biometric data 1470 may correspond to a bitmap image with a grid of squares. Each square may have a particular value indicating intensity, color, or both, of the square. The horizontal axis of the grid may correspond to a time axis of the spectrogram and a vertical axis of the grid may correspond to a frequency axis of the spectrogram. The values of the squares may correspond to amplitudes of the spectrogram.

The authorization data generator 110 may extract features from the spectrogram. For example, the features may indicate a particular amplitude value associated with a particular frequency at a particular time. The authorization data generator 110 may generate the image audio 1408 corresponding to a sequence of musical notes based on the spectrogram. For example, the image audio 1408 may include a particular musical note corresponding to the particular amplitude value of the particular frequency at the particular time.

The method 1400 also includes combination, at 1408. For example, the authorization data generator 110 of FIG. 1 may combine the second biometric data 1472 and the image audio 1408. To illustrate, the authorization data generator 110 may interleave or concatenate the second biometric data 1472 and the image audio 1408 to generate the biometric data 170.

The method 1400 further includes sonified biometric audio storage and transmission, at 1410. For example, authorization data generator 110 may store the biometric data 170 in the memory 132 of FIG. 1. The authorization data generator 110 may generate the authorization data 178 based on the biometric data 170 and the non-biometric data 176, as described with reference to FIG. 1. In a particular embodiment, the authorization data generator 110 may generate the non-biometric data 176 from the second biometric data 1472. For example, the authorization data generator 110 may perform speech recognition, speaker recognition, or both, on the second biometric data 1472 to generate the non-biometric data 176, as described with reference to FIG. 1. In an alternate embodiment, the authorization data generator 110 may receive the non-biometric data 176 independently from receiving the first biometric data 1470 and the second biometric data 1472. The authorization data generator 110 may transmit the authorization data 178 via the transceiver 142 to the authentication device 104, as described with reference to FIG. 1.

The method 1400 also includes authentication, at 1412. For example, the authentication device 104 may perform authentication based on the authorization data 178, as described with reference to FIG. 1. To illustrate, the authentication device 104 may compare the authorization data 178 (e.g., received during an authentication phase) to enrollment data (e.g., received during an enrollment phase) to determine a confidence score. The authentication device 104 may provide access to (e.g., unlock) particular features or applications in response to determining that the confidence score satisfies an authentication threshold. For example, the authentication device 104 may enable access to an account (e.g., a bank account, a mail account, a social media account, an insurance account, a health management account, etc.) in response to determining that the confidence score satisfies the authentication threshold. As another example, the authentication device 104 may provide access to a network file repository (e.g., a software repository, a document repository, a music repository, a video repository, etc.) in response to determining that the confidence score satisfies the authentication threshold. In a particular embodiment, the authentication device 104 may provide access to (or unlock) particular features of the device 102 in response to determining that the authentication is successful. For example, the authentication device 104 may provide access to a camera of the device 102 in response to determining that the confidence score satisfies the authentication threshold.

The method 1400 may thus generating biometric data based on first biometric data having a first format and second biometric data having a second format. Authorization data may be generated based on the biometric data and non-biometric data. The method 1400 may thus enable generating authorization data based on a combination of different types of biometric data. It may be harder to derive (e.g., reverse engineer) the first biometric data and/or the second biometric data from the resulting authorization data, as compared to authorization data generated from a single type of biometric data.

Figure 15:
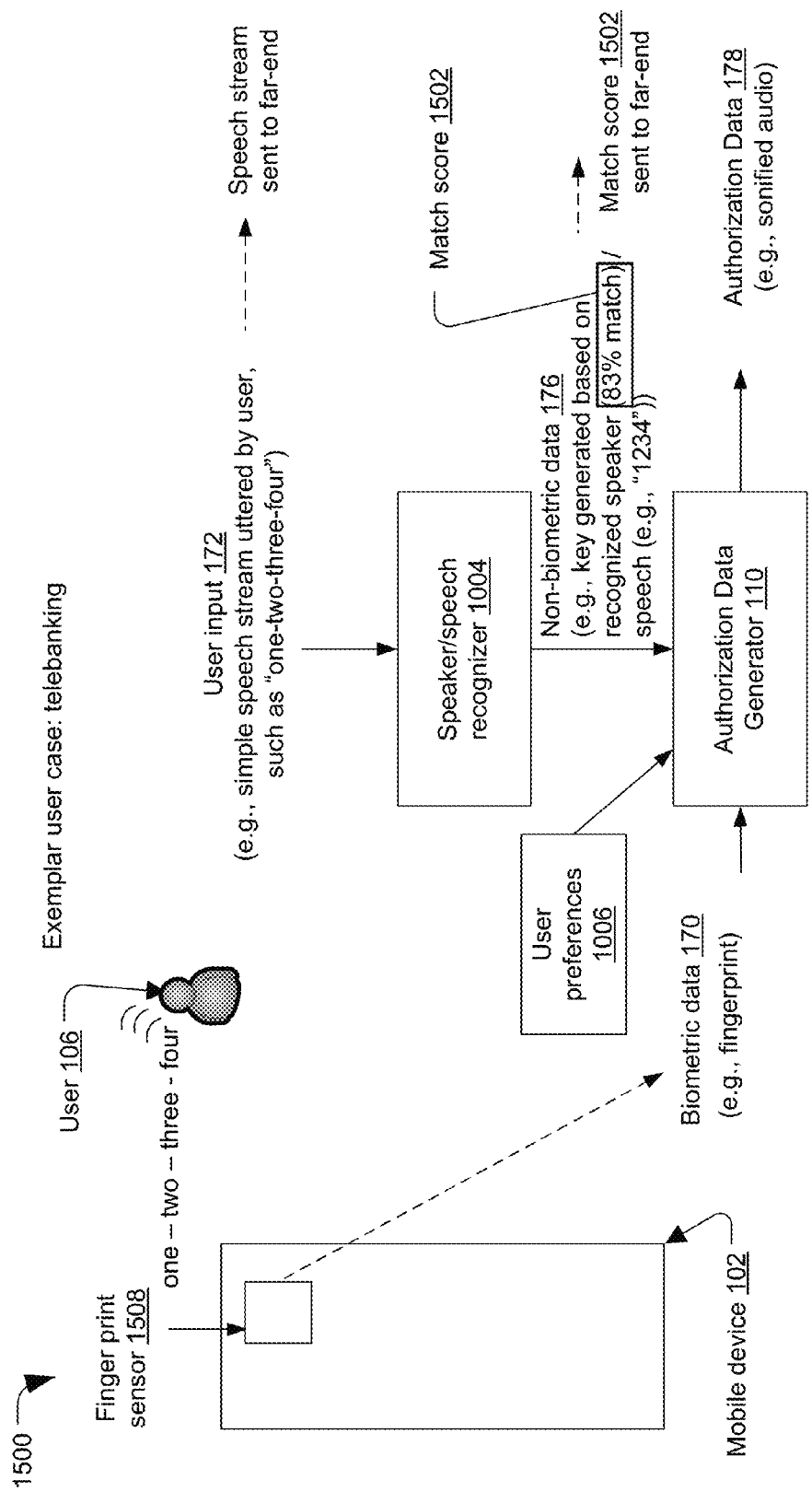
FIG. 15 is a diagram of another particular embodiment of a system configured to generate authorization data.

Referring to FIG. 15, a diagram of a particular embodiment of a system configured to generate authorization data is shown and generally designated 1500. In a particular embodiment, the system 1500 may correspond to the system 100 of FIG. 1. The system 1500 may be associated with a telebanking use case.

The system 1500 differs from the system 1000 in that the authorization data generator 110 of FIG. 1 may send the user input 172 to a far-end device (e.g., the authentication device 104 of FIG. 1). The authorization data generator 110 may send a match score 1502 to the authentication device 104.

For example, the authorization data generator 110 may determine a confidence score (e.g., the match score 1502) associated with performing speaker recognition on the user input 172. To illustrate, the authorization data generator 110 may compare the user input 172 with a first voice print associated with the user 106 or with a generic voice print. The authorization data generator 110 may generate a second voice print based on the user input 172 and may compare the second voice print with the first voice print or with the generic voice print. The match score 1502 may be a result of the comparison. For example, the match score 1502 may indicate a degree of similarity between the second voice print and the first voice print or the generic voice print. The generic voice print may be based on a database of speech signals associated with a group of speakers. The first voice print may be based on speech signals (e.g., received during a training session) of the user 106.

The authorization data generator 110 may send (e.g., transmit) the match score 1502 to the authentication device 104.

The authentication device 104 may receive the user input 172 (e.g., a speech signal), the match score 1502, the authorization data 178, or a combination thereof, from the mobile device 102. The authentication device 104 may perform speaker recognition on the user input 172 to generate a second match score, and may compare the match score 1502 and the second match score. The authentication device 104 may process the authentication data 178 based on the comparison. For example, the authentication device 104 may process the authentication data 178 in response to determining that a difference between the match score 1502 and the second match score satisfies a particular threshold. To illustrate, the authentication device 104 may perform authentication based on the authorization data 178 in response to determining that the difference satisfies the particular threshold. The authentication device 104 may discard the authentication data 178 in response to determining that the difference fails to satisfy the particular threshold.

The system 1500 may use a one-way function to generate the authorization data 178 based on the biometric data 170 and the non-biometric data 176. Using the one-way function may make it difficult to derive the biometric data 170 from the authorization data 178 based on the user input 172, the non-biometric data 176, or both. The system 1500 may thus enable the user input 172, the non-biometric data 176 (e.g., the match score 1502), or both, to be shared with the authentication device 104.

Figure 16:
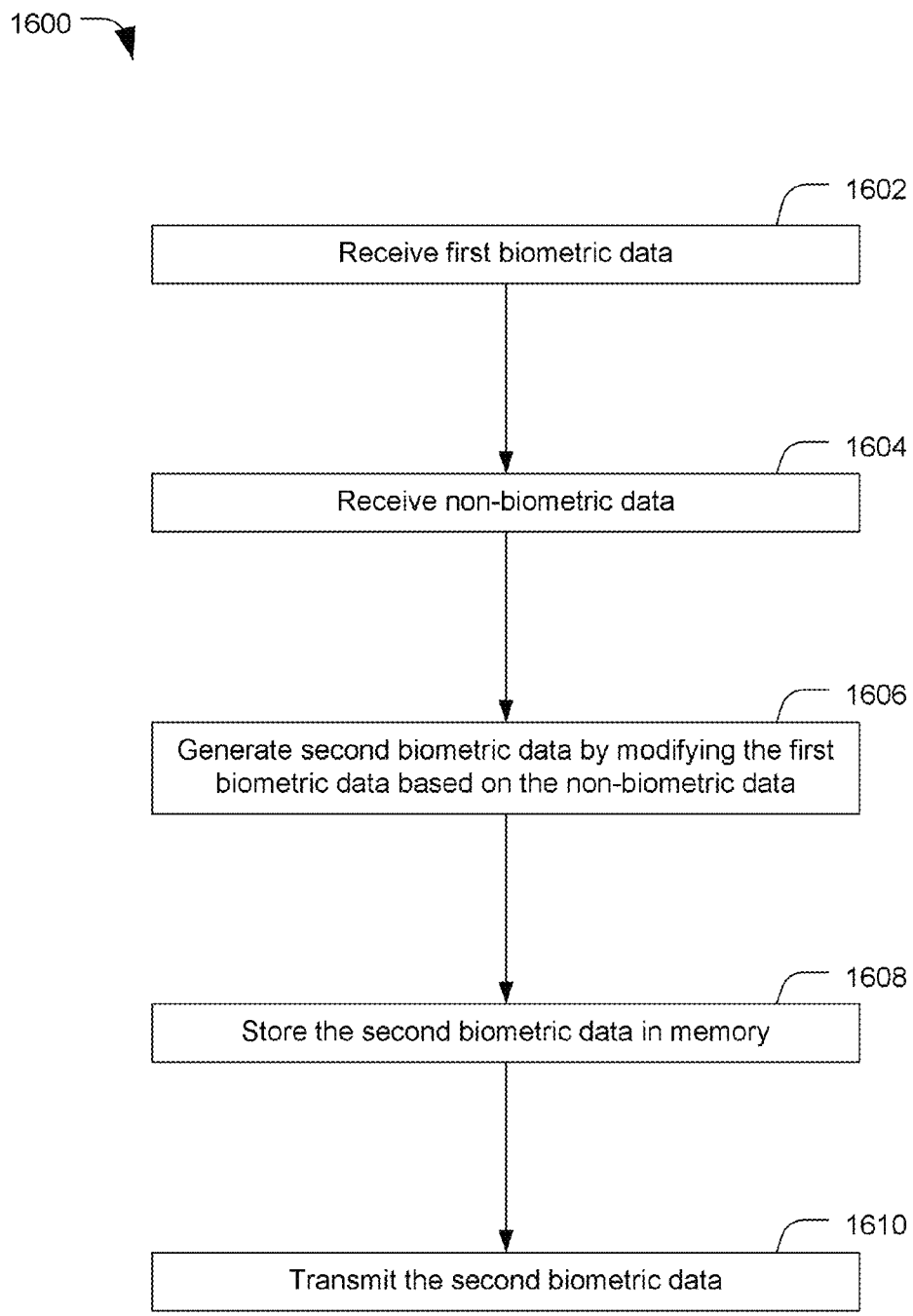
FIG. 16 is a flow diagram of a particular embodiment of generating authorization data based on biometric data and non-biometric data.

Referring to FIG. 16, a flow diagram of a particular embodiment of a method of generating authorization data is shown and generally designated 1600. The authorization data may be generated based on biometric data and non-biometric data. In a particular embodiment, the method 1600 may be performed by the authorization data generator 110 of FIG. 1.

The method 1600 includes receiving first biometric data, at 1602. For example, the authorization data generator 110 of FIG. 1 may receive the biometric data 170, as described with reference to FIG. 1.

The method 1600 also includes receiving non-biometric data, at 1604. For example, the authorization data generator 110 of FIG. 1 may receive the user input 172. The user input 172 may correspond to the non-biometric data 176. For example, the authorization data generator 110 may generate the non-biometric data 176 based on the user input 172, as described with reference to FIG. 1.

The method 1600 further includes generating second biometric data by modifying the first biometric data based on the non-biometric data, at 1606. For example, the authorization data generator 110 of FIG. 1 may extract the biometric features 182 from the biometric data 170 and may generate the modified biometric features 184 by modifying the biometric features 182 based on the non-biometric data 176, as described with reference to FIG. 1. The authorization data generator 110 may generate the second biometric data 180 based on the modified biometric features 184, as described with reference to FIG. 1.

The method 1600 also includes storing the second biometric data in memory, at 1608. For example, the authorization data generator 110 of FIG. 1 may store the second biometric data 180 in the memory 132.

The method 1600 further includes transmitting the second biometric data, at 1610. For example, the authorization data generator 110 of FIG. 1 may transmit the second biometric data 180 via the transceiver 142 to the authentication device 104, as described with reference to FIG. 1.

The method 1600 may thus enable synthetic biometric data to be generated based on biometric data and non-biometric data received from a user. The synthetic biometric data may be used to generate authorization data. The synthetic biometric data may have a same level of security as the biometric data and may be configurable. For example, a user may generate a different synthetic biometric data by modifying the non-biometric data.

Figure 17:
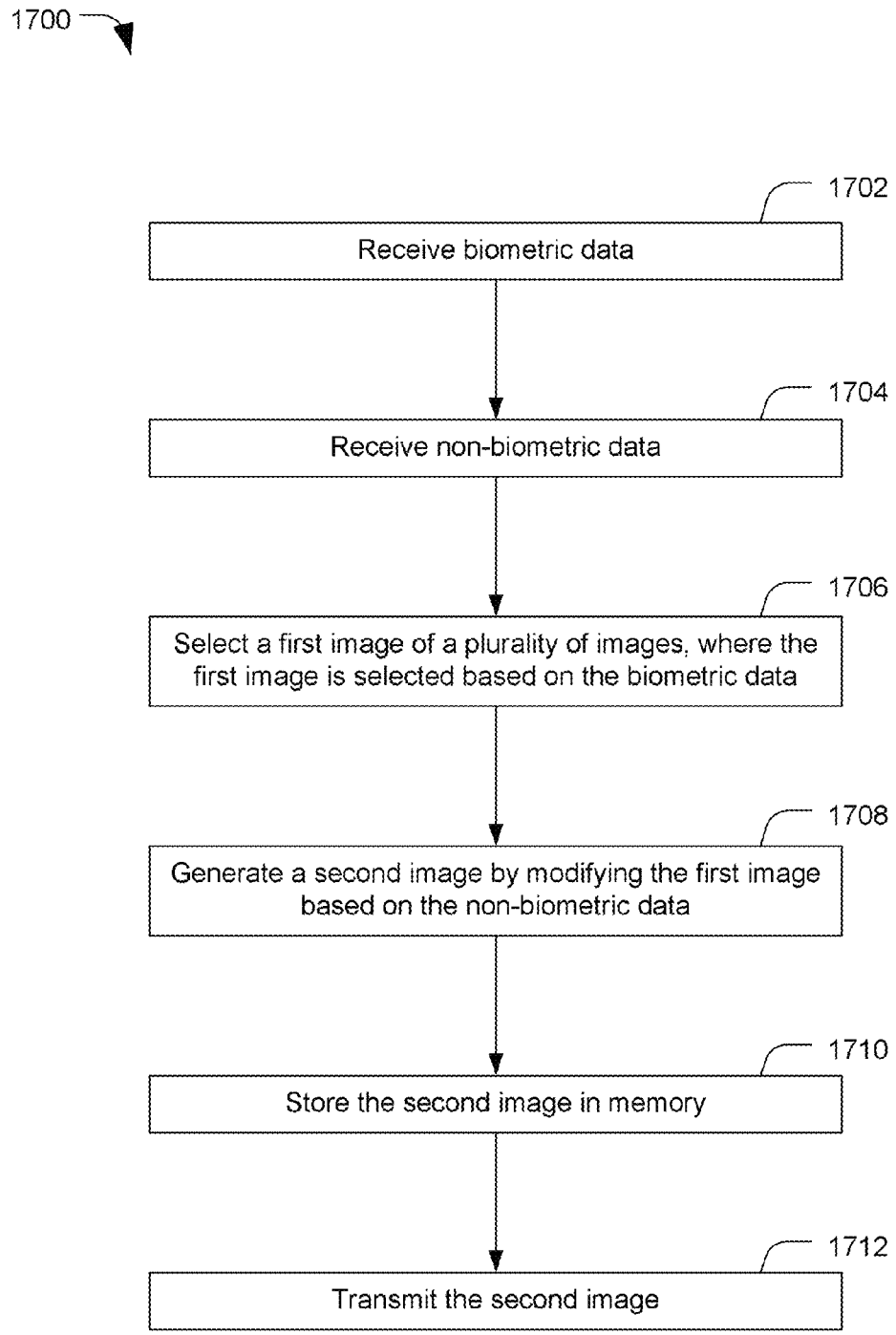
FIG. 17 is a flow diagram of a particular embodiment of generating authorization data based on biometric data and non-biometric data.

Referring to FIG. 17, a flow diagram of a particular embodiment of a method of generating authorization data is shown and generally designated 1700. The authorization data may be generated based on biometric data and non-biometric data. In a particular embodiment, the method 1700 may be performed by the authorization data generator 110 of FIG. 1.

The method 1700 includes receiving biometric data, at 1702. For example, the authorization data generator 110 of FIG. 1 may receive the biometric data 170, as described with reference to FIG. 1.

The method 1700 also includes receiving non-biometric data, at 1704. For example, the authorization data generator 110 of FIG. 1 may receive the user input 172. The user input 172 may correspond to the non-biometric data 176. For example, the authorization data generator 110 may generate the non-biometric data 176 based on the user input 172, as described with reference to FIG. 1.

The method 1700 further includes selecting a first image of a plurality of images, at 1706. The first image may be selected based on the biometric data. For example, the authorization data generator 110 of FIG. 1 may select the first image 194 of the images 190. The first image 194 may be selected based on the biometric data 170, as described with reference to FIG. 1. The images 190 may be default images or may be provided by a user (e.g., the user 106).

The method 1700 also includes generating a second image by modifying the first image based on the non-biometric data, at 1708. For example, the authorization data generator 110 of FIG. 1 may generate the second image 196 by modifying the first image 194 based on the non-biometric data 176, as described with reference to FIG. 1.

The method 1700 further includes storing the second image in memory, at 1710. For example, the authorization data generator 110 of FIG. 1 may store the second image 196 in the memory 132.

The method 1700 also includes transmitting the second image, at 1712. For example, the authorization data generator 110 of FIG. 1 may transmit the second image 196 via the transceiver 142 to the authentication device 104.

Figure 18:
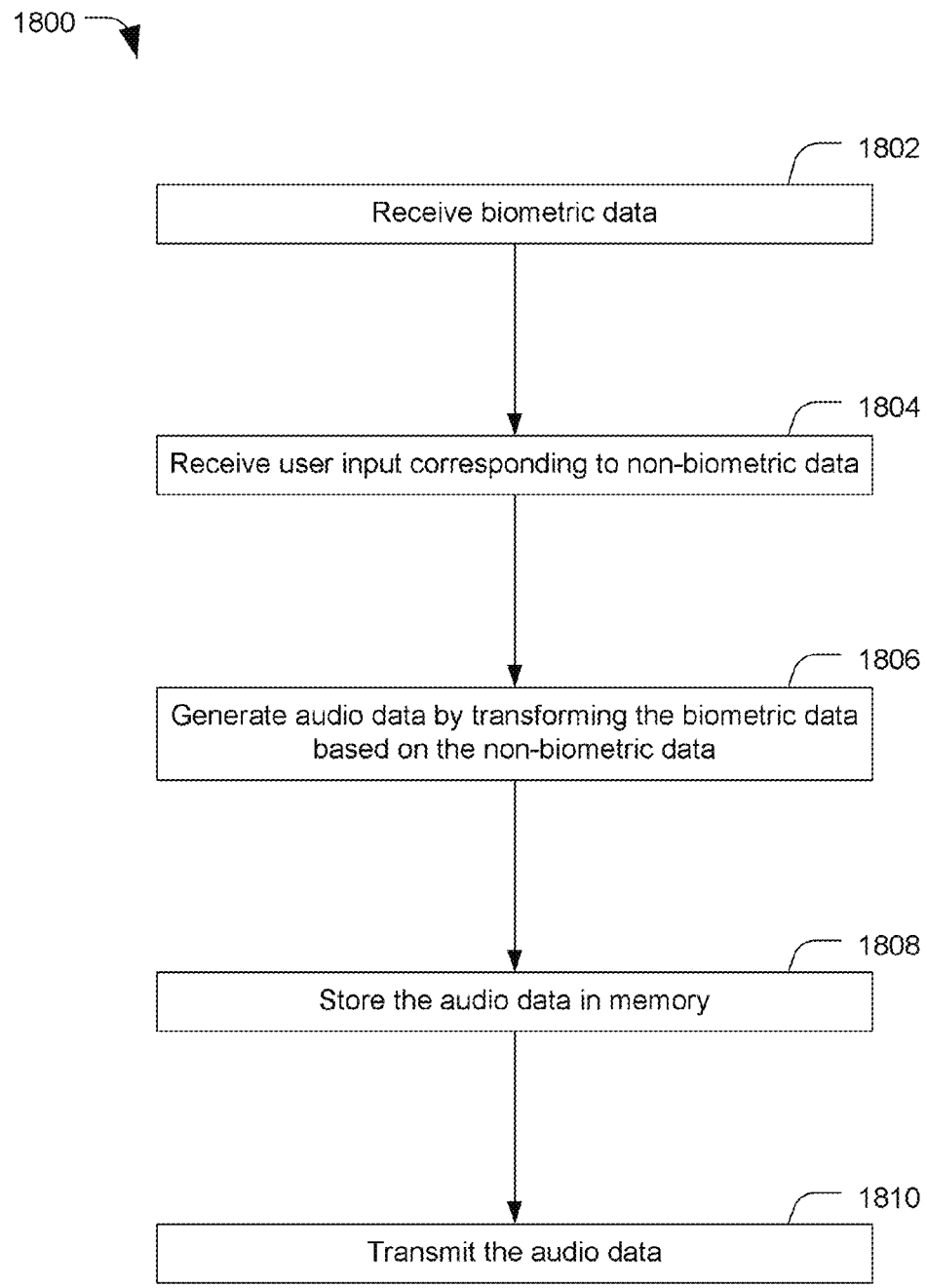
FIG. 18 is a flow diagram of a particular embodiment of generating authorization data based on biometric data and non-biometric data.

Referring to FIG. 18, a flow diagram of a particular embodiment of a method of generating authorization data is shown and generally designated 1800. The authorization data may be generated based on biometric data and non-biometric data. In a particular embodiment, the method 1800 may be performed by the authorization data generator 110 of FIG. 1.

The method 1800 includes receiving biometric data, at 1802. For example, the authorization data generator 110 of FIG. 1 may receive the biometric data 170, as described with reference to FIG. 1.

The method 1800 also includes receiving user input corresponding to non-biometric data, at 1804. For example, the authorization data generator 110 of FIG. 1 may receive the user input 172. The user input 172 may correspond to the non-biometric data 176. For example, the authorization data generator 110 may generate the non-biometric data 176 based on the user input 172, as described with reference to FIG. 1.

The method 1800 further includes generating audio data by sonifying the biometric data based on the non-biometric data, at 1806. For example, the authorization data generator 110 of FIG. 1 may generate the audio data 198 by sonifying the biometric data 170 based on the non-biometric data 176, as described with reference to FIG. 1.

The method 1800 also includes storing the audio data in memory, at 1808. For example, the authorization data generator 110 of FIG. 1 may store the audio data 198 in the memory 132 of FIG. 1.

The method 1800 further includes transmitting the audio data, at 1810. For example, the authorization data generator 110 of FIG. 1 may transmit the audio data 198 via the transceiver 142 to the authentication device 104, as described with reference to FIG. 1.

The method 1800 may thus enable generating authorization data by sonifying biometric data based on non-biometric data. The user may use non-audio (e.g., image) biometric data to generate audio authorization data. The method 1800 may enable transmitting the authorization data during a phone call using a plain old telephone system (POTS).

Figure 19:
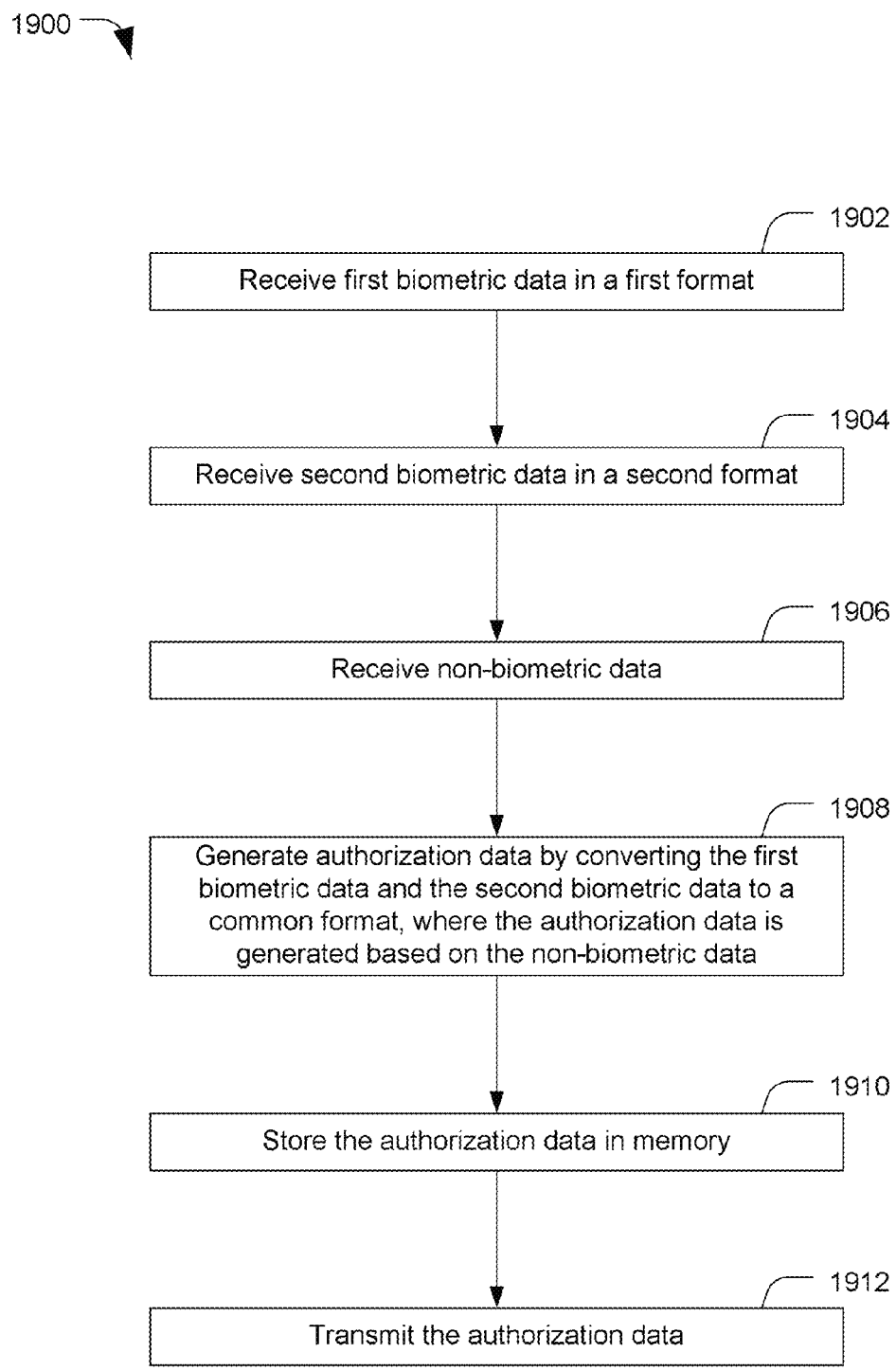
FIG. 19 is a flow diagram of a particular embodiment of a method of generating authorization data based on biometric data and non-biometric data.

Referring to FIG. 19, a flow diagram of a particular embodiment of a method of generating authorization data is shown and generally designated 1900. The authorization data may be generated based on biometric data and non-biometric. In a particular embodiment, the method 1900 may be performed by the authorization data generator 110 of FIG. 1.

The method 1900 includes receiving first biometric data in a first format, at 1902. For example, the authorization data generator 110 of FIG. 1 may receive the first biometric data 1370, as described with reference to FIG. 1. The first biometric data 1370 may be in a first format (e.g., image data).

The method 1900 also includes receiving second biometric data in a second format, at 1904. For example, the authorization data generator 110 of FIG. 1 may receive the second biometric data 1472, as described with reference to FIG. 14. The second biometric data 1472 may be in a second format (e.g., audio data).

The method 1900 further includes receiving non-biometric data, at 1906. For example, the authorization data generator 110 of FIG. 1 may receive the user input 172. The user input 172 may correspond to the non-biometric data 176. For example, the authorization data generator 110 may generate the non-biometric data 176 based on the user input 172, as described with reference to FIG. 1.

The method 1900 also includes generate authorization data by converting the first biometric data and the second biometric data to a common format, at 1908. The authorization data is generated based on the non-biometric data. For example, the authorization data generator 110 of FIG. 1 may convert the first biometric data 1470 to the image audio 1408, as described with reference to FIG. 14. The image audio 1408 and the second biometric data 1472 may have a common format (e.g., image data). The authorization data generator 110 may generate the biometric data 170 by combining the image audio 1408 and the second biometric data 1472, as described with reference to FIG. 14. The authorization data generator 110 may generate the authorization data 178 based on the biometric data 170 and the non-biometric data 176, as described with reference to FIG. 1.

The method 1900 further includes storing the authorization data in memory, at 1910. For example, the authorization data generator 110 of FIG. 1 may store the authorization data 178 in the memory 132.

The method 1900 also includes transmitting the authorization data, at 1912. For example, the authorization data generator 110 of FIG. 1 may transmit the authorization data 178 via the transceiver 142 to the authentication device 104.

The method 1900 may thus enable authorization data to be generated from different types of biometric data. The authorization data generated from multiple types of biometric data may be more secure than authorization data generated from a single type of biometric data. For example, generating the authorization data from multiple types of biometric data may make it harder to derive (e.g., reverse engineer) the biometric data from the authorization data.

Figure 20:
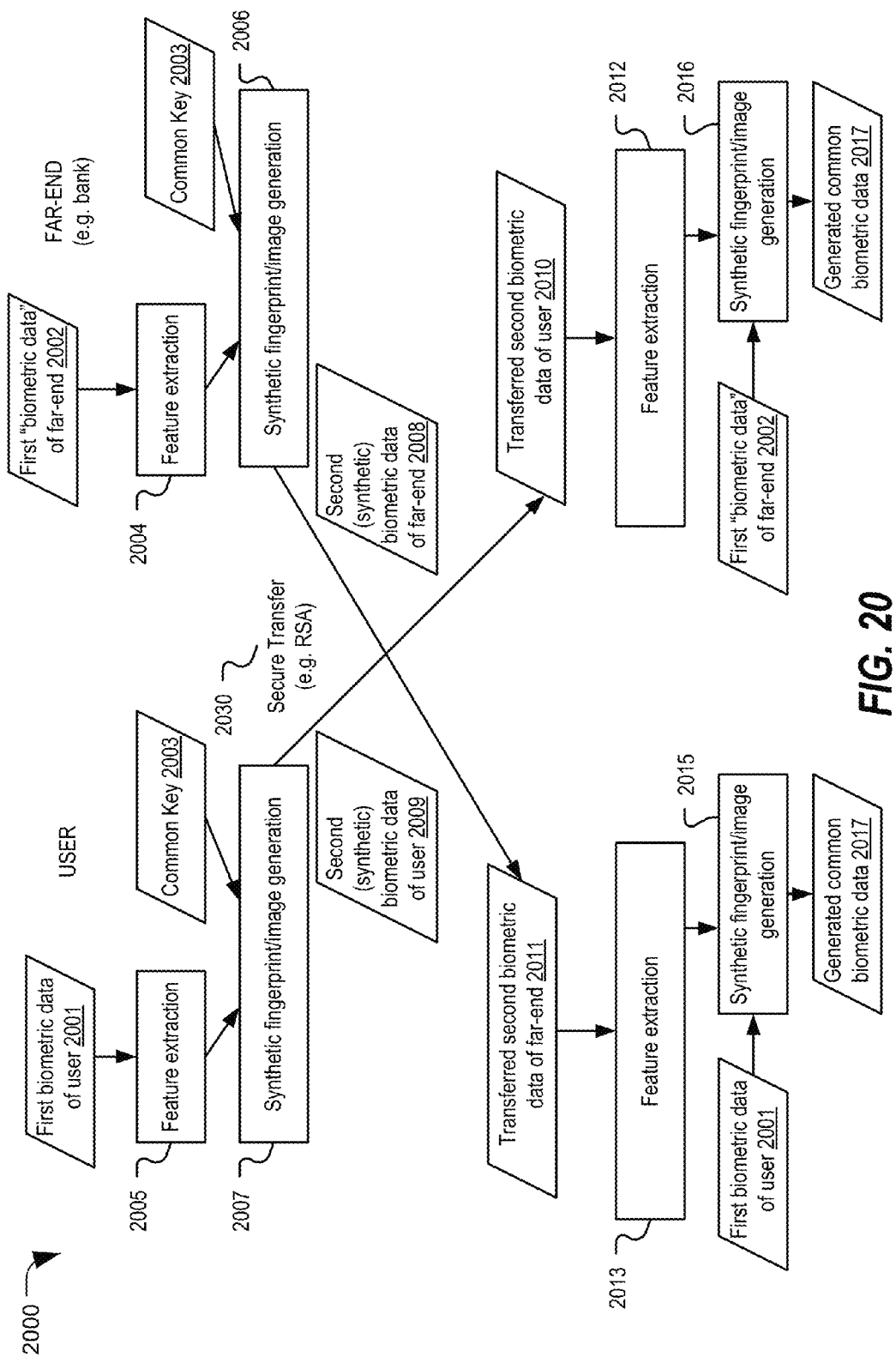
FIG. 20 is a flow diagram of a particular embodiment of a method of generating authorization data based on biometric data.

Referring to FIG. 20, a diagram of a particular embodiment of a method of generating authorization data is shown and generally designated 2000. The authorization data may be generated based on biometric data. In a particular embodiment, the method 2000 may be performed by the authorization data generator 110, the mobile device 102, the authentication device 104 of FIG. 1, or a combination thereof. For example, at least one operation of the method 2000 may be performed at the mobile device 102 and at least one operation of the method 2000 may be performed at the authentication device 104.

In FIG. 20, operations performed by a user device (e.g., the mobile device 102 of FIG. 1) associated with a user are shown on the left-hand side, designated "USER." Operations performed by a far-end device (e.g., associated with a bank authentication server) are shown on the right-hand side, designated "FAR-END." The far-end device may include the authentication device 104 of FIG. 1. In alternative embodiments, the far-end may represent another remote authentication entity, such as a server associated with a cloud storage/computing service, a home automation system, or another system that performs user authentication and/or secure communication. In an illustrative embodiment, USER operations of FIG. 20 are performed by the authorization data generator 110 of the mobile device 102, and FAR-END operations of FIG. 20 are performed by an authorization data generator of the authentication device 104.

The method 2000 includes performing feature extraction at the far-end, at 2004, based on first "biometric data" 2002 of the far-end. The first biometric data 2002 may function as a private key of the far-end. In a particular embodiment, the first biometric data 2002 includes a finger print, an iris scan, an image of a face, or a speech print of a user of the far-end (e.g., a bank employee). In an alternate embodiment, the first biometric data 2002 includes a private key (e.g., an integer, a natural number, etc.) selected based on a particular cryptosystem (e.g., Rivest Shamir Adleman (RSA) algorithm, Diffie-Hellman key exchange scheme, an elliptic curve cryptography scheme, etc.). In a particular embodiment, if the far-end is not associated with an individual user, the first biometric data 2002 may include arbitrary biometric data that is uniquely associated with the far-end (e.g., data that uniquely identifies the bank and/or a specific server owned by the bank).

The method 2000 also includes performing feature extraction at the user device, at 2005, based on first biometric data 2001 of the user. The first biometric data may function as a private key of the user. The first biometric data 2001 may include a finger print of the user, an iris scan of the user, a speech print of a user, an image of a face of the user, etc. The first biometric data of the user may be distinct from the first biometric data of the far-end.

The method 2000 further includes performing synthetic fingerprint/image generation at the far-end, at 2006, based on a common key 2003, to generate second (synthetic) biometric data 2008 of the far-end. The common key 2003 may be selected based on a particular cryptosystem (e.g., Rivest Shamir Adleman (RSA) algorithm, Diffie-Hellman key exchange scheme, an elliptic curve cryptography scheme, etc.). For example, the common key 2003 may correspond to a particular elliptic curve.

In a particular embodiment, the common key 2003 is a non-biometric alphanumeric key that was previously shared between the user device and the far-end device. For example, the user may have shared the common key 2003 (e.g., a personal identification number (PIN)) with a bank while setting up an account at the bank. The method 2000 also includes performing synthetic fingerprint/image generation at the user device, at 2007, based on the common key 2003, to generate second (synthetic) biometric data 2009 of the user. Although the user device and the far-end device may perform a common set of mathematical functions/transforms to generate the synthetic biometric data, the synthetic biometric data 2009 generated by the user device may differ from the synthetic biometric data 2008 generated by the far-end device, because the synthetic biometric data 2009 is generated at each device based on different biometric input 2001, 2002. In a particular embodiment, the synthetic biometric data is be generated at the user device and the synthetic biometric data 2008 is generated at the far end device by performing a common one-way function. In a particular embodiment, the synthetic biometric data 2008, the synthetic biometric data 2009, or both, may include image data. For example, the synthetic biometric data 2008, the synthetic biometric data 2009, or both, may correspond to the second image 196 or to the second biometric data 180 (e.g., a synthetic finger print scan, a synthetic iris scan, a synthetic image of a face), as described with reference to FIG. 1.

The method 2000 further includes conducting a secure transfer, at 2030, to transfer the synthetic biometric data 2009 of the user to the far-end and to transfer the synthetic biometric data 2008 of the far-end to the user device. In an example, the secure transfer 2030 is performed using an encrypted message exchange scheme (e.g., RSA).

The method 2000 also includes performing feature extraction at the far end, at 2012, to extract features from the transferred second (synthetic) biometric data 2010 of the user. The method 2000 further includes performing feature extraction at the user device, at 2013, to extract features from the transferred second (synthetic) biometric data 2011 of the far-end.

The method 2000 also includes performing synthetic fingerprint/image generation at the user device, at 2015, based on the first biometric data 2001 of the user and the extracted features from the transferred second (synthetic) biometric data 2011 of the far-end. The method 2000 further includes performing synthetic fingerprint/image generation at the far-end, at 2016, based on the first "biometric data" 2002 of the far-end and the extracted features from the transferred second (synthetic) biometric data 2010 of the user. As shown in FIG. 20, both the user device and the far-end may output the same generated common biometric data 2017. The common biometric data 2017 may be distinct from the second (synthetic) biometric data 2010, the second (synthetic) biometric data 2011, or both.

The common biometric data 2017 may be used to conduct a secure and/or authenticated communication session between the user device and the far-end device. For example, the authentication device 104 (e.g., the far-end device) may be configured to authenticate the mobile device 102 (e.g., the user device), a user (e.g., the user 106 of FIG. 1) of the mobile device 102, or both, based on the common biometric data 2017. The mobile device 102 may transmit the common biometric data 2017 via a communication channel to the authentication device 104. The communication channel may correspond to at least one of a wireless fidelity (Wi-Fi) network, a cellular network, a local area network (LAN), or a wide area network (WAN). The authentication device 104 may determine that the mobile device 102, the user of the mobile device 102, or both, are authenticated based on determining that the common biometric data 2017 received from the mobile device 102 and the common biometric data 2017 generated at the authentication device 104 are the same (or substantially similar). The common biometric data 2017 may be encrypted at the mobile device 102 prior to transmission to the authentication device 104.

As another example, the common biometric data 2017 may be used as an encryption key or may be used to derive encryption keys. The mobile device 102 (or the authentication device 104) may encrypt data based on the common biometric data 2017 prior to transmitting the data to the authentication device 104 (or the mobile device 102). The data may be securely (or relatively securely) transmitted subsequent to being encrypted based on the common biometric data 2017. The biometric input 2001, 2002 may be irrecoverable (or substantially irrecoverable) from the encrypted data and/or the common biometric data 2017.

The authentication device 104 may be configured to enable operation of a locking mechanism of at least one of a building door, a house door, a vehicle door, a garage door, or another door. For example, the authentication device 104 may enable (or disable) the locking mechanism in response to authenticating the mobile device 102, the user of the mobile device 102, or both. As another example, the authentication device 104 may be configured to enable access to at least one of an automatic teller machine (ATM) or a point of sale machine. For example, the authentication device 104 may enable access to the ATM and/or the point of sale machine in response to authenticating the mobile device 102, the user of the mobile device 102, or both.

The method 2000 may thus enable remote authentication of a user based on a key exchange using synthetic biometric data. Advantageously, biometric data that uniquely identifies the user (e.g., the first biometric data 2001 of the user) and the remote authentication server (e.g., the first biometric data 2002 of the far-end) may be kept secure (e.g., not transmitted between devices).

Figure 21:
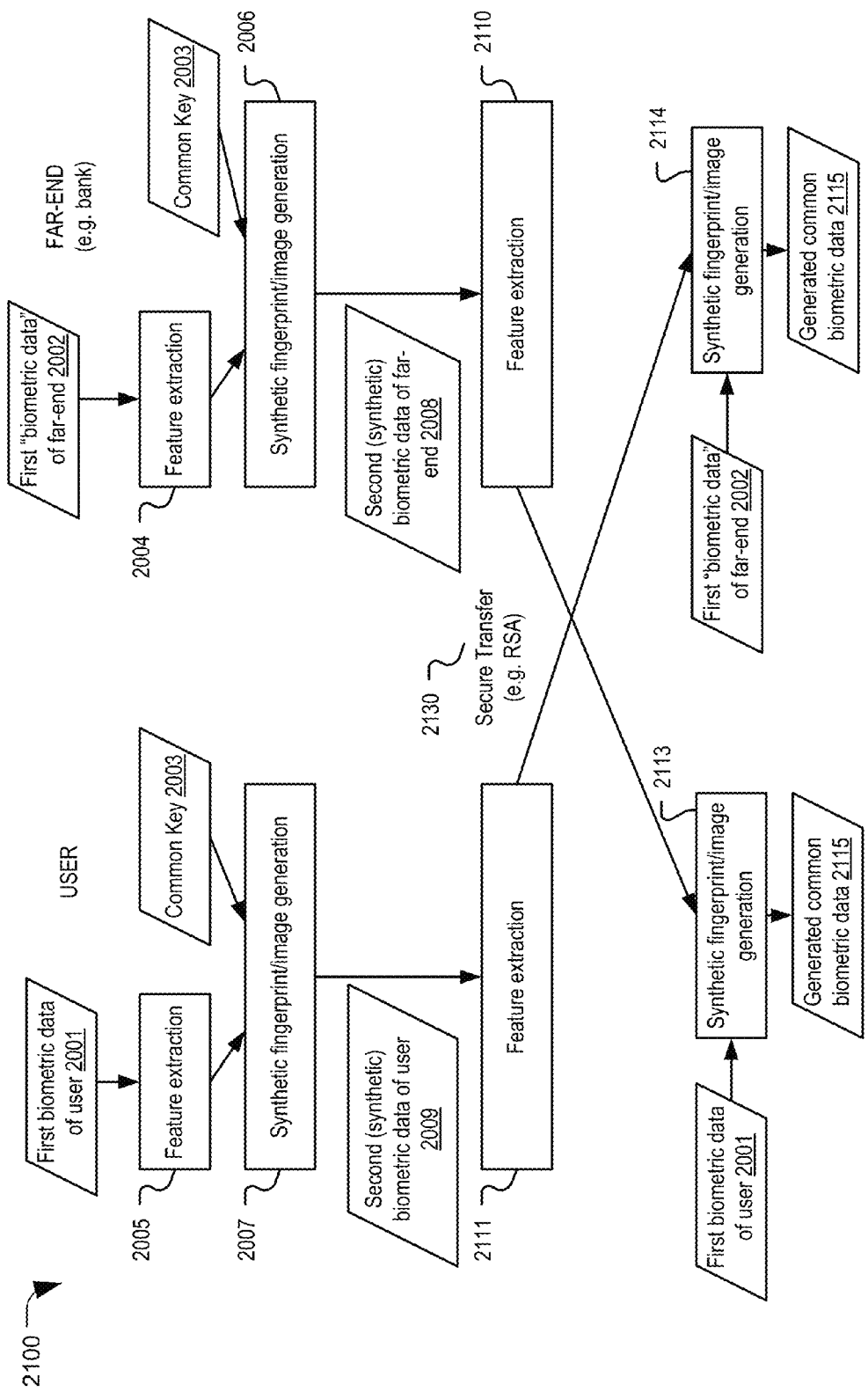
FIG. 21 is a flow diagram of another particular embodiment of a method of generating authorization data based on biometric data.

Referring to FIG. 21, a diagram of another particular embodiment of a method of generating authorization data is shown and generally designated 2100. In a particular embodiment, the method 2100 may be performed by the authorization data generator 110, the mobile device 102, the authentication device 104 of FIG. 1, or a combination thereof. For example, at least one operation of the method 2100 may be performed at the mobile device 102 and at least one operation of the method 2100 may be performed at the authentication device 104.

In FIG. 21, operations performed by a user device associated with a user are shown on the left-hand side, designated "USER." Operations performed by a far-end device (e.g., associated with a bank authentication server) are shown on the right-hand side, designated "FAR-END." In alternative embodiments, the far-end may represent another remote authentication entity, such as a server associated with a cloud storage/computing service, a home automation system, or another system that performs user authentication and/or secure communication. In an illustrative embodiment, USER operations of FIG. 21 are performed by the authorization data generator 110 of the mobile device 102, and FAR-END operations of FIG. 21 are performed by an authorization data generator of the authentication device 104.

The method 2100 differs from the method 2000 of FIG. 20 in that the method 2100 includes exchange of features extracted from synthetic biometric data, instead of exchanging synthetic biometric data itself (e.g., to reduce messaging overhead).

The method 2100 includes performing feature extraction at the far-end, at 2110, to extract features from the second (synthetic) biometric data 2008 of the far-end. The method 2100 also includes performing feature extraction, at 2111, to extract features from the second (synthetic) biometric data 2009 of the user. The method 2100 further includes conducting a secure transfer, at 2130, to exchange the extracted features (instead of exchanging the synthetic biometric data 2008 and 2009, as in FIG. 20).

The method 2100 also includes performing synthetic fingerprint/image generation at the user device, at 2113, based on the first biometric data 2001 of the user and the received features extracted from the second (synthetic) biometric data 2008 of the far-end, to generate common biometric data 2115. The method 2100 further includes performing synthetic fingerprint/image generation at the far-end, at 2114, based on the first "biometric data" 2002 of the far-end and received features extracted from the second (synthetic) biometric data 2009 of the user, to generate the common biometric data 2115. The common biometric data 2115 may be used to conduct a secure and authenticated communication session between the user device and the far-end. As an example, the common biometric data 2115 may be used as an encryption key or may be used to derive encryption keys Referring to FIG. 22, a diagram of a particular embodiment of a method of generating authorization data is shown and generally designated 2200. The method 2200 differs from the method 2000 in that the method 2200 includes synthetic finger print/sound generation based on biometric and a common key.

The method 2200 includes performing synthetic finger print/sound generation at the far-end, at 2206, to generate second (synthetic) biometric data 2208 of the far-end. The method 2200 also includes performing synthetic finger print/ sound generation, at 2207, to generate second (synthetic) biometric data 2209 of the user. The synthetic biometric data 2208, the synthetic biometric data 2209, or both, may correspond to sound data. For example, the synthetic biometric data 2208, the synthetic biometric data 2209, or both, may correspond to the second biometric data 180 (e.g., a synthetic voice print sound data instead of exchanging image data, as in FIG. 20). The method 2200 further includes conducting a secure transfer, at 2230, to exchange the generated synthetic biometric data (e.g., exchanging sound data instead of exchanging image data, as in FIG. 20).

The method 2200 further includes performing feature extraction 2212 at the far-end, at 2212, to extract features from the transferred second (synthetic) biometric data 2210 of the user. The method 2200 also includes performing feature extraction at the user device, at 2213, to extract features from the transferred second (synthetic) biometric data 2211 of the far-end.

Figure 22:
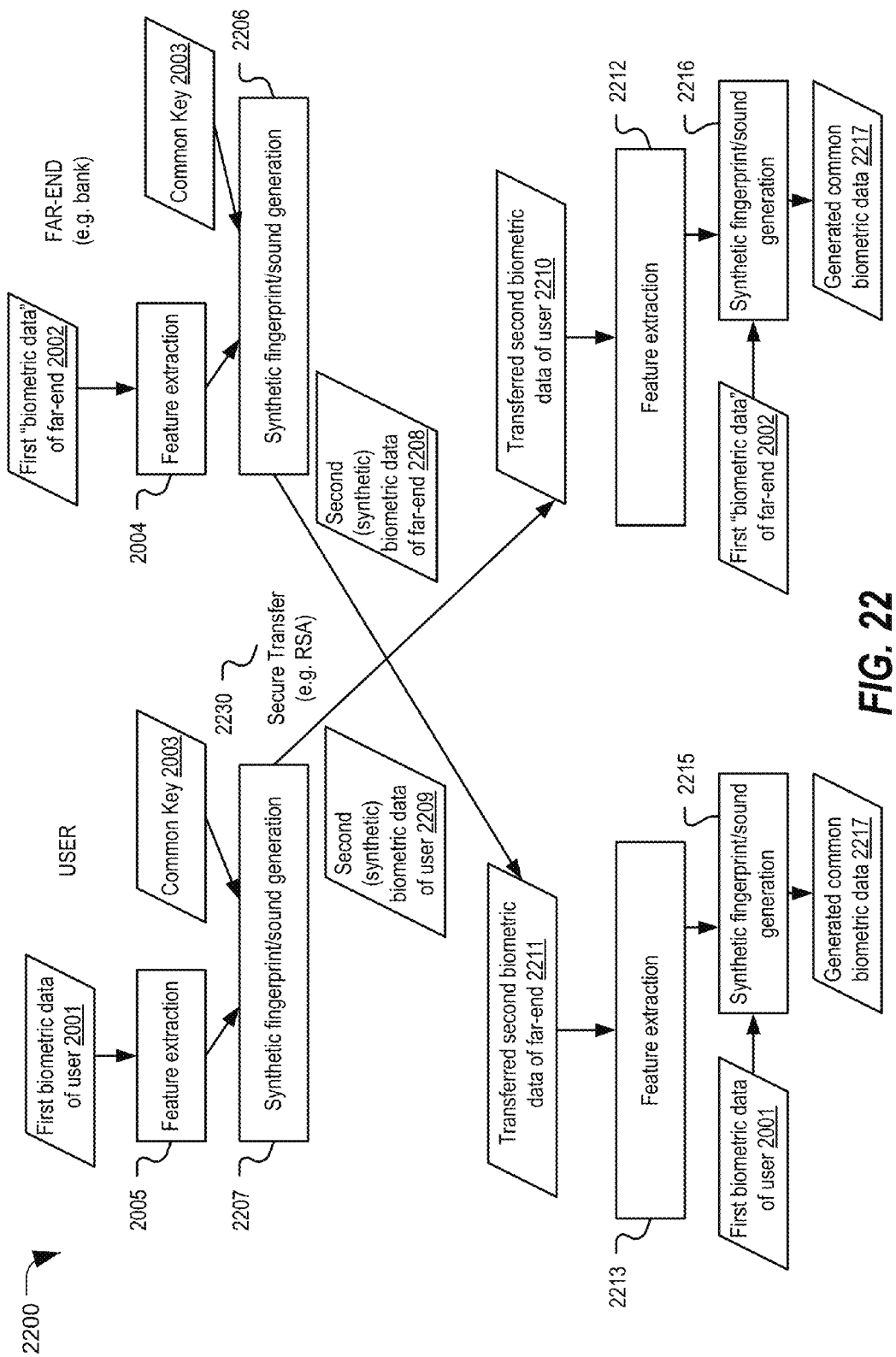
FIG. 22 is a flow diagram of another particular embodiment of a method of generating authorization data based on biometric data.

The method 2200 further includes performing synthetic finger print/sound generation at the user device, at 2215, based on the first biometric data 2001 of the user and the extracted features from the transferred second (synthetic) biometric data 2211 of the far-end. The method 2200 also includes performing synthetic finger print/sound generation at the far-end, at 2216, based on the first "biometric data" 2002 of the far-end and the extracted features from the transferred second (synthetic) biometric data 2210 of the user. As shown in FIG. 22, both the user device and the far-end may output the same generated common biometric data 2217. The common biometric data 2217.

The common biometric data 2217 may be used to conduct a secure and authenticated communication session between the user device and the far-end. As an example, the common biometric data 2217 may be used as an encryption key or may be used to derive encryption keys. As another example, the user device may send the common biometric data 2217 as a "password" to the far-end. The far-end may selectively authenticate the user, the user device, or both, based on a comparison of the common biometric data 2217 received from the user device and the common biometric data 2217 generated at the far-end. To illustrate, the far-end may determine that the user, the user device, or both, are authenticated in response to determining that the common biometric data 2217 received from the user device matches the common biometric data 2217 generated at the far-end.

Figure 23:
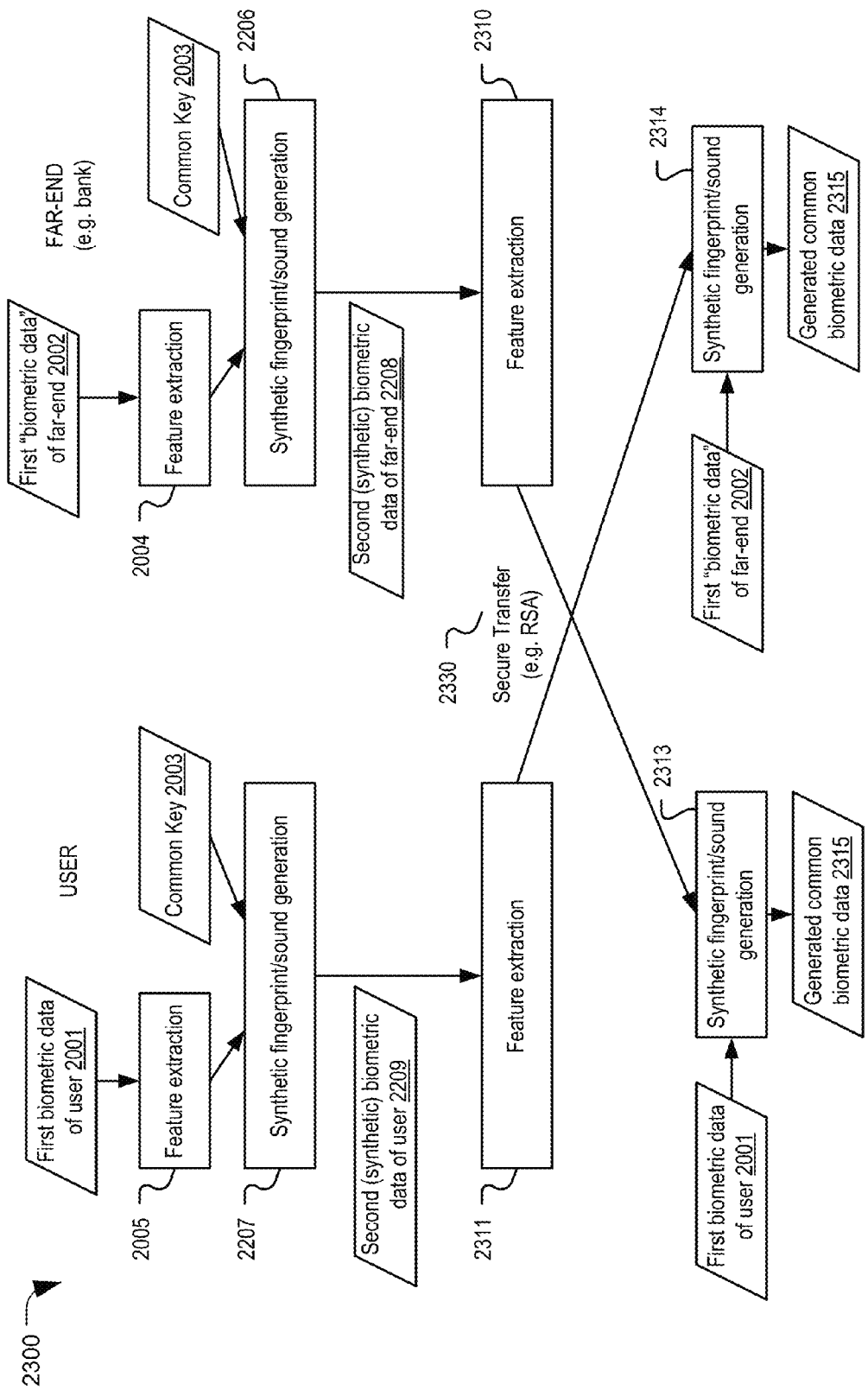
FIG. 23 is a flow diagram of another particular embodiment of a method of generating authorization data based on biometric data.

Referring to FIG. 23, a diagram of another particular embodiment of a method of generating authorization data is shown and generally designated 2300. The method 2300 differs from the method 2100 in that the method 2300 includes synthetic finger print/sound generation based on biometric and a common key. The method 2300 differs from the method 2200 in that the method 2300 includes exchange of features extracted from synthetic biometric data, instead of exchanging synthetic biometric data itself (e.g., to reduce messaging overhead).

The method 2300 includes performing feature extraction at the far-end, at 2310, to extract features from the second (synthetic) biometric data 2208 of the far-end. The method 2300 also includes performing feature extraction, at 2311, to extract features from the second (synthetic) biometric data 2209 of the user. The method 2300 further includes conducting a secure transfer, at 2330, to exchange features (instead of exchanging the synthetic biometric data 2208 and 2209, as in FIG. 20).

The method 2300 also includes performing synthetic fingerprint/sound generation at the user device, at 2313, based on the first biometric data 2001 of the user and the received features extracted from the second (synthetic) biometric data 2208 of the far-end, to generate common biometric data 2315. The method 2300 further includes performing synthetic fingerprint/sound generation at the far-end, at 2314, based on the first "biometric data" 2002 of the far-end and received features extracted from the second (synthetic) biometric data 2209 of the user, to generate the common biometric data 2315.

The common biometric data 2315 may be used to conduct a secure and authenticated communication session between the user device and the far-end. As an example, the common biometric data 2315 may be used as an encryption key or may be used to derive encryption keys. As another example, the user device may send the common biometric data 2315 as a "password" to the far-end. The far-end may selectively authenticate the user, the user device, or both, based on a comparison of the common biometric data 2315 received from the user device and the common biometric data 2315 generated at the far-end. To illustrate, the far-end may determine that the user, the user device, or both, are authenticated in response to determining that the common biometric data 2315 received from the user device matches the common biometric data 2315 generated at the far-end.

Figure 24:
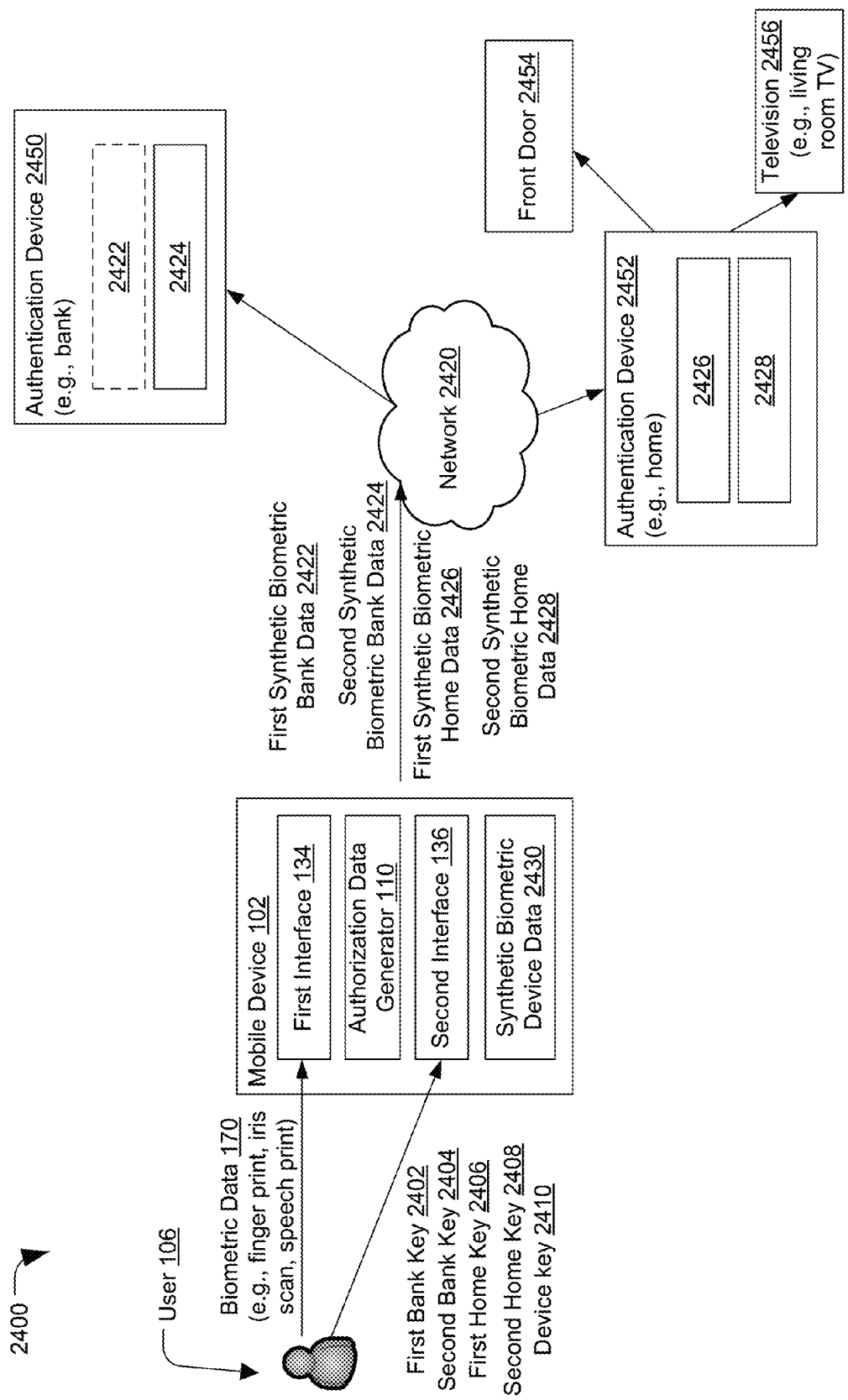
FIG. 24 is a diagram of another particular embodiment of a system configured to generate authorization data based on biometric data and non-biometric data.

Referring to FIG. 24, a diagram of a particular embodiment of a system configured to generate authorization data based on biometric data and non-biometric data is shown and generally designated 2400. The system 2400 illustrates "configurability" of synthetic biometric data, as described herein.

The system 2400 includes the mobile device 102 coupled, via a network 2420, to an authentication device 2450 (e.g., an authentication server of a bank) and to an authentication device 2452 (e.g., an authentication server at a home, such as for a home automation system). In a particular embodiment, the mobile device 102 may be coupled to fewer than two or more than two authentication devices. Moreover, authentication devices may be associated with entities other than a bank and a home.

The user 106 may use the mobile device 102 to access multiple systems. For example, the user 106 may use the mobile device 102 to access a financial system (e.g., an online banking system, an online shopping system, a stock exchange system, etc.). As another example, the user 106 may use the mobile device 102 to access home automation function (e.g., a home security system, a garage door, a front door, an entertainment system, a heating system, a cooling system, a sprinkler system, a coffee maker, a refrigerator, a gas range, a slow cooker, a lighting system, other appliances, etc.) of a building. As a further example, the user 106 may user the mobile device 102 to access systems (e.g., a temperature control system, an engine, a security system, doors, trunk, lights, windows, etc.) of a vehicle (e.g., a car).

The user 106 may provide the biometric data 170, via the first interface 134 (e.g., a sensor), to the mobile device 102, as described with reference to FIG. 1. The authorization data generator 110 may generate the biometric features 182 based on the biometric data 170. The authorization data generator 110 may store the biometric data 170, the biometric features 182, or both, in the memory 132 of FIG. 1. The user 106 may provide a first bank key 2402 (e.g., user input) to access the authentication device 2450. For example, the first bank key 2402 may correspond to a particular non-biometric key (e.g., letters, numbers, a date, etc.) associated with a bank account of the user 106.

The authorization data generator 110 may generate first synthetic biometric bank data 2422 (e.g., synthetic biometric data) based on the biometric data 170 and the first bank key 2402, as described with reference to FIG. 1. For example, the first synthetic biometric bank data 2422 may correspond to the second biometric data 180 of FIG. 1 and the first bank key 2402 may correspond to the user input 172 of FIG. 1. The authorization data generator 110 may provide the first synthetic biometric bank data 2422 to the authentication device 2450.

The authentication device 2450 may compare the first synthetic biometric bank data 2422 to previously stored biometric data associated with the user 106. The authentication device 2450 may determine that authentication of the user 106 is successful in response to determining that the first synthetic biometric bank data 2422 matches the previously stored biometric data. Thus, the first synthetic biometric bank data 2422 may function as a bank "password." The mobile device 102 may conduct an authenticated session with another electronic device via the network 2420 when the authentication device 2450 authenticates the user 106 based on the first synthetic biometric bank data 2422. For example, the authentication device 2450 may include an authentication server and may provide access to another electronic device (e.g., a device of a financial system) in response to determining that authentication of the user 106 is successful. The authentication device 2450 may determine that authentication of the user 106 is not successful in response to determining that the first synthetic biometric bank data 2422 does not match the previously stored biometric data.

The user 106 may provide a second bank key 2404 to the mobile device 102 (e.g., to change the bank "password") subsequent to successful authentication by the authentication device 2450. For example, the authorization data generator 110 may generate second synthetic biometric bank data 2424 (e.g., synthetic biometric data) based on the biometric data 170 and the second bank key 2404. The authorization data generator 110 may use the biometric data 170 or the biometric features 182 that were previously stored to generate the second synthetic biometric bank data 2424. In a particular embodiment, the authorization data generator 110 may prompt the user 106 to provide the biometric data 170 in response to determining that the biometric data 170 or the biometric features 182 that were previously stored have "expired." For example, the authorization data generator 110 may determine that the biometric data 170 or the biometric features 182 have expired based on a first timestamp. To illustrate, the authorization data generator 110 may determine that the biometric data 170 or the biometric features 182 have expired in response to determining that a difference the first timestamp and a second (e.g., "current") timestamp of a clock satisfies a particular expiration threshold (e.g., 24 hours). The first timestamp may indicate a first time at which the biometric data 170 is received from the user 106 or a second time at which the biometric data 170 or the biometric features 182 are stored in memory. In this embodiment, the authorization data generator 110 may use the biometric data 170 or the biometric features 182 to generate the second synthetic biometric bank data 2424 in response to determining that the biometric data 170 or the biometric features 182 are unexpired.

The authorization data generator 110 may provide the second synthetic biometric bank data 2424 to the authentication device 2450. The authentication device 2450 may replace the first synthetic biometric bank data 2422 with the second synthetic biometric bank data 2424 as authentication data associated with the user 106. For example, the authentication device 2450 may delete (or mark for deletion) the first synthetic biometric bank data 2422. To illustrate, the authentication device 2450 may delete (or mark for deletion) an association between the first synthetic biometric bank data 2422 and the user 106. The authentication device 2450 may store the second synthetic biometric bank data 2424, an association between the second synthetic biometric bank data 2424 and the user 106, or both, in memory. The user 106 may thus reconfigure a synthetic biometric password by providing a different user input (e.g., non-biometric data).

The user 106 may provide a first home key 2406 to access the authentication device 2452. For example, the first home key 2406 may correspond to a password (e.g., "DOOR") associated with a front door 2454. To illustrate, a guest of the user 106 may arrive at a home of the user 106 while the user 106 is away. The user 106 may provide the first home key 2406 to unlock the front door 2454 to enable the guest to enter the home.

The authorization data generator 110 may prompt the user 106 to provide the biometric data 170 in response to determining that the biometric data 170 or the biometric features 182 are expired. The authorization data generator 110 may generate first synthetic biometric home data 2426 in response to determining the biometric data 170 or the biometric features 182 are unexpired. For example, the authorization data generator 110 may generate the first synthetic biometric home data 2426 based on the first home key 2406 and the biometric data 170 (or the biometric features 182), as described with reference to FIG. 1. The authorization data generator 110 may provide the first synthetic biometric home data 2426 to the authentication device 2452. The first synthetic biometric home data 2426 may correspond to authentication data associated with the user 106 and the front door 2454. The authentication device 2452 may send an unlock signal to the front door 2454 in response to determining that the first synthetic biometric home data 2426 matches previously stored synthetic biometric data (e.g., a "password") associated with the front door 2454. In a particular embodiment, the mobile device 102 may conduct an authenticated session with another electronic device (e.g., the front door 2454) via the network 2420 when the authentication device 2452 authenticates the user 106 based on the first synthetic biometric home data 2426.

The user 106 may also provide a second home key 2408 to access another system (e.g., a television 2456) coupled to the authentication device 2452. For example, the second home key 2408 may correspond to a password (e.g., "Living room TV password") associated with the television 2456. To illustrate, the user 106 may keep the television 2456 (or particular channels of the television 2456) disabled while the user 106 is away from home. The user 106 may provide the second home key 2408 to unlock the television 2456 (or the particular channels of the television 2456) to enable the guest to use the television 2456.

The authorization data generator 110 may prompt the user 106 to provide the biometric data 170 in response to determining that the biometric data 170 or the biometric features 182 are expired. The authorization data generator 110 may generate second synthetic biometric home data 2428 in response to determining the biometric data 170 or the biometric features 182 are unexpired. For example, the authorization data generator 110 may generate the second synthetic biometric home data 2428 based on the second home key 2408 and the biometric data 170 (or the biometric features 182), as described with reference to FIG. 1. The authorization data generator 110 may provide the second synthetic biometric home data 2428 to the authentication device 2452. The second synthetic biometric home data 2428 may correspond to authentication data associated with the user 106 and the television 2456. The authentication device 2452 may send an unlock signal to the television 2456 in response to determining that the second synthetic biometric home data 2428 matches previously stored synthetic biometric data associated with the television 2456 (or the particular channels of the television 2456).

It should be noted that embodiments of the present disclosure may enable local authentication in addition to the above-described remote authentication. For example, the user 106 may provide a device key 2410 to set up secure access of the mobile device 102 (or particular features of the mobile device 102). The user 106 may provide the device key 2410 during an enrollment phase. The authorization data generator 110 may generate synthetic biometric device data 2430 (e.g., first synthetic biometric data) based on the biometric data 170 and the device key 2410. The authorization data generator 110 may store the synthetic biometric device data 2430 in memory. To access the mobile device 102 (e.g., wake the mobile device 102 from a sleep mode), the user 106 may provide biometric data and a user input to the mobile device 102 during an authentication phase. The authorization data generator 110 may generate second biometric data (e.g., second synthetic biometric data) based on the biometric data and the user input received during the authentication phase. The authorization data generator 110 may compare the second biometric data to the synthetic biometric device data 2430 to authenticate the user 106. For example, the authorization data generator 110 may provide access to the mobile device 102 (or features of the mobile device 102) in response to determining that the second biometric data substantially matches the synthetic biometric device data 2430. To illustrate, the authorization data generator 110 may determine that the second biometric data and the synthetic biometric device data 2430 substantially match in response to determining that a similarity between the second biometric data and the synthetic biometric device data 2430 satisfies a particular confidence threshold.

The system 2400 may thus enable a user to reconfigure a synthetic biometric password by changing a non-biometric key (e.g., non-biometric data). In addition, the user may provide distinct synthetic biometric data to an authentication device to access distinct features or electronic devices. Further, the system 200 may enable multi-factor local device authentication.

Figure 25:
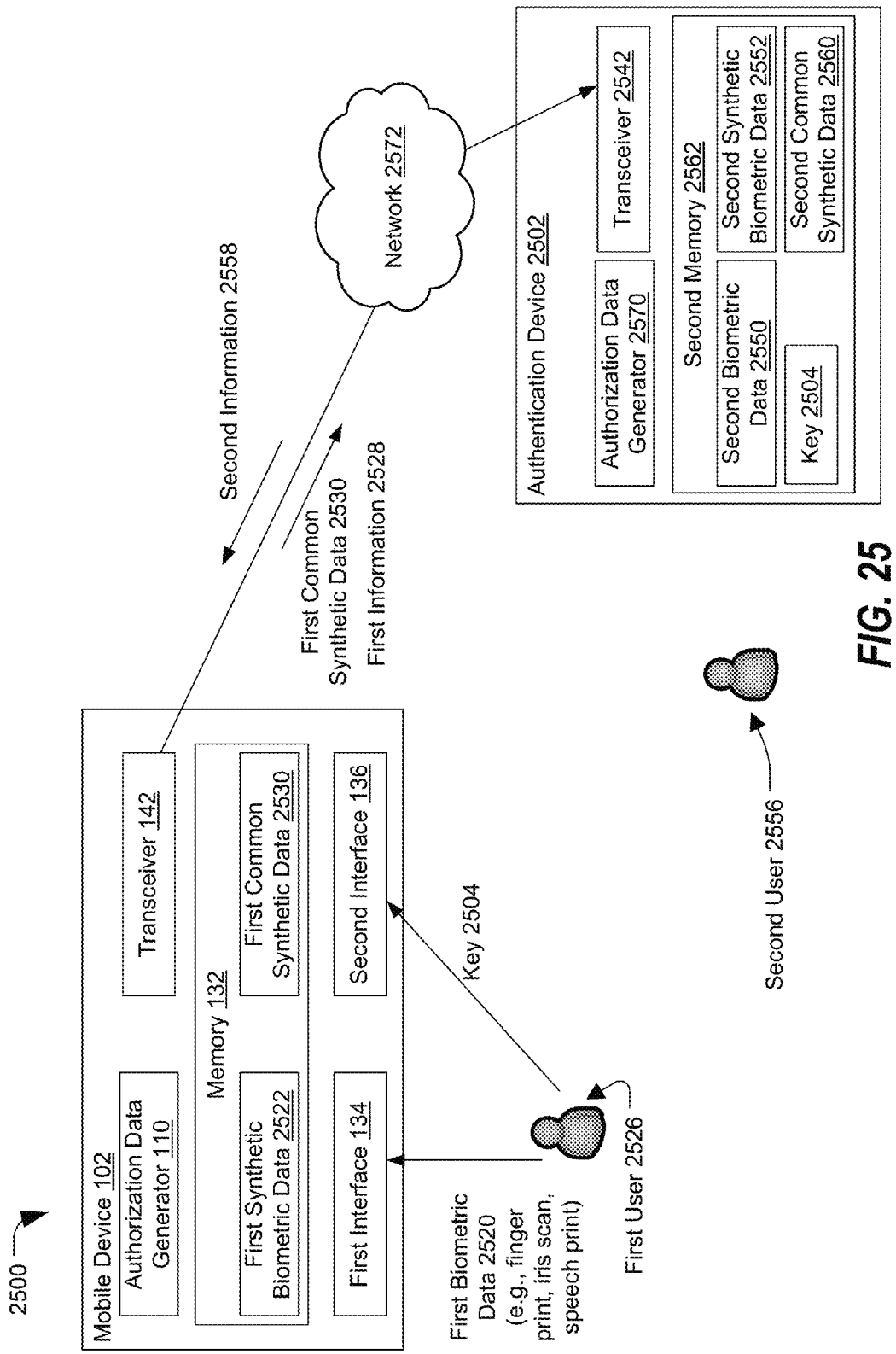
FIG. 25 is a diagram of a particular embodiment of a system configured to selectively authorize access based on biometric data and non-biometric data.

Referring to FIG. 25, a diagram of a particular embodiment of a system configured to selectively authorize access based on biometric data and non-biometric data is shown and generally designated 2500. The system 2500 illustrates Diffie-Hellman-type authentication using synthetic biometric data, as described herein.

The system 2500 includes the mobile device 102 coupled, via a network 2572, to an authentication device 2502. The authentication device 2502 may include, or be coupled to, at least one of a vehicle, an authentication server, a home automation system, a cloud storage/computing system, a point-of-sale machine, an automatic teller machine (ATM), a financial system, a bank, a store, a user account, or another system that performs user (or device) authentication. In a particular embodiment, the mobile device 102 may be coupled to more than two authentication devices.

The authentication device 2502 may include a transceiver 2542, a second memory 2562, and an authorization data generator 2570. The authorization data generator 2570 may be configured to operate in a similar manner as the authorization data generator 110 of FIG. 1.

A first user 2526 may use the mobile device 102 to access multiple systems. For example, the first user 2526 may use the mobile device 102 to access a financial system (e.g., an online banking system, an online shopping system, a stock exchange system, etc.). As another example, the first user 2526 may user the mobile device 102 to access systems (e.g., a temperature control system, a braking system, an engine, a sound system, an entertainment system, a communication system, a global positioning system, a locking system of a door, a security system, doors, trunk, lights, windows, etc.) of a vehicle (e.g., a car). As a further example, the first user 2526 may use the mobile device 102 to access home automation function (e.g., a home security system, a garage door, a front door, an entertainment system, a heating system, a cooling system, a sprinkler system, a coffee maker, a refrigerator, a gas range, a slow cooker, a lighting system, other appliances, etc.) of a building.

A key 2504 may be provided to the authentication device 2502 and to the mobile device 102 (or to the first user 2526). For example, a first user 2526 may have shared the key 2504 (e.g., a personal identification number (PIN)) with a bank while setting up an account at the bank.

The first user 2526 may provide the first biometric data 2520, via the first interface 134 (e.g., a sensor), to the mobile device 102, as described with reference to FIG. 1. The first biometric data 2520 may correspond to the biometric data 170 of FIG. 1, the first biometric data 2001 of FIGS. 20-23, or a combination thereof. For example, the first biometric data 2520 may include a finger print, an iris scan, an image of a face, or a speech print of the first user 2526. The first biometric data 2520 may function as a private key of the first user 2526.

The authorization data generator 110 may generate first biometric features (e.g., the biometric features 182) based on the first biometric data 2520. The authorization data generator 110 may store the first biometric data 2520, the first biometric features, or both, in the memory 132. The first user 2526 may provide the key 2504 (e.g., user input) to the mobile device 102. The authorization data generator 110 may store the key 2504 in the memory 132.

In a particular embodiment, the first user 2526 may provide the first biometric data 2520, the key 2504, or both, to the mobile device 102 for each authentication by the authentication device 2502. For example, the first user 2526 may provide a finger print scan and a PIN each time the first user 2526 requests access to the bank account. In an alternate embodiment, the authorization data generator 110 may obtain the first biometric data 2520, the first biometric features, the key 2504, or a combination thereof, from the memory 132 in response to a user request for authentication by the authentication device 2502. For example, the authorization data generator 110 may obtain the first biometric data 2520 (or the first biometric features) from the memory 132 and may receive the key 2504 from the first user 2526.

The authorization data generator 110 may generate first synthetic biometric data 2522 (e.g., synthetic biometric data) based on the first biometric data 2520 and the key 2504, as described with reference to FIG. 1. For example, the first synthetic biometric data 2522 may correspond to the second biometric data 180 of FIG. 1, the synthetic biometric data 2009 of FIGS. 20-21, the synthetic biometric data 2209 of FIGS. 22-23, or a combination thereof. The key 2504 may correspond to the user input 172, the non-biometric data 176 of FIG. 1, the common key 2003 of FIGS. 20-23, or a combination thereof. The authorization data generator 110 may provide first information 2528 to the authentication device 2502. For example, the transceiver 142 may transmit the first information 2528. The first information 2528 may include the first synthetic biometric data 2522 or features of the first synthetic biometric data 2522. The authorization data generator 110 may store the first information 2528 in the memory 132.

In a particular embodiment, the authorization data generator 110 may refrain from storing the first biometric data 2520, the first biometric features, the key 2504, or a combination thereof, in the memory 132. The authorization data generator 110 may provide the first information 2528 to the authentication device 2502 in response to a user request for authentication by the authentication device 2502. The first information 2528 may function as a public key of the first user 2526.

The authorization data generator 2570 may generate second synthetic biometric data 2552 (e.g., synthetic biometric data) based on second biometric data 2550 and the key 2504, as described with reference to FIG. 1. For example, the second synthetic biometric data 2550 may correspond to the second biometric data 180 of FIG. 1, the synthetic biometric data 2008 of FIGS. 20-21, the synthetic biometric data 2408 of FIGS. 22-23, or a combination thereof. In a particular embodiment, the authorization data generator 2570 may generate the second synthetic biometric data 2552 prior to receiving the first information 2528. For example, the authorization data generator 2570 may generate the second synthetic biometric data 2552 in response to receiving the key 2504 (e.g., during a password setting or resetting phase). To illustrate, the authorization data generator 2570 may generate the second synthetic biometric data 2552 in response to the first user 2526 setting (or resetting) the PIN associated with the bank account. The authorization data generator 2570 may store the second synthetic biometric data 2522 in the second memory 2562 as a "password" associated with the bank account of the first user 2526. In an alternate embodiment, the authorization data generator 2570 may generate the second synthetic biometric data 2552 in response to receiving the first information 2528.

The second biometric data 2550 may function as a private key of the authentication device 2502. The second biometric data 2550 may correspond to the biometric data 170 of FIG. 1, the first biometric data 2001 of FIGS. 20-23, or a combination thereof. In a particular embodiment, the second biometric data 2550 includes a finger print, an iris scan, an image of a face, or a speech print of a second user 2556 of the authentication device 2502 (e.g., a bank employee). In an alternate embodiment, the second biometric data 2550 includes a private key (e.g., an integer, a natural number, etc.) selected based on a particular cryptosystem (e.g., Rivest Shamir Adleman (RSA) algorithm, Diffie-Hellman key exchange scheme, an elliptic curve cryptography scheme, etc.). In a particular embodiment, the second biometric data 2550 may include arbitrary biometric data that is uniquely associated with the authentication device 2502 (e.g., data that uniquely identifies the bank and/or a specific server owned by the bank).

The authorization data generator 2570 may send second information 2558 to the mobile device 102 in response to receiving the first information 2528 from the mobile device 102. The second information 2558 may include the second synthetic biometric data 2552 or features of the second synthetic biometric data 2552. The second information 2558 may function as a public key of the authentication device 2502. The authorization data generator 2570 may store the second information 2558 in the second memory 2562. The authorization data generator 2570 may send the second information 2558 to the mobile device 102. For example, the transceiver 2542 may transmit the second information 2558.

The authorization data generator 110 may receive, via the transceiver 142, the second information 2558. The authorization data generator 110 may generate first common synthetic data 2530 based on the second information 2558 and the first biometric data 2520. The first common synthetic data 2530 may correspond to the common biometric data 2017 of FIG. 20, the common biometric data 2115 of FIG. 21, the common biometric data 2217 of FIG. 24, the common biometric data 2217 of FIG. 27, or a combination thereof. For example, the authorization data generator 110 may extract first features from the first biometric data 2520 and may extract second features from the second information 2558, as described with reference to FIGS. 20-23. The authorization data generator 110 may generate the first common synthetic data 2530 by performing synthetic fingerprint, image, or sound generation based on the first features and the second features, as described with reference to FIGS. 20-23. For example, the authorization data generator 110 may generate the first common synthetic data 2530 by applying a one-way function to the first features and the second features.

The authorization data generator 110 may transmit, via the transceiver 142, the first common synthetic data 2530 to the authentication device 2502. The authorization data generator 2570 may receive the first common synthetic data 2530 and may store the first common synthetic data 2530 in the second memory 2562.

The authorization data generator 2570 may generate second common synthetic data 2560 in response to receiving the first information 2528. For example, the authorization data generator 2570 may generate the second common synthetic data 2560 based on the first information 2528 and the second biometric data 2550. To illustrate, the authorization data generator 2570 may extract first features from the first information 2528, may extract second features from the second biometric data 2550, and may generate the second common synthetic data 2560 based on the first features and the second features, as described with reference to FIGS. 20-23. For example, the authorization data generator 2570 may generate the second common synthetic data 2560 by applying a one-way function to the first features and the second features. The second common synthetic data 2560 may correspond to the common biometric data 2017 of FIG. 20, the common biometric data 2115 of FIG. 21, the common biometric data 2217 of FIG. 24, the common biometric data 2217 of FIG. 27, or a combination thereof.

The authorization data generator 2570 may compare the first common synthetic data 2530 to the second common synthetic data 2560. The authorization data generator 2570 may determine that authentication of the first user 2526, the mobile device 102, or both, is successful in response to determining that the first common synthetic data 2530 matches the second common synthetic data 2560. For example, the authorization data generator 2570 may authorize access by the first user 2526, the mobile device 102, or both, in response to determining that the first common synthetic data 2530 matches the second common synthetic data 2560. To illustrate, the authorization data generator 2570 may authorize access to at least one of a bank account, an automatic teller machine (ATM), a point of sale machine, a financial system, a user account, a system of a vehicle, or a system of a building. The system of a vehicle may include a braking system, a locking system of a door, a temperature control system, a sound system, a security system, an entertainment system, or a global positioning system. Thus, the first common synthetic data 2530 may function as a bank "password."

The authorization data generator 110 may generate the first information 2528 based on the key 2504 (e.g., a shared secret, such as an alphanumeric password) and the first biometric data 2520 (e.g., a private key of the mobile device 102). The authorization data generator 110 may provide the first information 2528 to the authentication device 2502 as a public key of the mobile device 102.

The authorization data generator 2570 may generate the second information 2558 based on the key 2504 (e.g., the shared secret) and the second biometric data 2550 (e.g., a private key of the authentication device 2502). The authorization data generator 2570 may provide the second information 2558 to the mobile device 102 as a public key of the authentication device 2502.

The authorization data generator 110 may generate the first common synthetic data 2530 based on the first biometric data 2520 (e.g., the private key of the mobile device 102) and the second information 2558 (e.g., the public key of the authentication device 2502). The authorization data generator 110 may provide the first common synthetic data 2530 to the authentication device 2502 as a password.

The authorization data generator 2570 may generate the second common synthetic data 2560 based on the second biometric data 2550 (e.g., the private key of the authentication device 2502) and the first information 2528 (e.g., the public key of the mobile device 102). The authorization data generator 2570 may authorize access in response to determining the first common synthetic data 2530 matches the second common synthetic data 2560.

The mobile device 102 may conduct an authenticated session with another electronic device via the network 2572 when the authentication device 2502 authenticates the first user 2526, the mobile device 102, or both, based on the first synthetic biometric data 2522. For example, the authentication device 2502 may include an authentication server and may provide access to another electronic device (e.g., a device of a financial system, a device of a vehicle, a device of a building, etc.) in response to determining that authentication of the first user 2526, the mobile device 102, or both, is successful. The authentication device 2502 may determine that authentication of the first user 2526 is not successful in response to determining that the first common synthetic data 2530 does not match the second common synthetic data 2560.

The system 2500 may thus enable selective access authorization based on the first biometric data 2520 and the key 2504. The mobile device 102 may provide synthetic biometric data (e.g., the first information 2528 and the first common synthetic data 2530) to the authentication device 2502. The first biometric data 2520 may be irrecoverable (or substantially irrecoverable) from the first information 2528, the first common synthetic data 2530, or both.

Figure 26:
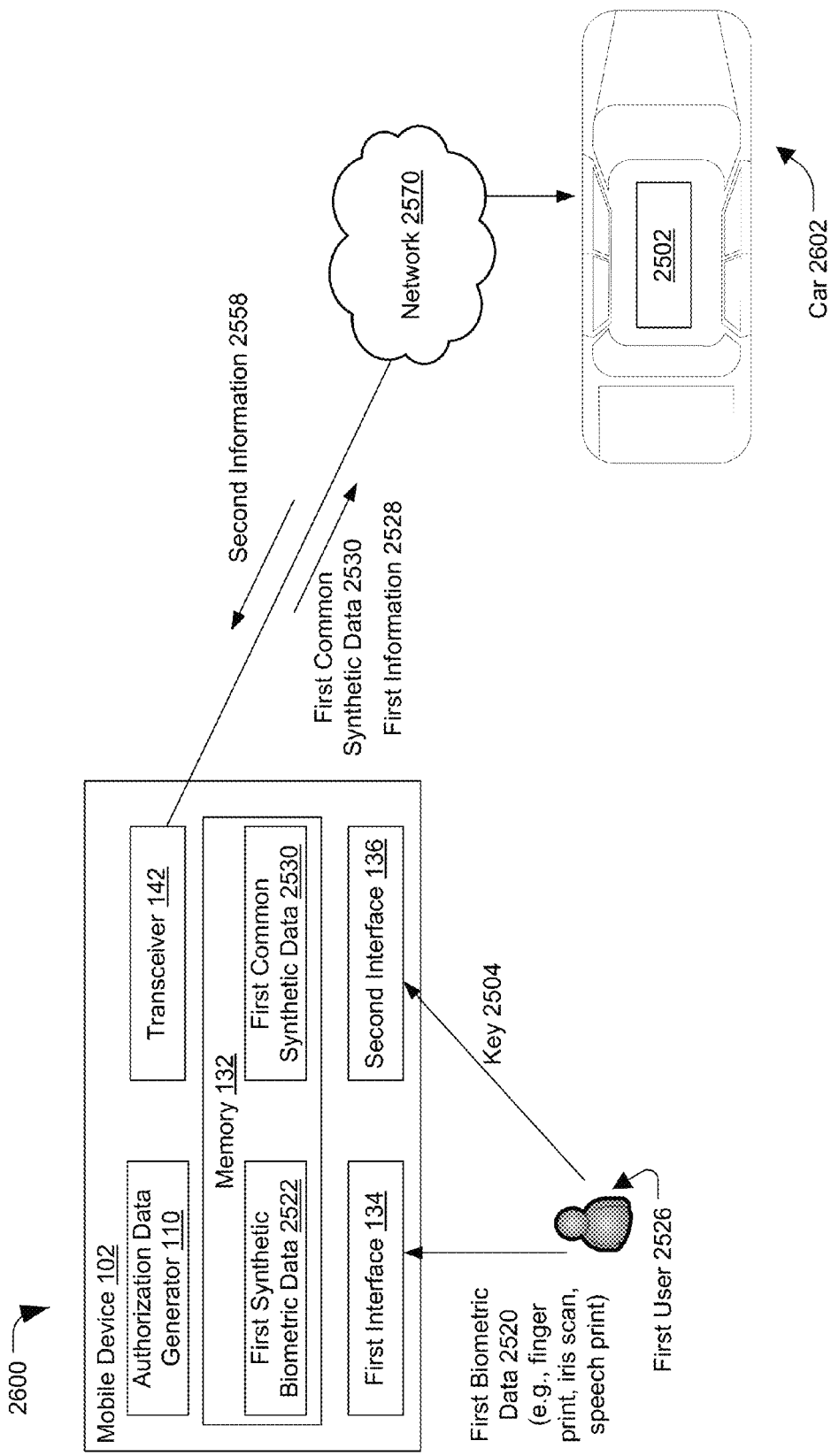
FIG. 26 is a diagram of another particular embodiment of a system configured to selectively authorize access based on biometric data and non-biometric data.

Referring to FIG. 26, a diagram of a particular embodiment of a system configured to selectively authorize access to system(s) of a vehicle based on biometric data and non-biometric data is shown and generally designated 2600. The system 2600 differs from the system 2500 in that the authentication device 2502 is included in a car 2602.

The authentication device 2502 may compare the first common synthetic data 2530 and the second common synthetic data 2560, as described with reference to FIG. 25. The authentication device 2502 may selectively authorize access to a system of the car 2602 based on the comparison. For example, the authentication device 2502 may authorize access to the system of the car 2602 in response to determining that the first common synthetic data 2530 matches the second common synthetic data 2560. The system of the car may include at least one of a braking system, a locking system of a door, a garage door activation system, a temperature control system, a sound system, a security system, an entertainment system, a communication system, or a global positioning system.

The first user 2526 may use the mobile device 102 to access a system of the car 2602. For example, the first user 2526 may provide the key 2504 and the first biometric data 2520 to start the engine of the car 2602 on a cold morning without going outside to the car 2602. As another example, the first user 2526 may be out of town and may use the mobile device 102 to enable a friend of the first user 2526 to enter a home of the first user 2526. To illustrate, the first user 2526 may provide the key 2504 and the first biometric data 2520 to the mobile device 102 to activate a garage door opening mechanism of the car 2602. The friend may enter the home through the garage door. As a further example, the second biometric data 2550 of FIG. 25 may correspond to the second user 2556 of FIG. 25. The second user 2556 may be a parent of the first user 2526. The second user 2556 may provide the key 2504 via user input to the authentication device 2502 of the car 2602. The second user 2556 may provide the key 2504 to the first user 2526 when the car 2602 is available for use by the first user 2526. The second user 2556 may reset the key 2504 at the authentication device 2502 when the car 2602 is unavailable for use by the first user 2526. The first user 2526 may not have a physical key to the car 2602. The first user 2526 may be unable to access the car 2602 without the key 2504 that matches the key 2504 of the car 2602.

The system 2600 may thus enable selective access authorization based on the first biometric data 2520 and the key 2504. The mobile device 102 may provide synthetic biometric data (e.g., the first information 2528 and the first common synthetic data 2530) to the authentication device 2502. The authentication device 2502 may authorize access to a system of the car 2602 based on the first information 2528, the first common synthetic data 2530, the key 2504, and the second biometric data 2550 of FIG. 25. The first biometric data 2520 may be irrecoverable (or substantially irrecoverable) from the first information 2528, the first common synthetic data 2530, or both.

Figure 27:
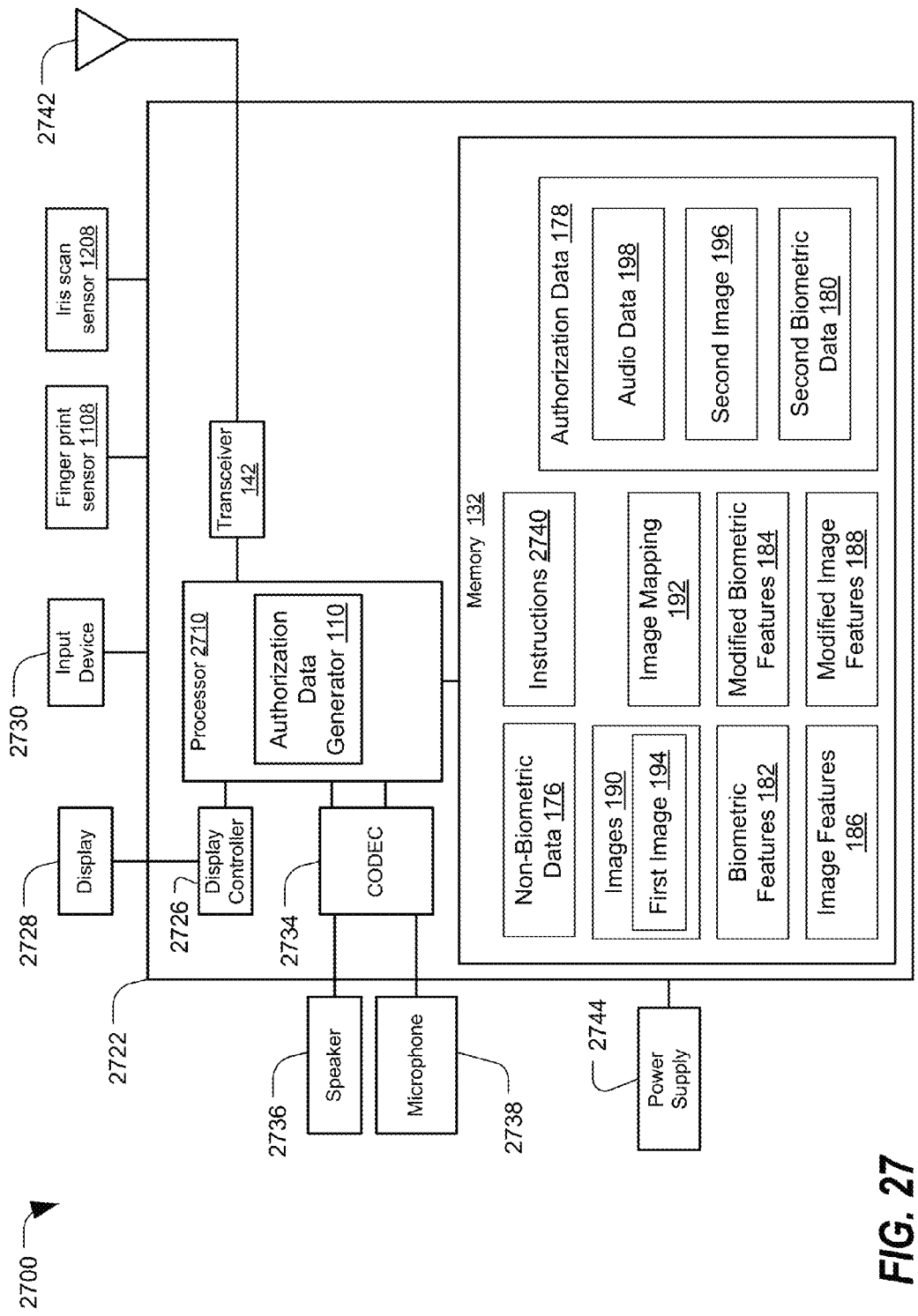
FIG. 27 is a block diagram of a device for generating authorization data, selectively authorizing access, or both, based on biometric data and non-biometric using the system of FIG. 1.

Referring to FIG. 27, a block diagram of particular embodiment of an electronic device is depicted and generally designated 2700. The device 2700 may generate authorization data based on biometric data and non-biometric using the system of FIG. 1. For example, the device 2700 may correspond to the mobile device 102 of FIG. 1. The device 2700 may selectively authorize access based on biometric data and non-biometric. For example, the device 2700 may correspond to the authentication device 2502 of FIGS. 25-26.

The device 2700 includes a processor 2710 (e.g., a digital signal processor (DSP)) coupled to the memory 132. The processor 2710 may include, or be coupled to, the authorization data generator 110. In an illustrative example, the processor 2710 performs one or more operations or methods described with reference to FIGS. 1-26.

FIG. 27 also shows a display controller 2726 that is coupled to the processor 2710 and to a display 2728. A coder/decoder (CODEC) 2734 can also be coupled to the processor 2710. A speaker 2736 and a microphone 2738 can be coupled to the CODEC 2734. In a particular embodiment, the microphone 2738 may correspond to the microphone 1202 of FIG. 12. The device 2700 may be coupled to, or may include, the finger print sensor 1108, the iris scan sensor 1208, or both. In a particular embodiment, the device 2700 may be coupled via one or more interfaces (e.g., the first interface 134, the second interface 136, or both) to the finger print sensor 1108, the iris scan sensor 1208, or both.

FIG. 27 also indicates that the processor 2710 may be coupled via the transceiver 142 to the wireless antenna 2742. In a particular embodiment, the processor 2710, the display controller 2726, the memory 132, the CODEC 2734, and the transceiver 142 are included in a system-in-package or system-on-chip device 2722. In a particular embodiment, an input device 2730 and a power supply 2744 are coupled to the system-on-chip device 2722. Moreover, in a particular embodiment, as illustrated in FIG. 27, the display 2728, the input device 2730, the speaker 2736, the microphone 2738, the finger print sensor 1108, the iris scan sensor 1208, the wireless antenna 2742, and the power supply 2744 are external to the system-on-chip device 2722. However, each of the display 2728, the input device 2730, the speaker 2736, the microphone 2738, the wireless antenna 2742, the finger print sensor 1108, the iris scan sensor 1208, and the power supply 2744 can be coupled to a component of the system-on-chip device 2722, such as an interface (e.g., the first interface 134 or the second interface 136) or a controller.

In conjunction with the described embodiments, an apparatus for communication is disclosed that includes means for receiving first common synthetic data and first information corresponding to first synthetic biometric data. For example, the means for receiving may include the transceiver 142, the authorization data generator 110 of FIG. 1, the authorization data generator 2570, the transceiver 2542 of FIG. 25, the processor 2710 of FIG. 27, one or more devices configured to receive the first common synthetic data 2530 and the first information 2528 of FIG. 25 (e.g., a processor executing instructions at a non-transitory computer readable storage medium), or a combination thereof.

The apparatus also includes means for obtaining second biometric data. For example, the means for obtaining may include the first interface 134, the authorization data generator 110 of FIG. 1, the finger print sensor 1108 of FIG. 11, the microphone 1202, the iris scan sensor 1208 of FIG. 12, the microphone 2638, the authorization data generator 2570 of FIG. 25, the processor 2710 of FIG. 27, one or more devices configured to obtain the second biometric data 2550 of FIG. 25 (e.g., a processor executing instructions at a non-transitory computer readable storage medium), or a combination thereof.

The apparatus further includes means for authentication configured to generate second common synthetic data based on the first information and the second biometric data, and to selectively authorize access based on a comparison of the first common synthetic data and the second common synthetic data. For example, the means for authentication may include the authorization data generator 110 of FIG. 1, the processor 2610 of FIG. 26, the authorization data generator 2570 of FIG. 25, one or more devices configured to generate the second common synthetic data 2560 of FIG. 25 and to selectively authorize access based on a comparison of the first common synthetic data 2530 and the second common synthetic data 2560 of FIG. 25 (e.g., a processor executing instructions at a non-transitory computer readable storage medium), or a combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary non-transitory (e.g. tangible) storage medium (e.g., a storage device) may be coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. The device 2700 may include a communications device, a personal digital assistant (PDA), a tablet, a computer, a music player, a video player, an entertainment unit, a navigation device, or a set top box.

The storage medium (e.g., the storage device) may include instructions (e.g., the instructions 2740) that, when executed by a processor (e.g., the processor 2710), may cause the processor to perform at least a portion of the methods and operations described with reference to FIGS. 1-22. As an example, the memory 132 may be a non-transitory computer-readable storage medium (or storage device) that includes instructions (e.g., the instructions 2740) that, when executed by the processor 2710, cause the processor 2710 to perform at least a portion of the methods and operations described with reference to FIGS. 1-22. For example, the processor 2710 may receive the biometric data 170 and the user input 172. The processor 2710 may generate the non-biometric data 176 based on the user input 172. The processor 2710 may generate the authorization data 178 (e.g., the audio data 198, the second image 196, and/or the second biometric data 180) based on the biometric data 170 and the non-biometric data 176. The processor 2710 may provide the authorization data 178 via the transceiver 142 to the wireless antenna 2742. For example, the processor 2710 generate packets based on the authorization data 178 and may provide the packets to the transceiver 142.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of authorizing access comprising:
   obtaining, at an authentication device, first information corresponding to first synthetic biometric data, wherein the first synthetic biometric data is generated by modifying at least one feature of first biometric data based on a key;
   obtaining, at the authentication device, first common synthetic data and second biometric data;
   generating, at the authentication device, second common synthetic data based on the first information and the second biometric data; and
   authorizing, by the authentication device, access based on a comparison of the first common synthetic data and the second common synthetic data.

2. The method of claim 1, wherein a first device, a user of the first device, or both, are authorized access by the authentication device in response to determining that the first common synthetic data matches the second common synthetic data.

3. The method of claim 1, wherein the authentication device is further configured, in response to determining that the first common synthetic data matches the second common synthetic data, to enable operation of a locking mechanism of at least one of a building door, a house door, a vehicle door, or a garage door.

4. The method of claim 1, wherein the authentication device is further configured, in response to determining that the first common synthetic data matches the second common synthetic data, to enable access to at least one of an automatic teller machine (ATM), a point of sale machine, a financial system, or a user account.

5. The method of claim 1, further comprising receiving, at the authentication device via a communication channel from a first device, the first information, the first common synthetic data, or both,
   wherein the first information comprises the first synthetic biometric data or features extracted from the first synthetic biometric data, and
   wherein the first device includes a mobile device, and wherein the communication channel corresponds to at least one of a wireless fidelity (Wi-Fi) network, a cellular network, a local area network (LAN), or a wide area network (WAN).

6. The method of claim 1, further comprising:
   obtaining, at the authentication device, second synthetic biometric data, wherein the second synthetic biometric data is generated based on the second biometric data and the key; and
   transmitting, from the authentication device to a first device, second information corresponding to the second synthetic biometric data.

7. The method of claim 6, further comprising receiving, at the authentication device, the first common synthetic data from the first device, wherein the first device generates the first common synthetic data based on the second information and the first biometric data associated with a first user.

8. The method of claim 6, wherein the first device generates the first synthetic biometric data based on the first biometric data associated with a first user.

9. The method of claim 6, wherein the key is a common key that is available to the first device and to the authentication device, and wherein the key is selected based on an elliptic curve cryptography scheme.

10. The method of claim 6, wherein the second information is encrypted using Rivest Shamir Adleman (RSA) encryption at the authentication device prior to being transmitted to the first device.

11. The method of claim 6, wherein the first device generates the first synthetic biometric data and the authentication device generates the second synthetic biometric data based on a common set of functions.

12. The method of claim 1, wherein the first synthetic biometric data is generated by a first device based on the key and the first biometric data associated with a first user of the first device.

13. The method of claim 1, wherein the second biometric data is associated with a second user.

14. The method of claim 1, wherein the second biometric data comprises arbitrary biometric data that is uniquely associated with the authentication device.

15. The method of claim 1, wherein the first common synthetic data and the second common synthetic data are generated based on a common set of functions.

16. An apparatus for authorizing access comprising:
a memory configured to store instructions; and
a processor configured to execute the instructions to:
generate second common synthetic data based on first information and second biometric data, the first information corresponding to first synthetic biometric data, wherein the first synthetic biometric data is generated by modifying at least one feature of first biometric data based on a key; and
authorize access to a system of a vehicle based on a comparison of first common synthetic data and the second common synthetic data.

17. The apparatus of claim 16, wherein the system includes at least one of a braking system, a garage door activation system, a locking system of a door, a temperature control system, a sound system, a security system, an entertainment system, a communication system, or a global positioning system.

18. The apparatus of claim 16, wherein the second biometric data is associated with a user.

19. The apparatus of claim 16,
wherein the first information and the first common synthetic data are received from a first device,
wherein the first information comprises the first synthetic biometric data or features of the first synthetic biometric data, and
wherein access to the system of the vehicle is authorized in response to determining that the first common synthetic data matches the second common synthetic data.

20. The apparatus of claim 16, further comprising:
a transmitter configured to provide second information corresponding to the second synthetic biometric data to a first device,
wherein the processor is further configured to generate the second synthetic biometric data based on the key and the second biometric data,
wherein the second information comprises the second synthetic biometric data or features of the second synthetic biometric data, and
wherein the first common synthetic data is generated at the first device based on the second information and the first biometric data of a first user.

21. The apparatus of claim 16, wherein the processor is further configured to generate second synthetic biometric data based on the key and the second biometric data, wherein the first common synthetic data is generated by a first device based on second information corresponding to the second synthetic biometric data, wherein the second synthetic biometric data is generated based on a one-way function, and wherein the first synthetic biometric data is generated by the first device based on a one-way function.

22. The apparatus of claim 21, wherein the one-way function includes at least one of a hash function, a modulo function, an exponential function, a hyperbolic tangent function, or another hyperbolic function.

23. The apparatus of claim 16, wherein the processor is configured to:
extract biometric features of the second biometric data,
store the biometric features in the memory, and
generate second synthetic biometric data by modifying the biometric features based on the key,
wherein the first common synthetic data is generated based on second information corresponding to the second synthetic biometric data.

24. The apparatus of claim 23, wherein the second biometric data includes iris scan data, wherein the biometric features indicate at least one of a radial furrow, a concentric furrow, a crypt, a collarette, or a pupil size, and wherein modifying the biometric features includes modifying at least one of the radial furrow, the concentric furrow, the crypt, the collarette, or the pupil size.

25. The apparatus of claim 23, wherein modifying the biometric features includes applying at least one of a rotation function, a blurring function, or a noise function.

26. The apparatus of claim 23, wherein the second biometric data is irrecoverable from the second information.

27. A computer-readable storage device for authorizing access storing instructions that, when executed by a processor, cause the processor to perform operations comprising:
obtaining first information corresponding to first synthetic biometric data, wherein the first synthetic biometric data is generated by modifying at least one feature of first biometric data based on a key;
obtaining first common synthetic data and second biometric data;
generating second common synthetic data based on the first information and the second biometric data; and
authorizing access based on a comparison of the first common synthetic data and the second common synthetic data.

28. The computer-readable storage device of claim 27, wherein the first information and the first common synthetic data are obtained from a first device, and wherein the first device is authorized to access at least one of a system of a vehicle, a financial system, or a user account in response to determining that the first common synthetic data matches the second common synthetic data.

29. An apparatus for authorizing access comprising:
means for receiving first common synthetic data and first information corresponding to first synthetic biometric data, wherein the first synthetic biometric data is generated by modifying at least one feature of first biometric data based on a key;
means for obtaining second biometric data; and
means for authentication configured to generate second common synthetic data based on the first information and the second biometric data, and to selectively authorize access based on a comparison of the first common synthetic data and the second common synthetic data.

30. The apparatus of claim 29, wherein the means for receiving, the means for obtaining, and the means for authentication are integrated into at least one of a communications device, a personal digital assistant (PDA), a tablet, a computer, a music player, a video player, an entertainment unit, a navigation device, or a set top box.

* * * * *